US006801901B1

(12) United States Patent
Ng

(10) Patent No.: US 6,801,901 B1
(45) Date of Patent: Oct. 5, 2004

(54) SYSTEMS AND METHODS FOR BUILDING AND IMPROVING THE QUALITY OF INVENTORY LOAD CONFIGURATIONS

(75) Inventor: Frank Ng, Broadview Heights, OH (US)

(73) Assignee: Penske Truck Leasing Co., Reading, PA (US)

( * ) Notice: Subject to any disclaimer, the term of this patent is extended or adjusted under 35 U.S.C. 154(b) by 451 days.

(21) Appl. No.: 09/591,614

(22) Filed: Jun. 9, 2000

(51) Int. Cl.[7] ............................................. G06F 17/60
(52) U.S. Cl. ............................. 705/28; 705/7; 701/201
(58) Field of Search ........................ 705/28, 7, 8, 400, 705/1, 410, 408; 701/201, 202; 702/175, 174; 235/375, 478.01; 707/1, 3

(56) References Cited

U.S. PATENT DOCUMENTS

| | | | | |
|---|---|---|---|---|
| 5,758,329 A | * | 5/1998 | Wojcik et al. ................ 705/28 |
| 6,219,653 B1 | * | 4/2001 | O'Neill et al. ................ 705/28 |
| 6,341,266 B1 | * | 1/2002 | Braun ........................... 705/8 |
| 6,374,178 B2 | * | 4/2002 | Nakagawa et al. .......... 701/202 |
| 6,401,078 B1 | * | 6/2002 | Roberts et al. ............... 705/28 |
| 6,411,891 B1 | * | 6/2002 | Jones ........................... 701/201 |
| 6,430,496 B1 | * | 8/2002 | Smith et al. ................ 701/201 |
| 6,571,213 B1 | * | 5/2003 | Altendahl et al. ............. 705/1 |
| 2002/0103728 A1 | * | 8/2002 | Naghshineh et al .......... 705/29 |

FOREIGN PATENT DOCUMENTS

JP 2002046816 * 2/2002 ........... B65G/1/137

OTHER PUBLICATIONS

Roberto, Michael "Precision Movement" Nov. 1997, Manufacturing Systems, v 15, n 11, pp. 58–74.*
McGovern, J. Michael "Route your Way to Cost Savings" Apr. 1998, Transportation & Distribution, v 39, n 4, pp. 42 ,44, 46.*

Ernstberger, W. Kathryn et al. "Reconfiguring the Supply Network using Current Performance Date" Summer 1998, Decision Sciences, v 29 iss 3, p 707, 22 pgs.*

Desmond, Parry "Super Systems for a Super–Regional LTL Carrier" Apr. 1999, Commercial Carrier Journal, v 156, n 4, pp. 49–62.*

Declaration of Frank Ng dated Jul. 23, 2001 (Three pages total).

* cited by examiner

Primary Examiner—Lynda Jasmin
(74) Attorney, Agent, or Firm—Reed Smith, LLP

(57) ABSTRACT

The present invention is a method and system for building and improving inventory load configurations, and displaying the built load configurations to allow review of the load configurations. One embodiment of the invention comprises designating a portion of the inventory as priority units, creating a current destination seed list, creating a current inventory seed list, selecting a current seed destination from the current destination seed list, building a current load by selecting a current seed unit from the current inventory seed list, adding priority units to be delivered to the current seed destination and then saving the developed load configuration as one of the plurality of load configurations. A system according to the present invention comprises a computer; software running on the computer for building the loads from an inventory at a terminal; and an inventory distribution graphical user interface (gui), generated by the software on a display, for viewing inventory distribution information.

7 Claims, 38 Drawing Sheets

FIG. 29

SYSTEMS AND METHODS FOR BUILDING AND IMPROVING THE QUALITY OF INVENTORY LOAD CONFIGURATIONS

BACKGROUND

I. Field of the Invention

The present invention relates generally to the delivery of inventory, and more particularly, to computer implemented methods of building and improving the quality of inventory load configurations.

II. Description

In the manufacturing sector, business concerns produce large numbers of products such as computers, electronics, home appliances and automobiles that must be delivered to another location for either further distribution or retail sale to consumers. These products often are delivered from the manufacturer to their ultimate destination by train, airplane, ship, truck, or some combination thereof, and are generally staged at a terminal as inventory before they are loaded and shipped to their appropriate destinations. In the case of shipping over land by truck, there are computer-implemented methods for building the individual load configurations for each truck from the inventory at a terminal. The existing methods however, typically are accept-or-reject type methods that do not allow one to experiment with different load configurations in order to create higher quality loads. To the extent existing methods do provide the ability to experiment with different load configurations, the facility is quite limited. The existing methods also do not account for geographic areas having high concentrations of inventory to be delivered, the age of the inventory to be delivered, or the number of products in the inventory to be delivered to the same destination when building the loads. Nor do the existing methods provide for any post-initial building improvement of the loads based on load quality criteria such as the total number of odometer miles traveled per load and the number of destinations or stops per load. Finally, the existing methods fail to provide a friendly interface that aids a user in selecting the inventory to be delivered and assessing the quality of load configurations generated by the methods. Accordingly, there is a need for improved methods of building load configurations.

SUMMARY OF THE INVENTION

The present invention is directed to methods of building and improving the quality of inventory load configurations, and means of displaying information regarding inventory and the inventory load configurations.

In a computer implemented embodiment of the method for building a plurality of loads from an inventory at a terminal, the method may comprise first designating a portion of the inventory as priority units. Once the priority units have been selected, a current destination seed list is created, wherein the current destination seed list comprises a list of the destinations to which priority units in the current inventory are to be delivered. A current inventory seed list is then created, wherein the current inventory seed list comprises an ordered list of the priority units in the current inventory. A current seed destination is then selected from the current destination seed list, and a current load is built by selecting a current seed unit from the current inventory seed list, and adding priority units to be delivered to the current seed destination from the current inventory to the current load, starting with the current seed unit, until either there are no more priority units to be delivered to the seed destination in the current inventory or the current load is full. The current load is then saved as one of the plurality of loads.

The invention is also embodied in a method for improving the quality of a pair of loads selected from a plurality of loads, wherein the plurality of loads comprises a plurality of units to be delivered from a terminal to a plurality of destinations within a geographic region on a plurality of delivery vehicles, a portion of the plurality of units comprising priority units, and wherein a current inventory comprises the plurality of units less any units that have been added to a temporary load or a rebuilt load pair in a plurality of rebuilt loads. The method comprises the steps of creating a list of candidate load pairs from the plurality of loads, each of the candidate load pairs comprising at least two priority units to be delivered to destinations geographically close to each other. From this list of candidate load pairs, a candidate load pair is selected, the selected candidate load pair comprising a current candidate load pair, and wherein the at least two priority units in the current candidate load pair comprise current candidate priority units. Next, a combined load index is calculated for the current candidate load pair, and then determining which two priority units of the current candidate priority units are to be delivered to destinations geographically furthest from each other, the two priority units comprising a first seed unit and a second seed unit, the destinations to which the first and second seed units are to be delivered comprising a first seed destination and a second seed destination respectively. A rebuilt load pair is then created by assigning the first seed unit to a first temporary load and the second seed unit to a second temporary load; adding the current candidate priority units to be delivered to the first seed destination from the current inventory to the first temporary load until either the first temporary load is full or all of the current candidate priority units to be delivered to the first seed destination have been removed from the current inventory; and adding the current candidate priority units to be delivered to the second seed destination from the current inventory to the second temporary load until either the second temporary load is full or all of the current candidate priority units to be delivered to the second seed destination have been removed from the current inventory. A rebuilt plurality of loads is then created by substituting, in the plurality of loads, the rebuilt load pair for the current candidate load pair.

The present invention may also be embodied in a computer implemented method for improving the mileage quality of a pair of loads selected from a plurality of loads, wherein the plurality of loads comprises a plurality of units to be delivered from a terminal to a plurality of destinations within a geographic region on a plurality of delivery vehicles. The embodiment comprises creating a list of candidate load pairs from the plurality of loads; selecting a candidate load pair from the list of candidate load pairs, the selected candidate load pair comprising a first candidate load and a second candidate, wherein the first and second candidate loads overlap, and wherein there is a first destination on the first candidate load and a second destination on the second candidate load to which the same number of units are to be delivered, the units to be delivered to the first destination comprising first units and the units to be delivered to the second destination comprising second units; swapping the first and second units between the first and second candidate loads, the first candidate load with the second units comprising a first swapped load and the second candidate load with the first units comprising a second swapped load; and saving the first and second swapped loads in the plurality of loads.

The present invention may also be embodied in a computer implemented method for improving the combined number of drops on a load pair selected from a plurality of loads, the plurality of loads comprising a plurality of units to be delivered from a terminal to a plurality of destinations within a geographic region on a plurality of delivery vehicles. The embodiment comprises creating a list of candidate load pairs from the plurality of loads; selecting a candidate load pair from the list of candidate load pairs, the selected candidate load pair comprising a first candidate load and a second candidate load; creating a list of intersection pairs from the selected candidate load pair; selecting an intersection pair from the list of intersection pairs, the selected intersection pair comprising a first intersecting destination and a second intersecting destination, the first and second intersecting destinations lying within an intersection city, wherein the number of units to be delivered to the first intersecting destination is greater than the number of units to be delivered to the second intersecting destination minus a predetermined threshold, and wherein there are a plurality of destinations on the first candidate load, the plurality of destinations on the first candidate load comprising candidate destinations; swapping the units to be delivered to the candidate destinations and the units to be delivered to the second intersecting destination between the first and second candidate loads, the first candidate load with the second intersecting destination units comprising a first swapped load and the second candidate load with the candidate destinations units comprising a second swapped load; and saving the first and second swapped loads in the plurality of loads.

The present invention may also be embodied in a computer implemented method for improving the mileage quality of a load, wherein the load is selected from a plurality of loads, the plurality of loads comprising a first plurality of units to be delivered from a terminal to a first plurality of destinations within a geographic region on a plurality of delivery vehicles. The embodiment comprises: creating a list of seed units from a second plurality of units, the second plurality of units to be delivered to a second plurality of destinations within the geographic region; selecting a current seed unit from the list of seed units; creating a list of promising loads from the plurality of loads; selecting a current promising load from the list of promising loads, wherein the current promising load comprises a best savings load for the current seed unit; creating a sort list from the units comprising the current promising load; selecting a current best savings unit from the sort list; swapping the current best savings unit for the current seed unit on the current promising load, the current promising load with the current best savings unit comprising a current swapped load; and saving the current swapped load in the plurality of loads.

The present invention may also be embodied in a system for building and assessing the quality of loads. Such a system includes a computer; software running on the computer for building the loads from an inventory at a terminal; and an inventory distribution graphical user interface (gui), generated by the software on a display, for viewing inventory distribution information.

BRIEF DESCRIPTION OF THE DRAWINGS

The features, objects and advantages of the present invention will become more apparent from the detailed description set forth below when taken in conjunction with the drawings in which like reference characters identify corresponding elements and wherein:

FIG. 29 shows a graphical user interface for displaying built load information for an individual load.

DETAILED DESCRIPTION OF THE PREFERRED EMBODIMENTS

The methods shown and described herein are preferably implemented as a software program running on a computer, a computer comprising a microprocessor and memory communicably connected to the microprocessor. In particularly preferred embodiments of the invention, the methods are practiced in conjunction with a graphical user interface (gui) generated by the software program/microprocessor on a display communicably connected to the microprocessor. The gui acts as an interface between the software program/microprocessor and a user(s) of the methods, conveying information to and/or from the microprocessor and the user(s).

Figure 1A:
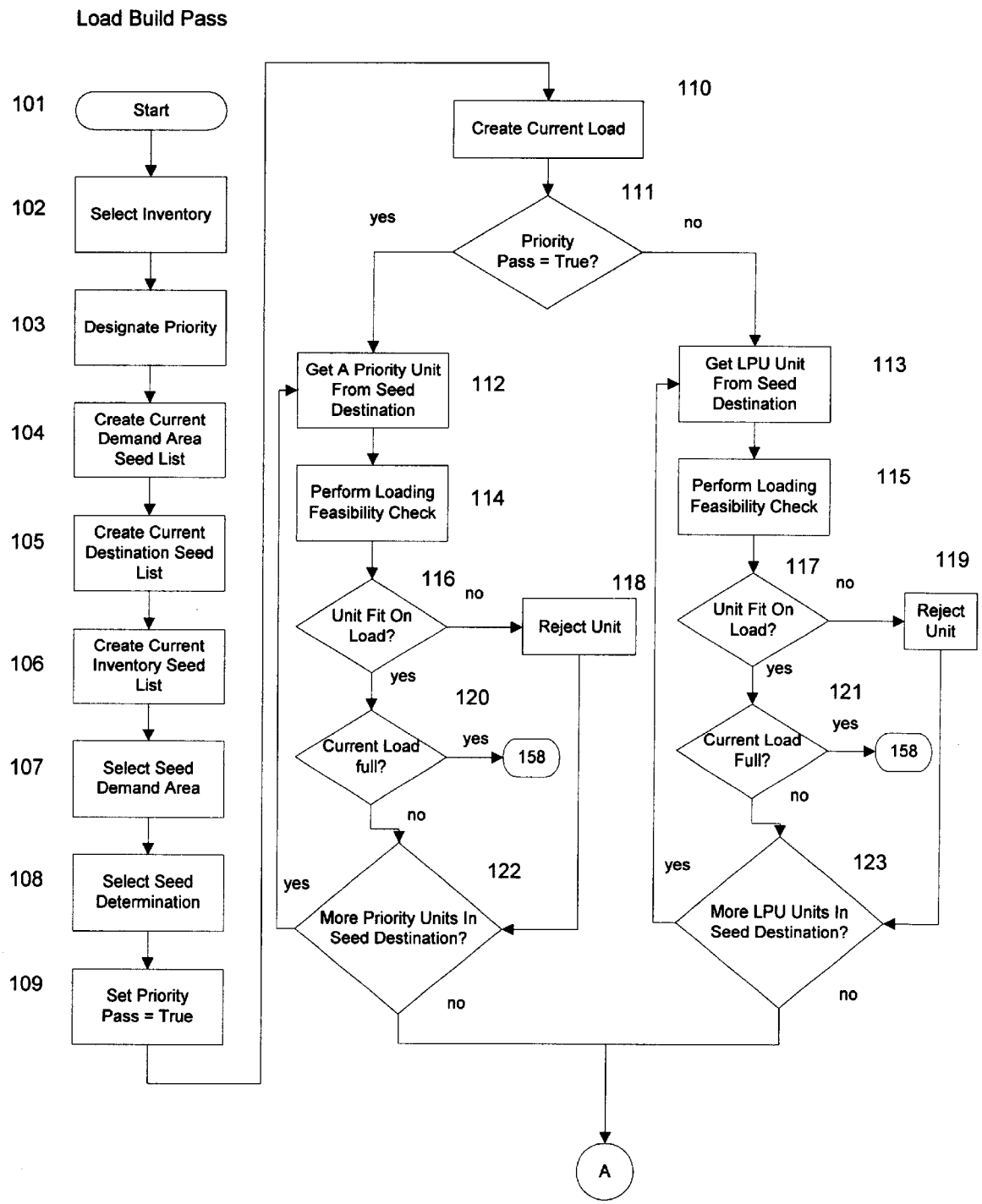
FIG. 1 is a flow diagram of a method for building a plurality of loads in accordance with a preferred embodiment of the invention.
Figure 1B:
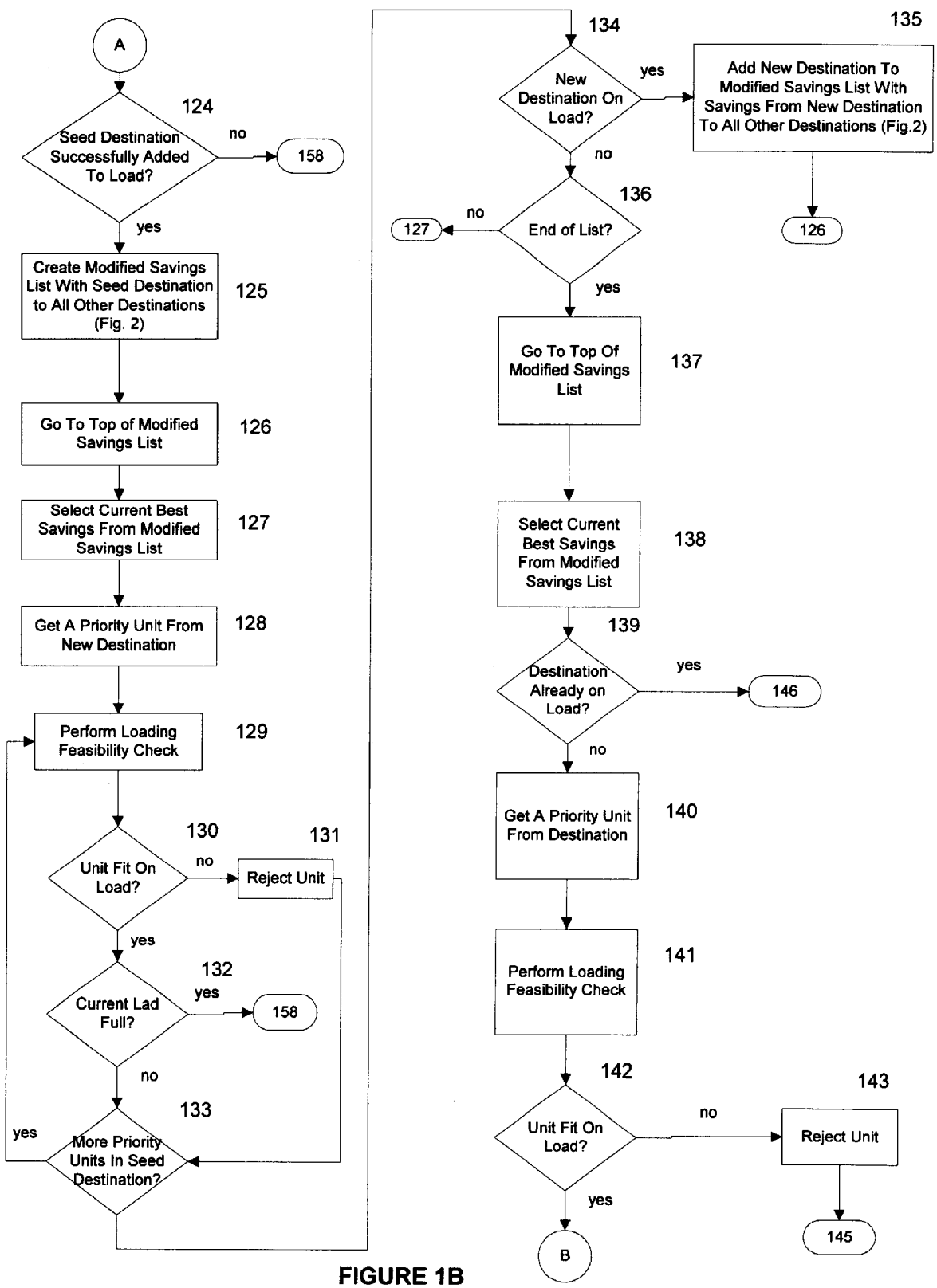
Figure 1C:
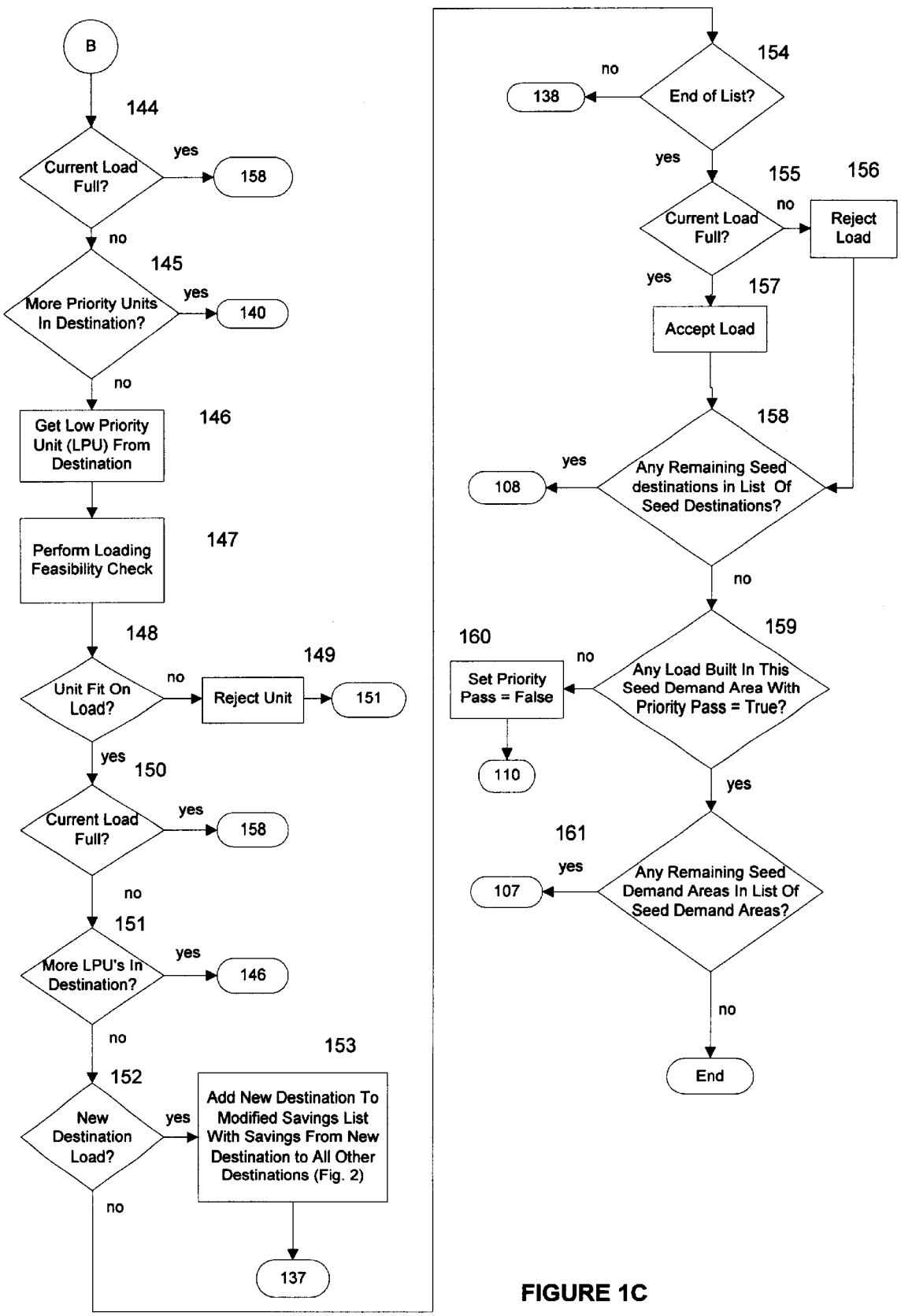

Referring now to FIG. 1, there is shown a flow diagram of a method for building a plurality of loads in accordance with a first preferred embodiment of the invention. In step 101, a user initiates a load-building session. The program prompts the user in step 102 to select the inventory from which the loads will be built. The inventory comprises a plurality of units to be delivered to a plurality of destinations within a geographic region on a plurality of delivery vehicles. In preferred embodiments of the invention, the units comprise automobiles, the destinations comprise car dealers to which the automobiles are to be delivered, and the geographic region comprises a plurality of automobile manufacturer defined demand areas. A current inventory comprises the units in the inventory selected in step 102 that have not yet been placed on one of the plurality of loads during the process of building the plurality of loads. In step 103, the program prompts the user to designate a portion of the inventory as priority units. Priority units comprise units where an extra effort should be made to deliver those units first. Priority may be designated based on any number of characteristics or combination of characteristics that a user of the method would deem important, including but not limited to the model of the unit, the destination to which the unit is to be delivered, and the demand area to which the unit is to be delivered. In preferred embodiments of the invention, priority is designated based on the age of the unit, the age of a unit comprising the number of days the unit has remained at the terminal awaiting delivery to its destination.

In step 104, the program creates a current demand area seed list. The current demand area seed list comprises an ordered list of the demand areas to which priority units in the current inventory are to be delivered. The demand areas are ordered in the current demand area seed list from the demand area to which the highest number of priority units in the current inventory are to be delivered to the demand area to which the lowest number of priority units in the current inventory are to be delivered. For example, if there were three demand areas (DA1, DA2, DA3) and 3 priority units in the current inventory (u1, u2, u3) were to be delivered to the DA1, 2 priority units in the current inventory (u4, u5) to DA2 and 1 priority unit in the current inventory (u6) to DA3, the current demand area seed list would appear as [DA1, DA2, DA3].

In step 105, the program creates a current destination seed list. The current destination area seed list comprises an ordered list of the destinations to which priority units in the current inventory are to be delivered. The destinations in the current destination seed list are ordered from the destination in a demand area to which the highest number of priority units in the current inventory are to be delivered to the destination in the same demand area to which the lowest number of priority units are to be delivered, sequentially for each of the demand areas in the current demand area seed list starting with the first demand area in the current demand area seed list. Continuing with the example from above, if priority units u1 and u2 were to be delivered to a first destination (d1), priority unit u3 was to be delivered to a second destination (d2), priority units u4 and u5 were to be delivered to a third destination (d3), and priority unit u6 was to be delivered to a fourth destination (d4), the current destination seed list would appear as [d1, d3 d2, d4].

In step 106, the program creates a current inventory seed list. The current inventory seed list comprises an ordered list of the priority units in the current inventory. The priority units in the current inventory are ordered from the priority units to be delivered to the first destination in the current destination seed list to the priority units to be delivered to the last destination in the current destination seed list. Continuing the example from above again, the current inventory seed list would appear as [u1, u2, u4, u5, u3, u6]. Where u2 has a higher priority than u1 and u5 has a higher priority than u4, in a particularly preferred embodiment of the invention the current inventory seed list could also appear as [u2, u1, u5, u4, u3, u6]. An example of where a priority unit could have a higher priority than another priority unit is where priority is determined by age and while both units are greater than the minimum age, one unit is older than another.

In step 107 the program selects a current seed demand area, the current seed demand area comprising the demand area with the highest density of priority units in the current inventory. In step 108, the program selects a current seed destination from the current destination seed list for consideration. The program starts with the first destination in the list, and sequentially selects the next destination in the current destination seed list each time step 108 is repeated until a new current destination seed list is created. In step 109, the program sets a priority pass flag equal to true. In step 110, the program creates the current load by selecting a unit from the current inventory seed list and adding the unit to a load. The program first selects a unit from the current inventory seed list to be delivered to the current seed destination. The program starts with the first unit in the current inventory seed list to be delivered to the current seed destination, and sequentially selects the next unit in the current inventory seed list to be delivered to the current seed destination each time step 110 is repeated until a new current inventory seed list is created. The unit selected in step 110 comprises the current seed unit. The program then starts a load by adding the current seed unit to a new load, the new load comprising the current load.

In step 111, the program determines whether the priority pass flag is set to true. If the priority pass flag is set to true, in step 112 the program adds a priority unit to be delivered to the current seed destination from the current inventory to the current load and skips to step 114. In step 114, the program performs a loading feasibility check and skips to step 116. Loading feasibility checks are discussed in further detail in conjunction with FIG. 9A below. In step 116 the program determines whether the priority unit will fit on the load. If the determination in step 116 is no, the program rejects the unit in step 118 and skips to step 122. If the determination in step 116 is yes, the program adds the priority unit to the current load and proceeds to step 120. In step 120 the program determines whether the current load is full. If full, the program skips to step 158. If not full, the program proceeds to step 122 and determines whether there are any priority units to be delivered to the current seed destination remaining in the current inventory. If the determination in step 122 is yes, the program returns to step 112. If the determination in step 122 is no, the program proceeds to step 124.

If the determination in step 111 is that the priority pass flag is not set to true, the program proceeds to step 113. In step 113 the program adds a low priority unit to be delivered to the current seed destination from the current inventory to the current load and proceeds to step 115. In step 115 the program performs a loading feasibility check and skips to step 117. In step 117 the program determines whether the low priority unit will fit on the load. If the determination in step 117 is no, the program rejects the unit in step 119 and skips to step 123. If the determination in step 117 is yes, the program adds the low priority unit to the current load and proceeds to step 121. In step 121 the program determines whether the current load is full. If full, the program skips to step 158. If not full, the program proceeds to step 123 and determines whether there are any low priority units to be delivered to the current seed destination remaining in the current inventory. If the determination in step 123 is yes, the program returns to step 113. If the determination in step 123 is no, the program proceeds to step 124.

In step 124 the program determines whether any units to be delivered to the current seed destination were successfully added to the current load. If the determination in step 124 is no, the computer skips to step 158. If the determination in step 124 is yes, the computer proceeds to step 125. Beginning with step 125, the program attempts to add units from the current inventory to be delivered to destinations other than the current seed destination. In a particularly preferred embodiment of the invention, the units are first added using a building pass modified savings approach. In step 125, the program creates a modified savings list from the current seed destination to all other destinations in the current inventory. The creation of the modified savings list or tree from the current seed destination is discussed with reference to FIG. 2 below. In step 126, the program sets its pointer to the first value in the modified savings list or top of the modified savings tree. In step 127, the program selects a first current best savings destination from the modified savings list, the first current best savings destination comprising the destination associated with the best savings value to which the program's pointer is pointing. In step 128, the program selects a priority unit to be delivered to the current best savings destination from the current inventory. In step 129 the program performs the loading feasibility check. In step 130, the program determines whether the priority unit will fit on the current load. If the determination in step 130 is no, the program rejects the unit in step 131 and skips to step 133. If the determination in step 130 is yes, the program adds the priority unit to the current load and proceeds to step 132. In step 132 the program determines whether the current load is full. If full, the program skips to step 158. If not full, the program determines in step 133 whether there are more priority units to be delivered to the current best savings destination in the current inventory. If the determination in step 133 is yes, the program returns to step 128. If the determination in step 133 is no, the program determines in step 134 whether any units to be delivered to a new destination (i.e., destination(s) other than where units were to be delivered at the conclusion of step 124 above) were added to the current load. If the determination in step 134 is yes, the program in step 135 creates a new modified savings list from all destinations on the current load, including the new destination, to all the other destinations in the current inventory and then returns to step 126. If the determination in step 134 is no, the program determines in step 136 whether the pointer is pointing to the last value in the modified savings list or is at the bottom of the modified savings tree. If not at the bottom of the tree, the program moves the pointer to the next value in the modified savings list or tree and returns to step 127 above. If the pointer is at the bottom of the tree, the program proceeds to step 137.

In step 137 the program sets its pointer to the top of the modified savings list again. In step 138 the program selects a second current best savings destination from the modified savings list, the second current best savings destination comprising the destination associated with the best savings value to which the program's pointer is pointing. In step 139 the program determines whether the second current best savings destination is on the current load (i.e., whether there are units to be delivered to the second best savings destination on the current load). If the determination in step 139 is yes, the program skips to step 146. If the determination in step 139 is no, in step 140 the program selects a priority unit to be delivered t the second current best savings destination from the current inventory. In step 141, the program performs the loading feasibility check. In step 142, the program determines whether the priority unit will fit on the current load. If the determination in step 142 is no, the program rejects the unit in step 143 and proceeds to step 145. If the determination in step 142 is yes, the program adds the priority unit to the current load and proceeds to step 144. In step 144 the program determines whether the current load is full. If the determination in step 144 is yes, the program skips to step 158. If the determination in step 144 is no, the program determines in step 145 whether there are more priority units to be delivered to the second current best savings destination remaining in the current inventory. If the determination in step 145 is yes, the program returns to step 140. If the determination in step 145 is no, the program proceeds to step 146.

In step 146, the program selects a low priority unit to be delivered to the second current best savings destination from the current inventory. In step 147 the program performs the loading feasibility check. In step 148, the program determines whether the low priority unit selected will fit on the current load. If the determination in step 148 is no, the program rejects the unit in step 149 and skips to step 151. If the determination in step 148 is yes, the program adds the low priority unit to the current load and proceeds to step 150. In step 150 the program determines whether the current load is full. If full, the program skips ahead to step 158. If not full, the program determines in step 151 whether there are more low priority units in the current inventory to be delivered to the second current best savings destination. If the determination in step 151 is yes, the program returns to step 146. If the determination in step 151 is no, the program determines in step 152 whether any units to be delivered to a new destination (i.e., destination(s) other than where units were to be delivered at the conclusion of step 136 above) were added to the current load. If the determination in step 152 is yes, the program in step 153 creates a new modified savings list from all destinations on the current load, including the new destination, to all the other destinations in the current inventory and then returns to step 137. If the determination in step 152 is no, the program determines in step 154 whether the pointer is pointing to the last value in the modified savings list or is at the bottom of the modified savings tree. If not at the bottom of the tree, the program moves the pointer to the next value in the modified savings list or tree and returns to step 138 above. If the pointer is at the bottom of the tree, the program proceeds to step 155.

In step 155, the program determines whether the current load is full. If the current load is not full, the program rejects the load and skips to step 158. If the current load is full, the program in step 157 accepts and saves the load as one of the plurality of loads and proceeds to step 158. In step 158 the program determines whether there are any destinations remaining in the current list of seed destinations. If the determination in step 158 is yes, the program returns to step 108 above. If the determination in step 158 is no, the program determines in step 159 whether any loads were saved in the current seed demand area while the priority pass flag was set to true. If the determination in step 159 is no, the programs in step 160 sets the priority flag equal to false and returns to step 110. If the determination in step 159 is yes, the program skips to step 161 where it determines whether there are any remaining demand areas in the current list of seed demand areas. If there are remaining demand areas, the program returns to step 107 above. If there are no remaining demand areas the program ceases to build new loads.

Figure 2:
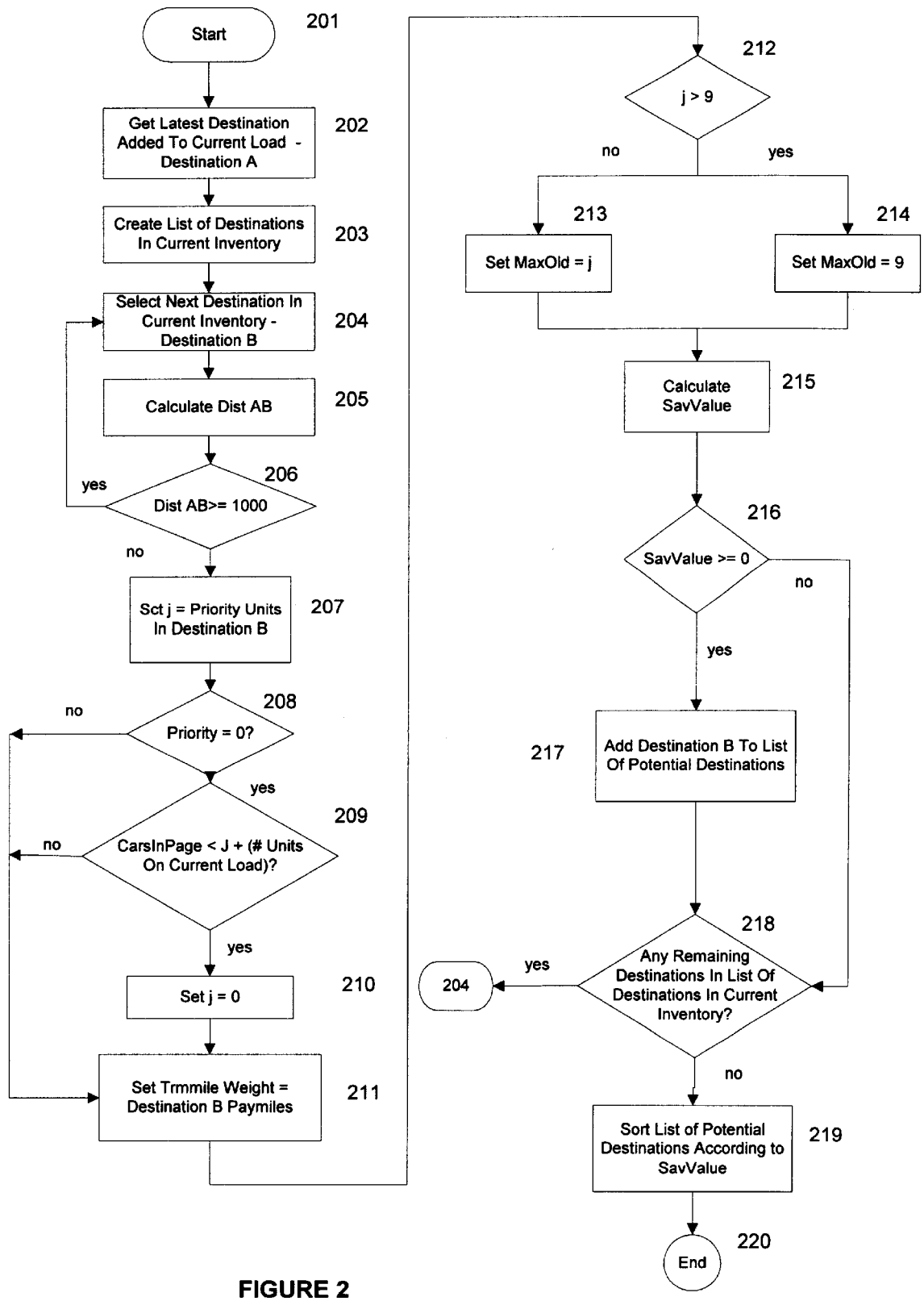
FIG. 2 is a flow diagram of a building pass modified savings approach for adding priority units to a current load in accordance with a preferred embodiment of the invention.

Referring now to FIG. 2, there is shown a flow diagram of a process for creating a building pass modified savings list or tree 200 in accordance with a preferred embodiment of the invention. The process is initiated in step 201. In step 202, the program selects a destination from the current load, the destination selected comprising destination A (A). Where there is more than one destination on the current load, A preferably comprises the last destination added to the current load. In step 203 the program creates a list of destinations in the current inventory. In step 204 the program selects a destination from the list of destinations in the current inventory created in step 203. The program starts with the first destination in the list of destinations in the current inventory, and sequentially selects the next destination in the list of destinations in the current inventory each time step 204 is repeated until a new list of destinations in the current inventory is created. The destination selected in step 204 comprises destination B (B).

In step 205 the program calculates the distance between A and B (DistAB). In step 206, the program determines whether DistAB is greater than or equal to 1000. The invention is not limited to the use of 1000, or any other. Empirically the value of 1000 as been found to work well given the geographic network of automobile dealerships serviced by way of tractor trailer delivery vehicles. If DistAB is greater than or equal to 1000, the program returns to step 204; otherwise, the program proceeds to step 207. In step 207, the program sets a variable j equal to the number of priority units in the current inventory to be delivered to B. In step 208, the program determines whether the priority for the load building session equals 0, signaling all available units in the current inventory are given equal importance. If No, the program skips ahead to step 211. If the determination in step 208 is yes, the program determines in step 209 whether: CarsInPage<j+(number of units on current load), where CarsInPage comprises the number of units in a full load. This formula attempts to find those destinations having sufficient number of units to finish off the load. If the determination in step 209 is no, the program skips ahead to step 211. If the determination in step 209 is yes, the program assigns a value of 0 to the variable j in step 210. Setting j equal to 0 for destinations having more units than needed to finish off the load will reduce the chance of unnecessarily splitting up large destinations. In step 211, the program sets the variable Trmmile Wt equal to the paymiles of destination B. In the preferred embodiment of the invention paymiles is the distance from the terminal to the destination for which the shipper has agreed to pay a negotiated rate. In step 212, the program determines whether the value of j is greater than 9. The invention is not limited to the use of the value 9 or any other. The use of 9 limits the impact of priority units on the overall savings value when shipping automobiles. If the determination in step 212 is yes, the program skips ahead to step 214 where it sets variable MaxOld=j. If the determination in step 212 is no, the program proceeds to step 213 where it sets variable MaxOld=9, and skips ahead to step 215.

In step 215, the program calculates the savings value (SavValue) associated with placing units to be delivered to B on the current load in accordance with the following formula:

$$((1000-DistAB) \times 20) + \text{Trmmile Wt} + (\text{MaxOld} \times 5).$$

The formula attempts to obtain load pairs where the DistAB is small, but the route traveled while delivering the units on the loads will be close to a straight line path (excluding the initial and final legs of the route). The term (1000−DistAB) tends to obtain pairs where DistAB is very small relative to the value 1000, typically the number which no DistAB will exceed in preferred embodiments of the invention. DistAB is subtracted from the value 1000 because the higher the value of SavValue the better the pair is considered in preferred embodiments of the invention. The term (1000−DistAB) is multiplied by a weighting factor, in the preferred embodiment 20, to render DistAB more important than any other term in the equation by some factor (in this case 20). Incorporation of the Trmmile Wt in the formula tends to keep the route traveled while delivering the units on the loads close to a straight line path. Incorporation of the MaxOld term tends to favor destinations having higher numbers of priority units. Multiplying the MaxOld term by a weighting factor, in the preferred embodiment 5, that is smaller than the weighting factor applied to the (1000−DistAB) term gives some preference to destinations having higher numbers of priority units but maintains the preeminent importance of DistAB on the SavValue associated with the load pair under consideration.

In step 216 the program determines whether SavValue is greater than or equal to 0. If the determination in step 216 is no, the program skips ahead to step 218. If the determination in step 216 is yes, the program adds B to a list of potential destinations. In step 218, the program determines whether there are any remaining destinations in the list of destinations in current inventory to be considered. If Yes, the program returns to step 205. If the determination in step 218 is no, the program in step 219 sorts the list of potential destinations according their SavValue. The sorted list of potential destinations comprises the modified savings list or tree. In step 220 the program terminates the building pass modified savings list or tree creation process.

Figure 3:
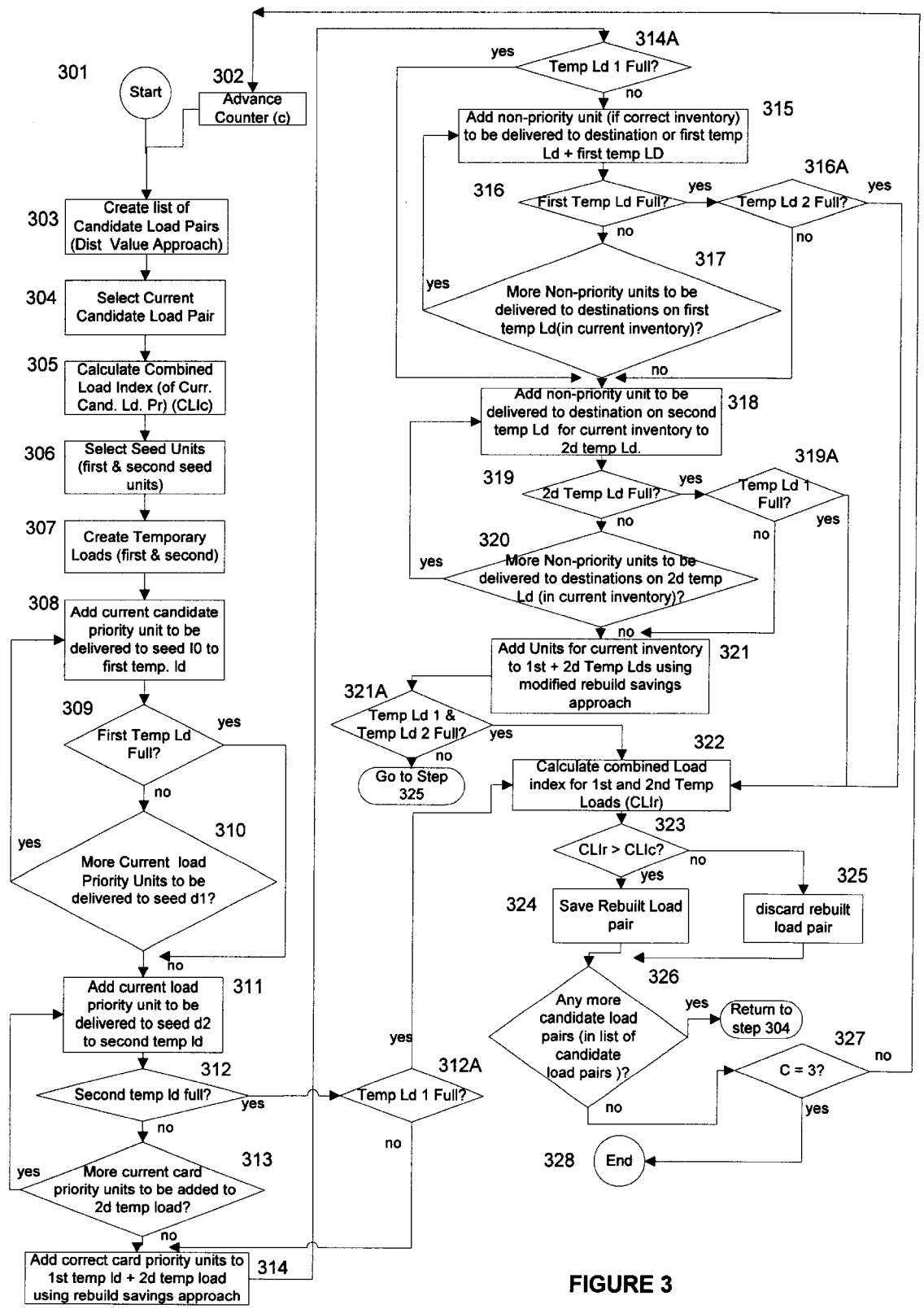
FIG. 3 is a flow diagram of a method for improving the quality of a pair of loads selected from a plurality of loads through rebuilding.

Referring now to FIG. 3, there is shown a flow diagram of a method 300 for improving the quality of a pair of loads selected from a plurality of loads through rebuilding. The plurality of loads comprise a plurality of units to be delivered from a terminal to a plurality of destinations within a geographic region on a plurality of delivery vehicles. A portion of the plurality of units comprise priority units. A current inventory comprises the plurality of units less any units that have been added to a temporary load, or a rebuilt load pair that has been saved in the plurality of loads. In step 301, a rebuilding type quality improvement pass is initiated. In step 302 the program advances a counter (C) by one, with the initial value of C=0 prior to step 302. In step 303 the program creates a list of candidate load pairs. The program examines the plurality of loads to determine: 1) which of the loads have priority units; and 2) of the loads having priority units, which loads have priority units to be delivered to destinations that are geographically close to each other. The loads having priority units to be delivered to destinations geographically close to each other comprise the candidate load pairs. In a particularly preferred embodiment of the invention, the list of candidate load pairs is created using a rebuilding distance value (DistValue) approach. For all loads in the plurality of loads having priority units, the program creates a list of all the possible permutations of load pairs. The program then calculates a DistValue for each of the load pairs according the formula:

$$(LongestLeg + 50 - DistBetweenLoads) + \frac{(10 \times LongestLeg)}{DistanceBetweenLoads + 1}$$

where DistanceBetweenLoads comprises the minimum distance between the two loads being considered (i.e., shortest of all the distances between each destination on the two loads); and LongestLeg comprises the higher value of the two longest distances that will be traveled between the destinations on the load pair being considered (excluding the first and final legs, i.e., the distances from the terminal to the first destinations and the distances from the final destinations back to the terminal respectively). This formula helps ensure the following happens. If LongestLeg>DistanceBetweenLoads then: 1) Savings tends to increase as DistanceBetweenLoads becomes smaller; 2) Savings has a positive slope becoming larger as L increases; and 3) when the ratio between LongestLeg and DistanceBetweenLoads is approximately constant, Savings increase as LongestLeg increases or as DistanceBetweenLoads decreases. If LongestLeg<DistanceBetweenLoads, then Savings tends to become negative quickly, remaining positive only at very small values of LongestLeg. In the second term of the formula, (10×LongestLeg)/(DistanceBetweenLoads+1), multiplication by a weighting factor (in this case 10) gives added importance to the LongestLeg of the loads. Adding the value 1 to the DistanceBetweenLoads prevents any attempt to divide by the value 0. The first term in the formula, (LongestLeg+50−DistBetweenLoads), is another measure of the qualities assessed in the second term of the formula, but helps differentiate pairs of loads where the ratio comprising the second term of the formula are approximately equal. Where the second terms are approximately equal, there is a risk that the routes traveled while delivering the units of the loads may be close to one another but do not involve particularly long legs between the destinations on the loads viz-a-viz other pairs of loads being considered. The program then orders the list of load pair permutations in descending order of the DistValue, the most promising load pairs comprising the load pairs with the highest DistValue. This ordered list of all the possible permutations of load pairs having priority units comprises the list of candidate load pairs.

In step 304, the program selects a candidate load pair from the list of candidate load pairs. The program starts with the first load pair in the list of candidate load pairs, and sequentially selects the next load pair in the list every time step 304 is repeated until a new list of candidate load pairs is created. The candidate load pair selected in step 304 comprises a current candidate load pair, and the priority units to be delivered in the current inventory to be delivered to destinations in the current candidate load pair comprise the current candidate priority units. In step 305, the program calculates a combined load index for the current candidate load pair (CLIc). The load index comprises a measure of the quality of loads, which may be related to a number of factors either individually or in combination. The factors may include, but are not limited to, the variance from a perfect load and the ratio of the sum odometer miles to the sum revenue miles for the load (OM/RM). Revenue miles comprise the maximum number of miles for which delivery will be reimbursed for a particular unit. Sum revenue miles (RM) comprise the sum of the revenue miles for each unit on a load. Odometer miles comprise the actual miles to be traveled while delivering a particular unit. In a particularly preferred embodiment of the invention, the load index is calculated with the following formula:

$$\frac{(FactLoaded + FactEmpty)}{TotalNcars} \times \frac{TotalRevenue}{(FactLoaded \times TotalLoaded) + (FactEmpty \times TotalEmpty)}$$

where: TotalLoaded comprises the cumulative mileage from the terminal to each destination on the loads in the sequence the units are to be delivered; TotalEmpty comprises the cumulative mileage from the final destination on the loads back to the terminal; FactLoaded comprises the cost per loaded mile; FactEmpty comprises the cost per empty mile; TotalNcars comprises the number of units on the loads; and TotalRevenue comprises the cumulative mileage from the terminal to each destination for which the shipper of the unit pays a negotiated rate.

In step 306, the program selects a first seed unit (su1) and a second seed unit (su2) from the current candidate load pair. The program selects su1 and su2 by determining which two priority units of the current candidate priority units are to be delivered to destinations geographically furthest from each other, preferably through the use of a distance matrix. The destination to which su1 is to be delivered comprises the first seed destination (sd1) and the destination to which su2 is to be delivered comprises the second seed destination (sd2). In step 307 the program creates a first temporary load (TempLd1) and a second temporary load (TempLd2) by assigning su1 to TempLd1 and su2 to TempLd2. In step 308, the program adds a unit to be delivered to sd1 from the current candidate priority units to TempLd1. In step 309 the program determines whether TempLd1 is full. If Yes, the program skips ahead to step 311. If No, the program determines in step 310 whether there are more current candidate priority units to be delivered to sd1. If Yes, the program returns to step 308. If No, the program adds a unit to be delivered to sd2 from the current candidate priority units to TempLd2. In step 312 the program determines whether TempLd2 is full. If Yes, the program determines in step 312A whether TempLd1 is full. If TemplLd1 is full, the program skips ahead to step 322. If TempLd1 is not full, the program skips ahead to step 314. If result of the determination in step 312 is No, the program determines in step 313 whether there are more current candidate priority units to be delivered to sd2. If Yes, the program returns to step 311. If No, in step 314 the program adds any remaining current candidate priority units to TempLd1 and TempLd2 using a rebuild savings approach. The rebuild savings approach is discussed further with reference to FIG. 4 below.

In step 314A, the program determines whether TempLd1 is full. If Yes, the program skips ahead to step 318. If No, in step 315 the program adds a non-priority unit to be delivered to a destination on TempLd1 from the current inventory to TempLd1. In step 316 the program determines whether TempLd1 is full. If Yes, the program determines in step 316A whether TempLd2 is full. If TempLd2 is full, the program skips ahead to step 322. If TempLd2 is not full, the program skips ahead to step 318. If the determination in step 316 is No, the program determines in step 317 whether there are more non-priority units to be delivered to a destination on TempLd1 in the current inventory. If Yes, the program returns to step 315. If No, in step 318 the program adds a non-priority unit to be delivered to a destination on TempLd2 from the current inventory to TempLd2. In step 319 the program determines whether TempLd2 is full. If Yes, the program determines in step 319A whether TempLd1 is full. If TempLd1 is full, the program skips to step 322. If TempLd1 is not full, the program skips ahead to step 321. If the determination in step 319 is No, the program determines in step 320 whether there are more non-priority units to be delivered to a destination on TempLd2 in the current inventory. If Yes, the program returns to step 318. If No, in step 321 the program adds units to TempLd1 and TempLd2 from the current inventory using a rebuild savings approach. The rebuild savings approach is discussed further with reference to FIG. 5 below. Upon completion of step 321, TempLd1 and TempLd2 comprise a rebuilt load pair.

In step 321A, the program determines whether both TempLd1 and TempLd2 are full. If No, the program skips to step 325. If Yes, in step 322 the program calculates the combined load index of the rebuilt load pair (CLIr). In step 323 the program determines whether CLIr>CLIc. If Yes, in step 324 the program saves the rebuilt load pair in the plurality of loads in place of the current candidate load pair. If No, in step 325 the program discards the rebuilt load pair and retains the current candidate load pair in the plurality of loads. In step 326 the program determines whether there are more candidate load pairs in the list of candidate load pairs created in step 303. If Yes, the program returns to step 304. If No, in step 327 the program determines whether C=3. If No, the program returns to step 302. If Yes, in step 328 the program ceases to rebuild the plurality of loads. While C having a value of 3 tells the program to cease rebuilding loads in a preferred embodiment, the invention is not limited to 3 passes through the rebuilding process. A lesser or greater number of passes through the rebuilding logic may be implemented.

Figure 4A:
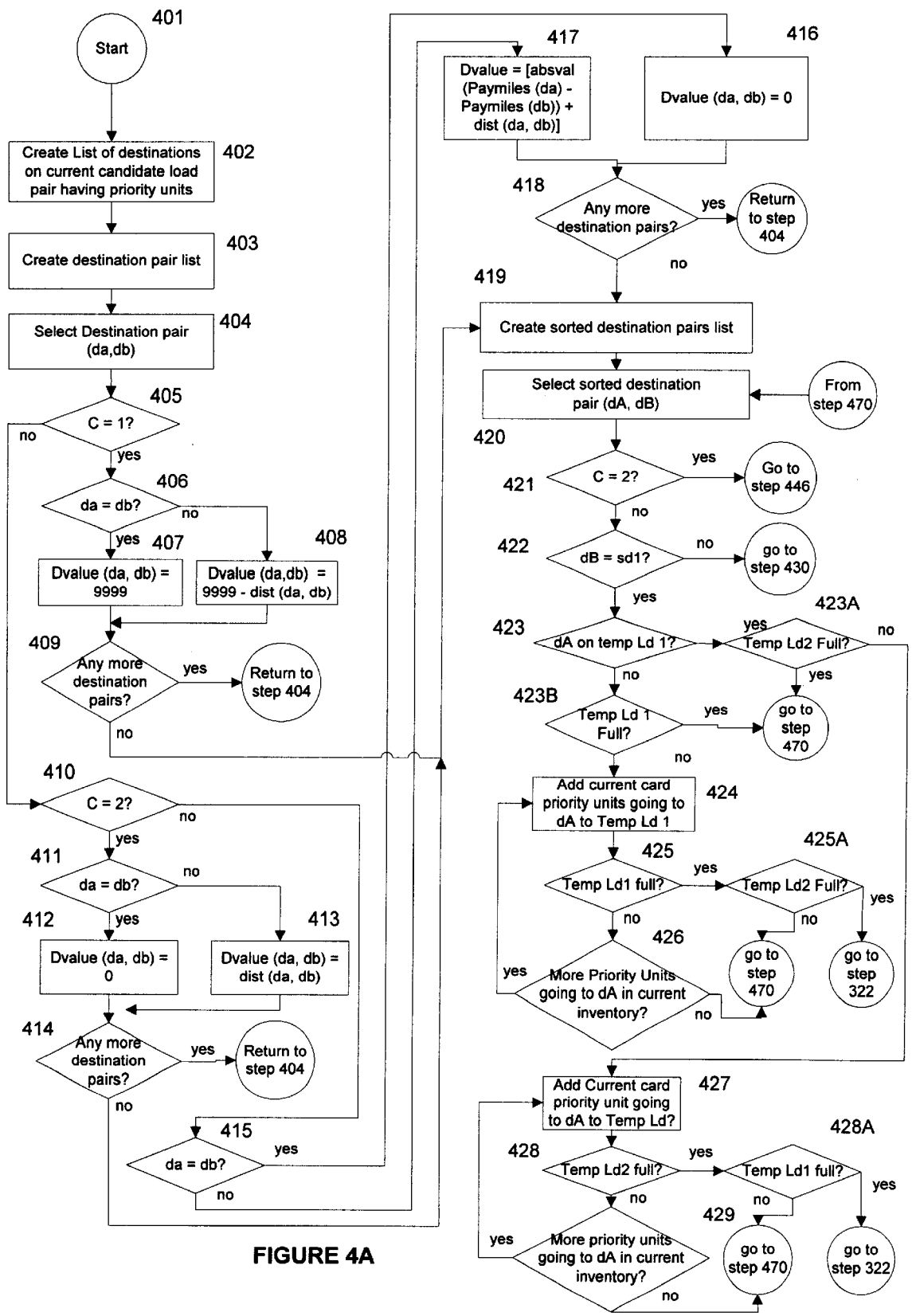
FIG. 4 is a flow diagram of a method for the adding of current candidate priority units using a preferred rebuild savings approach.
Figure 4B:
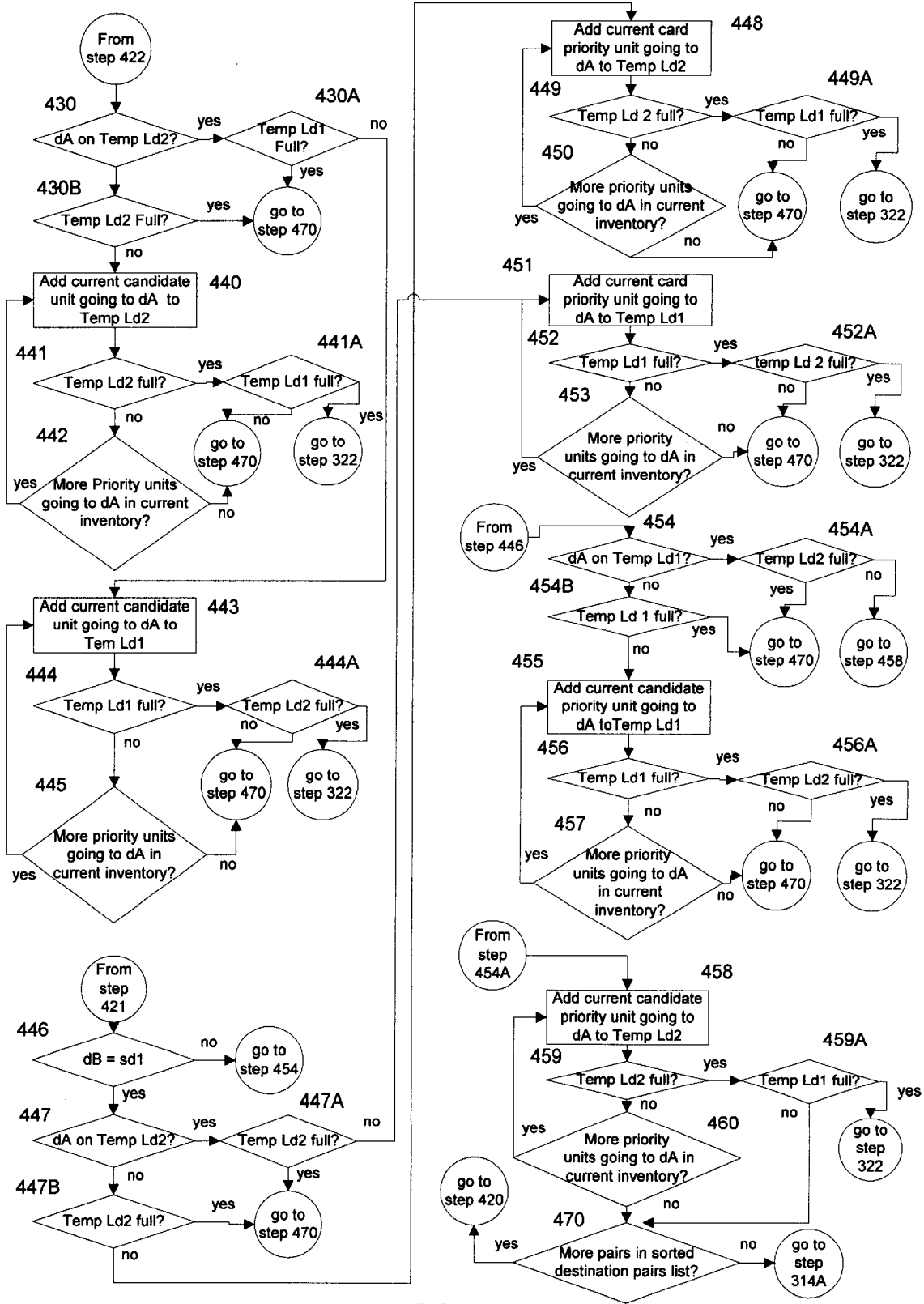

Referring now to FIG. 4, there is shown a flow diagram for the adding of current candidate priority units to TempLd1 and TempLd2 in step 314 above using a preferred rebuild savings approach. The rebuild savings approach attempts to improve the quality of a load by taking a pair of loads that are geographically near each other and rebuild them, first with priority units, and then with non-priority units (the latter part helping to keep the value of LongestLeg for a load from becoming too large). The rebuild savings approach starts in step 401. In step 402 the program creates a list of destinations on the current candidate load pair to which priority units are to be delivered. In step 403, the program creates a destination pair list by pairing each destination in the list of step 402 with sd1 and sd2, and compiling the pairs into a list. For example, if current candidate load 1 comprised units going to destination 1 (d1) and destination 2 (d2), and current candidate load 2 comprised units going to destination 3 (d3), the destination pair list would comprise any permutation of the list [(d1,sd1), (d1,sd2), (d2,sd1), (d2,sd2), (d3,sd1), (d3,sd2)]. In step 404, the program selects a destination pair (da,db) from the destination pair list. Each value of counter C indicates to the rebuild savings program how to assign savings values (Dvalue) to the destination pairs considered. The Dvalues are sorted in descending order. In step 405, the program determines whether C=1. If no, the program skips to step 410. If the determination in step 405 is yes, the program determines in step 406 whether da=db. If the determination in step 406 is yes, in step 407 the program assigns (da,db) a savings value (Dvalue(da,db)) of 9999, indicating that destination pair (da,db) is highly desirable. If the determination in step 406 is no, in step 408 the program calculates the distance between da and db (dist(da,db)), and sets Dvalue(da,db)= (9999−dist(da,db)), thereby giving higher value to nearby destinations. In step 409 the program determines whether there are any more destination pairs in the list of destination pairs. If yes, the program returns to step 404. If no, the program skips to step 419.

In step 410 the program determines whether C=2. If no, the program skips to step 415. If yes, the program determines in step 411 whether da=db. If yes, the program sets Dvalue(da,db)=0, giving destination pair (da,db) the lowest priority. If no, the program calculates dist(da,db) and sets Dvalue(da,db)=dist(da,db), giving far apart destinations higher value. In step 414, the program determines whether there are any more destination pairs in the list of destination pairs. If yes, the program returns to step 404. If no, the program skips to step 419. In step 415 the program determines whether da=db. If the determination in step 415 is yes, the program sets Dvalue(da,db)=0. If the determination in step 415 is no, the program calculates dist(da,db), abs(da, db)(abs(da,db) comprising the absolute value of the quantity (paymiles(da)−paymiles(db))), and sets Dvalue(da,db)=(abs (da,db)+dist(da,db). Setting Dvalue(da,db)=(abs(da,db)+ dist(da,db)) tends to favor destination pairs following a straight line path from the terminal. In step 418, the program determines whether there are more destination pairs in the list of destination pairs. If Yes, the program returns to step 404. If No, in step 419 the program creates a sorted destination pairs list by ordering the list of destination pairs created in step 403 in descending order of Dvalue.

In step 420, the program selects a sorted destination pair (dA,dB) from the list of sorted destinations pairs created in step 419. The first time step 420 is performed the program selects the first (dA,dB) appearing in the sorted list of destination pairs, and sequentially selects the next (dA,dB) in the sorted list of destination pairs each time step 420 is repeated. In step 421, the program determines if C=2. If Yes, the program skips to step 446. If No, the program determines in step 422 whether dB=sd1. If No, the program skips to step 430. If Yes, the program determines in step 423 whether dA is on TempLd1. If Yes, the program determines in step 423A whether TempLd2 is full. If TempLd2 is full, the program skips to step 470. If TempLd2 is not full, the program skips to step 427. If the determination in step 423 is No, the program determines in step 423B whether TempLd1 is full.

If Yes, the program skips to step 470. If No, in step 424 the program adds a priority unit going to dA from the current inventory to TempLd1. In step 425 the program determines whether TempLd1 is full. If yes, the program determines in step 425A whether TempLd2 is full. If TempLd2 is full the program skips to step 322. If TempLd2 is not full, the program skips to step 470. If the determination in step 425 is No, the program determines in step 426 whether there are more priority units going to dA in the current inventory. If Yes, the program returns to step 424. If No, the program skips to step 470.

In step 427, the program adds a priority unit going to dA from the current inventory to TempLd2. In step 428 the program determines whether TempLd2 is full. If Yes, the program determines in step 428A whether TempLd1 is full. If TempLd1 is full, the program skips to step 322. If TempLd1 is not full, the program skips to step 470. If the determination in step 428 is No, the program determines in step 429 whether there are more priority units going to dA in the current inventory. If Yes, the program returns to step 427. If No, the program skips to step 470. In step 430, the program determines whether any units on TempLd2 are going to dA. If Yes, the program determines in step 430A whether TempLd1 is full. If TempLd1 is full, the program skips to step 470. If TempLd1 is not full, the program skips to step 443. If the determination in step 430 is No, the program determines in step 430B whether TemplLd2 is full. If TempLd2 is fill, the program skips to step 470. If TempLd2 is not full, in step 440 the program adds a priority unit going to dA from the current inventory to TempLd2. In step 441 the program determines whether TempLd2 is full. If Yes, the program determines in step 441A whether TempLd1 is full. If TempLd1 is full the program skips to step 322. If TempLd1 is not full the program skips to step 470. If the determination in step 441 is No, the program determines in step 442 whether there are more priority units going to dA in the current inventory. If Yes, the program returns to step 440. If No, the program skips to step 470.

In step 443 the program adds a priority unit going to dA from the current inventory to TempLd1. In step 444, the program determines whether TempLd1 is full. If Yes, the program determines in step 444A whether TempLd2 is full. If TempLd2 is full, the program skips to step 322. If TempLd2 is not full, the program skips to step 470. If the determination in step 444 is No, the program determines in step 445 whether there are more priority units going to dA in the current inventory. If Yes, the program returns to step 443. If No, the program skips to step 470. In step 446 the program determines whether dB=sd1. If No, the program skips to step 454. If Yes, the program determines in step 447 whether any units on TempLd2 are going to dA. If Yes, the program determines in step 447A whether TempLd2 is full. If TempLd2 is full, the program skips to step 470. If TempLd2 is not full, the program skips to step 448. If the determination in step 447 is No, the program determines in step 447B whether TempLd1 is full. If Yes, the program skips to step 470. If No, in step 451 the program adds a priority unit going to dA from the current inventory to TempLd1. In step 449 the program determines whether TempLd2 is full. If Yes, the program determines in step 449A whether TempLd1 is full. If TempLd1 is full, the program skips to step 322. If TempLd1 is not full, the program skips to step 470. If the determination in step 449 is No, the program determines in step 450 whether there are more priority units going to dA in the current inventory. If Yes, the program returns to step 448. If No, the program skips to step 470.

In step 451, the program adds a priority unit going to dA from the current inventory to TempLd1. In step 452 the program determines whether TempLd1 is full. If Yes, the program determines in step 452A whether TempLd2 is full. If TempLd2 is full, the program skips to step 322. If TempLd2 is not full, the program skips to step 470. If the determination in step 452 is No, the program determines in step 453 whether there are more priority units going to dA in the current inventory. If Yes, the program returns to step 451. If No, the program skips to step 470. In step 454, the program determines whether there are any units on TempLd1 going to dA. If yes, the program determines in step 454A whether TempLd2 is full. If TempLd2 is full, the program skips to step 470. If TempLd2 is not full, the program skips to step 458. If the determination in step 454 is No, the program determines in step 454B whether TempLd1 is full. If Yes, the program skips to step 470. If No, in step 455 the program adds a priority unit going to dA from the current inventory to TempLd1. In step 456 the program determines whether TempLd1 is full. If Yes, the program determines in step 456A whether TempLd2 is full. If TempLd2 is full, the program skips to step 322. If TempLd2 is not full, the program skips to step 470. If the determination in step 456 is No, the program determines in step 457 whether there are more priority units going to dA in the current inventory. If Yes, the program returns to step 455. If No, the program skips to step 470.

In step 458 the program adds a priority unit going to dA from the current inventory to TempLd2. In step 459 the program determines whether TempLd2 is full. If yes, the program determines in step 459A whether TempLd1 is fill. If TempLd1 is full, the program skips to step 322. If TempLd1 is not full, the program skips to step 470. If the determination in step 459 is No, the program determines in step 460 whether there are more priority units going to dA in the current inventory. If Yes, the program returns to step 458. If No, the program determines in step 470 whether there is another destination pair in the sorted destination pairs list to be considered. If Yes, the program returns to step 420. If No, the program ceases adding priority units to TempLd1 and TempLd2 using the rebuild savings approach and advances to step 314A.

Figure 5:
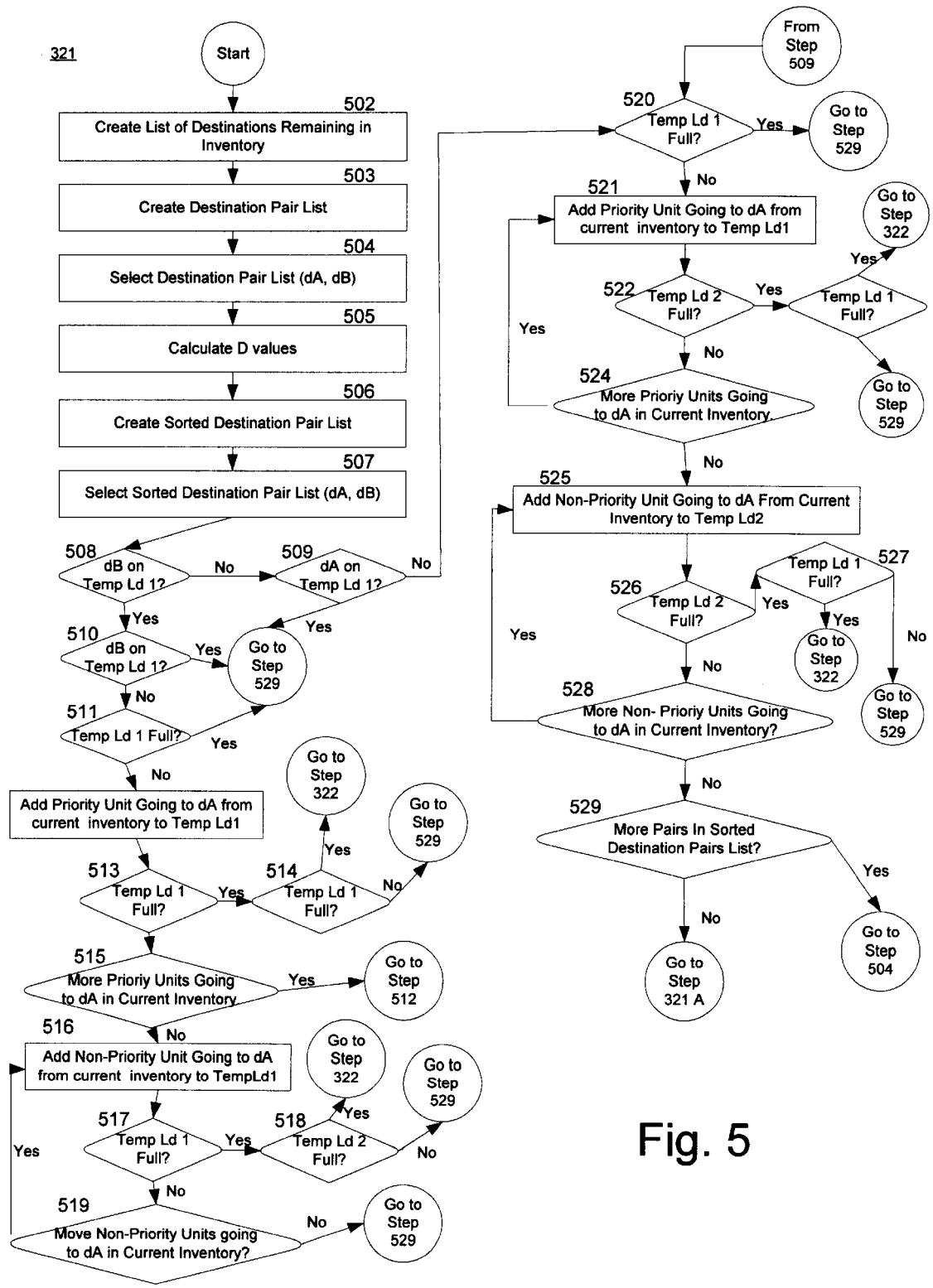
FIG. 5 is a flow diagram of a method for the adding of units from the current inventory using a preferred form of the rebuild savings approach.

Referring now to FIG. 5, there is shown a flow diagram for the adding of units from the current inventory to TempLd1 and TempLd2 in step 321 of method 300 using a preferred form of the rebuild savings approach. The rebuild savings approach is initiated in step 501. In step 502 the program creates a list of destinations to which units remaining in the current inventory are to be delivered. In step 503, the program creates a destination pair list by pairing each destination in the list of step 502 with sd1 and sd2, and compiling the pairs into a list. For example, if there were units remaining in the current inventory going to destinations 5 (d5) and 6 (d6), the destination pair list would comprise any permutation of the list [(d5,sd1), (d5,sd2), (d6,sd1), (d6,sd2)]. In step 504, the program selects a destination pair (da,db) from the destination pair list. In step 505, the program calculates Dvalues for each (da,db) appearing in the destination pair list using the methodology described in with reference to steps 401–419 of the rebuild savings approach above.

In step 506 the program creates a sorted destination pairs list by ordering the list of destination pairs created in step 503 in descending order of Dvalue. In step 507, the program selects a sorted destination pair (dA,dB) from the list of sorted destinations pairs created in step 506. The first time step 507 is performed the program selects the first (dA,dB)

appearing in the sorted list of destination pairs, and sequentially selects the next (dA,dB) in the sorted list of destination pairs each time step 507 is repeated. In step 508, the program determines whether any units on TempLd1 are going to dB. If No, the program determines in step 509 whether there are any units on TempLd2 going to dA. If Yes, the program skips to step 529. If No, the program skips to step 520. If the determination in step 508 is Yes, the program determines in step 510 whether there are any units on TempLd1 going to dA. If Yes, the program skips to step 529. If No, the program determines in step 511 whether TempLd1 is full. If Yes, the program skips to step 529. If No, in step 512 the program adds a priority unit going to dA from the current inventory to TempLd1.

In step 513 the program determines whether TempLd1 is full. If Yes, the program determines in step 514 whether TempLd2 is full. If TempLd2 is fill, the program skips to step 322. If TempLd2 is not full, the program skips to step 529. If the determination in step 513 is No, the program determines in step 515 whether there are more priority units going to dA in the current inventory. If Yes, the program returns to step 512. If No, in step 516 the program adds a non-priority unit going to dA from the current inventory to TempLd1. In step 517 the program determines whether TempLd1 is full. If Yes, the program determines in step 518 whether TempLd2 is full. If TempLd2 is full, the program skips to step 322. If TempLd2 is not full, the program skips to step 529. If the determination in step 517 is No, the program determines in step 519 whether there are more non-priority units going to dA in the current inventory. If Yes, the program returns to step 516. If No, the program skips to step 529.

In step 520 the program determines whether TempLd2 is full. If Yes, the program skips to step 529. If No, in step 521 the program adds a priority unit going to dA from the current inventory to TempLd2. In step 522 the program determines whether TempLd2 is full. If Yes, the program determines in step 523 whether TempLd1 is full. If TempLd1 is full, the program skips to step 322. If TempLd1 is not full, the program skips to step 529. If the determination in step 522 is No, the program determines in step 524 whether there are more priority units going to dA in the current inventory. If Yes, the program returns to step 521. If No, in step 525 the program adds a non-priority unit going to dA form the current inventory to TempLd2. In step 526 the program determines whether TempLd2 is full. If Yes, the program determines in step 527 whether TempLd1 is full. If TempLd1 is full, the program skips to step 322. If TempLd1 is not full, the program skips to step 529. If the determination in step 526 is No, the program determines in step 528 whether there are more non-priority units going to dA in the current inventory. If Yes, the program returns to step 525. If No, the program determines in step 529 whether there is another destination pair in the sorted destination pairs list to be considered. If Yes, the program returns to step 504. If No, the program ceases adding units to TempLd1 and TempLd2 using the rebuild savings approach and advances to step 321A.

Figure 6:
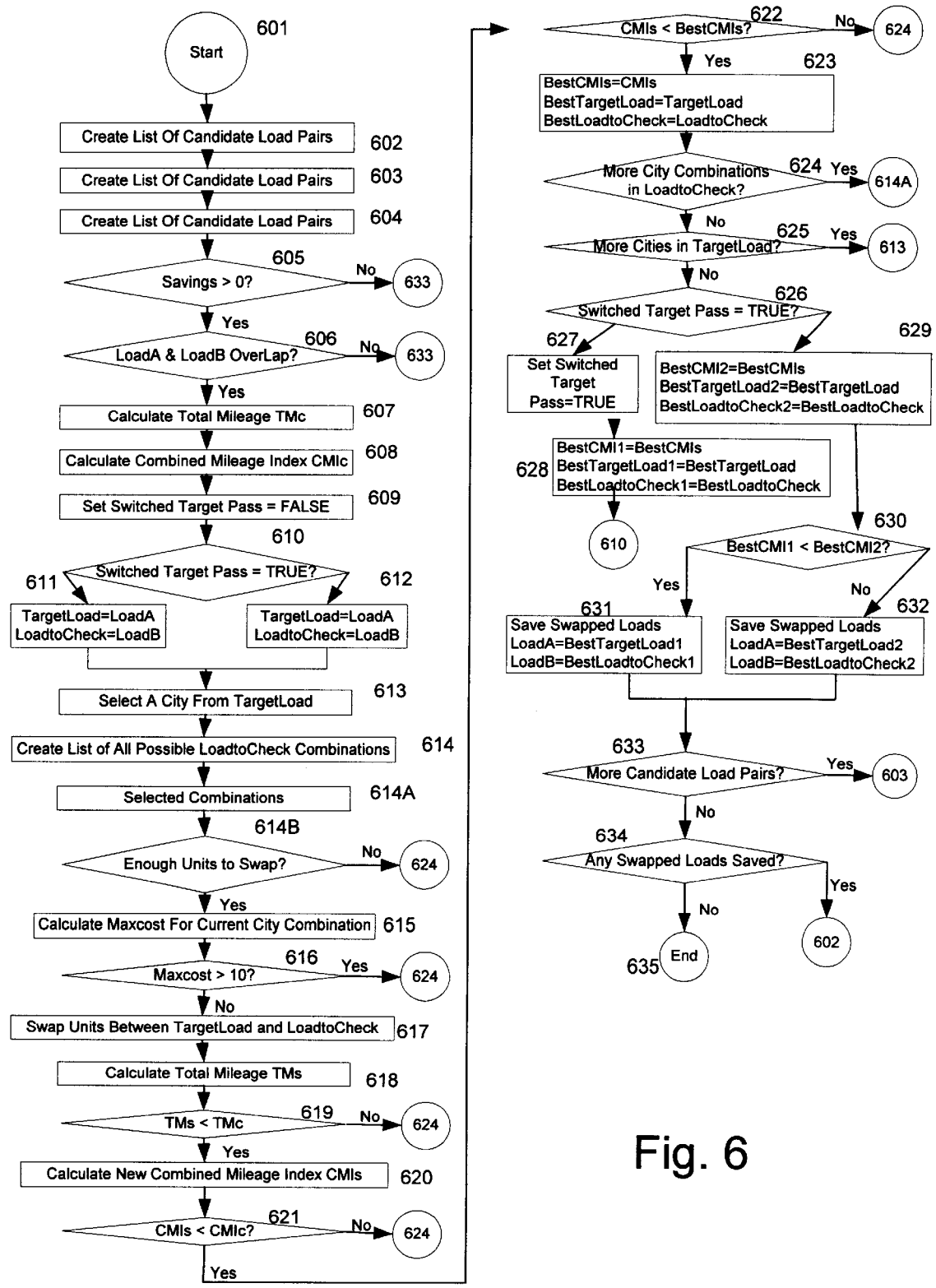
FIG. 6 is a flow diagram of a method for improving the mileage quality of a pair of loads selected from a plurality of loads through destination swapping.

Referring now to FIG. 6, there is shown a flow diagram for a method 600 of improving the mileage quality of a pair of loads selected from a plurality of loads through destination swapping. The destination swapping process attempts to improve the quality of a load by reducing the number of miles traveled while delivering the units on the load. The plurality of loads have been created from a plurality of units to be delivered from a terminal to a plurality of destinations within a geographic region on a plurality of delivery vehicles. A subset of the plurality of units may comprise priority units. The passes in the destination swapping process attempt to improve the mileage between pairs of loads (LA, LB) by swapping units between them. The program performs a one to many swap procedure. And it will attempt to perform the swaps both ways, i.e., from LA to LB and then from LB to LA. The first pass will assign TargetLoad=LA and LoadtoCheck=LB. The TargetLoad is the load where one destination is swapped at a time. LoadtoCheck is the load where one to many destinations can be swapped, i.e., all possible destination combinations are selected as potential swaps.

For example, LA has four destinations (da1, da2, da3, da4) and LB has three destinations (db1, db2, db3). During the first pass, TargetLoad=LA and LoadtoCheck=LB. The first target destination is da1. The possible destination combinations from LoadtoCheck are: (db1), (db2), (db3), (db1, db2), (db1,db3), (db2,db3), (db1,db2,db3). Each combination is selected one at a time. The first check is to determine if the current combination has enough units compared to the target destination to perform a swap. Where the units comprise automobiles, there need not be the same number of units because whether or not the total units may be swapped will depend on what types of models are being swapped. A large unit may require two or more small units in order for the two loads to form complete loads. If the current combination has enough units then the swap is attempted. If successful the load quality figures are calculated and compared against the original loads. If quality figures are better than the original, it then compares to the current best swap. If better than the current best swap these swapped loads are saved as the new current best swap. If there are more combinations to check (with the same target destination) the program goes back and attempts to swap with the next combination. If no more combinations are left, the program checks to see if there are more destinations in the TargetLoad to check. If so the program goes back and selects the next destination and makes that the current target destination and begins again the destination combination swaps. Once all the destinations in the TargetLoad are checked, the program checks to see whether the second pass has been initiated. If not, the program first saves the current best swapped loads as the first set of best swapped loads, and will set TargetLoad=LB and LoadtoCheck=LA and perform the above swapping logic. At the end of the second pass the program saves the current best swapped loads as the second set of best swapped loads. It compares the first set of best swapped loads to the second set of best swapped loads and saves the overall best in the plurality of loads (overwriting the original LA and LB with the new LA and LB)

In step 601 the mileage improvement process is initiated. In step 602 the program creates a list of candidate load pairs, the candidate load pairs comprising all possible pairs of loads in the plurality of loads, including loads having no priority units. In step 603 the program selects a current candidate load pair (LA, LB) from the list of candidate load pairs created in step 602 for consideration. The program starts with the first load pair appearing in the list, and sequentially selects the next pair in the list every time step 603 is repeated until a new list of candidate load pairs is created. In step 604 the program calculates the savings (SavingsAB) associated with the current candidate load pair. In preferred embodiments of the invention, SavingsAB is calculated using a modified savings approach described in connection with FIG. 6A below. In step 605, the program determines whether SavingsAB is greater than zero. If not greater than zero, the program skips ahead to step 633. If greater than zero, program determines in step 606 whether LA and LB overlap. When the destinations to which units on LA and LB are mapped in a Cartesian coordinate system (x,y) with the terminal at the origin, there is route overlap when the following are true: 1) the minimum x coordinate of LA within the range of all LB x coordinates or the minimum x coordinate of LB within the range of all LA x coordinates; and 2) the minimum y coordinate of LA within the range of all LB y coordinates or the minimum y coordinate of LB within the range of all LA y coordinates. If the program determines in step 606 that LA and LB do not overlap, the program skips ahead to step 633. If LA and LB do overlap, the program proceeds to step 607.

In step 607, the program calculates the total mileage for the current candidate load pair (TMc). In step 608, the program calculates a combined mileage index of the current candidate load pair (CMIc). The combined mileage index is calculated using the formula: (LA(Loaded mile+ (factor*Empty miles))+LB(Loaded miles+ (factor*Emptymiles)), where factor is equal to the quotient FactEmpty/FactLoaded). In step 609 the program sets a switched target pass flag equal to false. In step 610 the program determines the switched target pass flag equals true. If true, the program skips ahead to step 612. If false, the program in step 611 sets the variable TargetLoad equal to LA, sets the variable LoadtoCheck equal to LB, and skips ahead to step 613. In step 612, the program sets TargetLoad equal to LB, sets LoadtoCheck equal to LA, and proceeds to step 613. In step 613, the program selects a destination from the TargetLoad, the destination selected comprising the target destination. In step 614, the program creates a list of all the possible combinations of destinations in LoadtoCheck. In step 614A the program selects for consideration the next possible combination from the list of all the possible combinations created in step 614. In step 614B, the program determines whether the destinations in the combination selected in 614A have enough units to be delivered to them in order to perform a swap. If the determination in step 614B is no, the programs skips to step 624. If the determination in step 614B is yes, the program proceeds to step 615.

In step 615, the program calculates the maximum cost (Maxcost) of swapping the units destined for the target destination to the LoadtoCheck, and swapping the units destined for the swap destination to the TargetLoad. In a preferred embodiment of the invention, Maxcost comprises:

$$tc1+tc2-tr1-tr2,$$

where tc1 comprises the mileage added to the TargetLoad by adding the swap destination units and removing the target destination units; tc2 comprises the mileage added to the LoadtoCheck by adding the target destination units and removing the swap destination units; tr1 comprises the mileage reduced on the TargetLoad by removing the target destination units; and tr2 comprises the mileage reduced on the LoadtoCheck by removing the swap destination units. In step 616 the program determines whether Maxcost>10. While a maximum value of 10 is established for Maxcost in preferred embodiments of the invention, lesser or greater values may be used. If Maxcost>10, the program skips to step 624.

If Maxcost<10, in step 617 the program swaps units between the TargetLoad and the LoadtoCheck, placing the units destined for the target destination on the LoadtoCheck and the units destined for the swap destination on the TargetLoad. The loads with swapped units comprise TargetLoads and LoadtoChecks respectively. In step 618, the program calculates the total mileage of the swapped loads (TMs). In step 619, the program determines whether TMs is less than TMc. If TMs is not less than TMc, the program skips ahead to step 624. Otherwise, the program in step 620 calculates the combined mileage index of the swapped loads (CMIs). In step 621, the program determines whether CMIs is less than CMIc. If CMIs is not less than CMIc, the program discards TargetLoads and LoadtoChecks and skips ahead to step 624. If CMIs is less than CMIc, the program determines in step 622 whether CMIs is less than the variable BestCMIs, BestCMIs having a value of zero upon initiation of method 600. If CMIs is not less than BestCMIs, the program skips ahead to step 624. If CMIs is less than BestCMIs, the program in step 623 sets BestCMIs equal to CMIs, sets the variable BestTargetLoad equal to TargetLoads, and sets the variable BestLoadtoCheck equal to LoadtoChecks.

In step 624, the program determines whether there are more destinations to consider in the list of LoadtoCheck destinations. If the determination in step 624 is yes, the program returns to step 614A. If the determination in step 624 is no, the program determines in step 625 whether there are more destinations to consider on the TargetLoad. If the determination in step 625 is yes, the program returns to step 613. If the determination in step 625 is no, the program determines in step 626 whether its switched target pass flag equals True. If true, the program skips ahead to step 629. If false, the program in step 627 sets the switched target pass flag equal to True and proceeds to step 628. In step 628, the program sets the variable BestCMI1 equal to BestCMIs, sets the variable BestTargetLoad1 equal to BestTargetLoad, sets the variable BestLoadtoCheck1 equal to BestLoadtoCheck, and returns to step 610 above. In step 629, the program sets the variable BestCMI2 equal to BestCMIs, sets the variable BestTargetLoad2 equal to BestTargetLoad, sets the variable BestLoadtoCheck2 equal to BestLoadtoCheck, and proceeds to step 630.

In step 630, the program determines whether BestCMI1 is less than BestCMI2. If yes, the program in step 631 saves the swapped loads in the plurality of loads sets LA equal to BestTargetLoad1, sets LB equal to BestLoadtoCheck1, and skips ahead to step 633. If the determination in step 630 is no, the program saves the swapped loads in the plurality of loads, sets LA equal to BestTargetLoad2, sets LB equal to BestLoadtoCheck2, and proceeds to step 633. In step 633, the program determines whether there are more candidate load pairs in the list of candidate load pairs. If the determination in step 633 is yes, the program returns to step 603 above. If the determination in step 633 is no, the program determines in step 634 whether any swapped loads have been saved. If yes, the program returns to step 602. If no, the program ceases to rebuild the plurality of loads using the mileage improvement process.

Figure 6A:
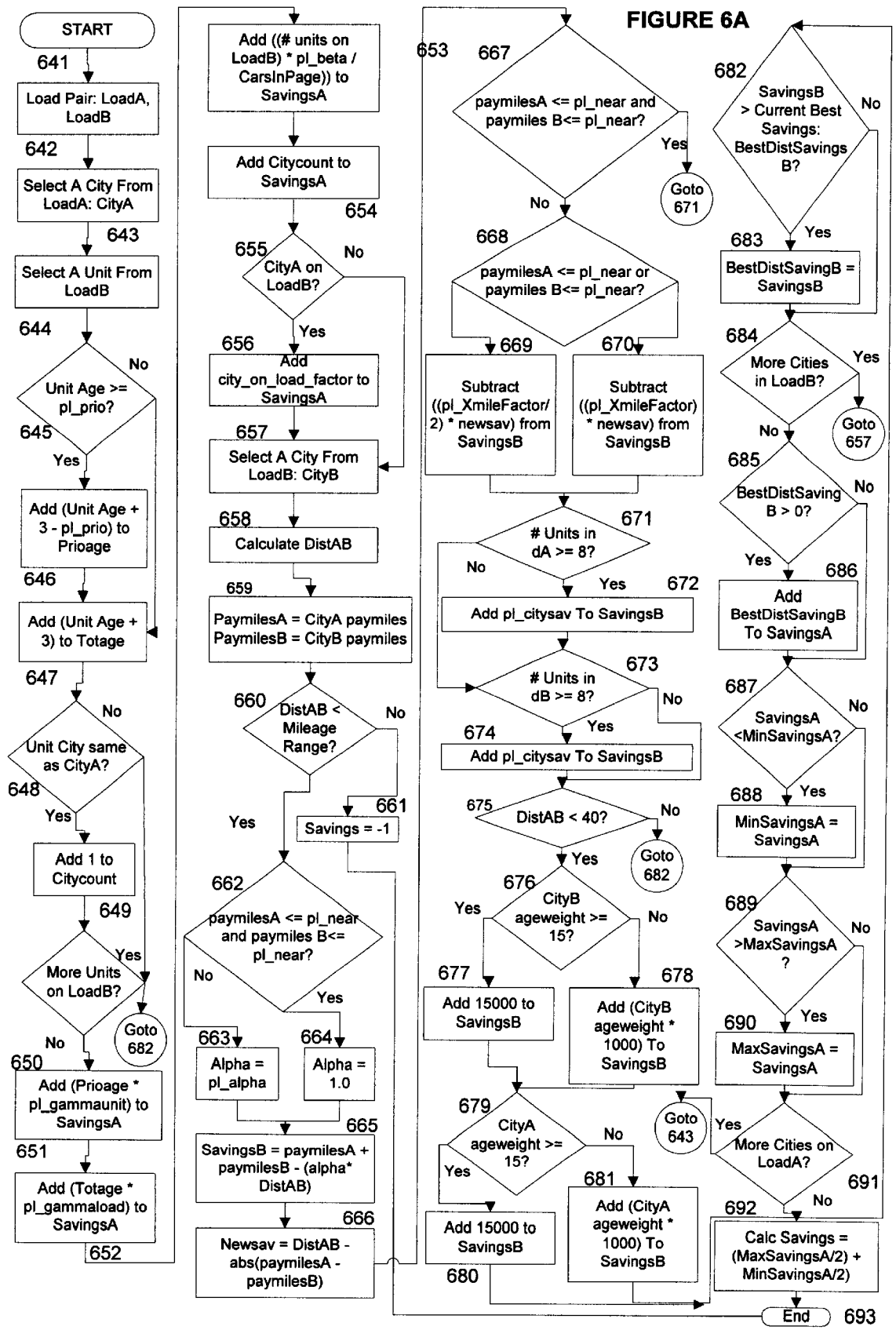

Referring now to FIG. 6A, there is shown a modified savings approach for calculating the savings associated with a particular load pair in accordance with preferred embodiments of the invention. In step 641, the process is initiated. In step 642, the program selects a load pair for consideration, the loads comprising Load A (LA) and Load B (LB). In step 643, the program selects a destination on LA for consideration (dA). In step 644, the program selects a unit on LB (uB). In step 645, the program determines whether the priority of uB is greater than or equal to a minimum value, the minimum value comprising pl_prio. If the determination in step 645 is no, the program skips ahead to step 647. If the determination in step 645 is yes, the programs adds the following sum to the variable Prioage: ((uB age in days)+ 3−pl_prio), and then proceeds to step 647, Prioage having a value of zero when the process is initiated.

In step 647, the program adds the following sum to the variable Totage: ((uB age in days)+3), and then proceeds to step 648, Totage having a value of zero when the process is initiated. In step 648, the program determines whether the destination to which uB is to be delivered is the same destination as dA. If no, the program skips ahead to step 650. If the determination in step 648 is yes, the program adds the value of 1 to the variable Citycount, Citycount having a value of zero when the modified savings process is initiated. In step 650, the program determines whether there are more units on LB. If yes, the program returns to step 644 above. If no, the program in step 651 adds the following product to the variable SavingsA: (Prioage×pl_gammaunit), where pl_gammaunit comprises a weighting factor for priority units. In step 652, the program adds the following product to SavingsA: (Totage×pl_gammaload), where pl_gammaload comprises a weighting factor for the sum of unit ages for the load. In step 653, the program adds the following quotient to SavingsA: ((number of units on LB)×pl_beta)/UnitsInPage, where pl_beta comprises a weighting factor for the fullness of a load, i.e. let pl_beta=1, then an 8 unit load on a potential 10 unit configuration will have a fullness of 0.8. In step 654, the program adds the value of Citycount to SavingsA. In step 655, the program determines whether any units on LB are to be delivered to dA. If no, the program skips ahead to step 657. If yes, the program adds a destination already on load factor to SavingsA.

In step 657, the program selects a destination to which units are to be delivered on LB (dB). In step 658, the program calculates the distance between dA and dB (DistAB). In step 659, the program sets the variable PaymilesA equal to the paymiles associated with dA, and sets the variable PaymilesB equal to the paymiles associated with dB. In step 660, the program determines whether DistAB is less than a minimum value referred to as the Mileage Range. If DistAB is less than the Mileage Range, the program skips ahead to step 662. If DistAB is not less than the Mileage Range, the program in step 661 sets the variable Savings equal to −1, and skips ahead to step 693. In step 662, the program determines whether both PaymilesA and PaymilesB are less than a minimum value referred to as pl_near. If yes, the program sets the variable Alpha equal to the number 1. If the determination in step 662 is no, the program skips to step 663 where it sets Alpha equal to the value of pl_alpha, where pl_alpha comprises a route shaping factor. In step 665, the program sets the variable SavingsB equal to the following sum: (PaymilesA+PaymilesB−(Alpha×DistAB)). In step 666, the program sets the variable Newsav equal to the following sum: (DistAB−absval (PaymilesA−PaymilesB)).

In step 667, the program determines whether both PaymilesA and PaymilesB are less than or equal to pl_near. If yes, the program skips to step 671. If no, the program determines in step 668 whether either PaymilesA or PaymilesB are less than or equal to pl_near. If the determination in step 668 is yes, the program subtracts the following product from SavingsB: ((pl_crossmilefactor/2)×Newsav), where pl_crossmilefactor comprises a weighting factor for cross miles. Cross miles are a measure of how far the route is from a straight line. Cross miles are calculated with the following formula: (Loaded miles—the farthest paymiles on the load). Smaller cross miles are more desirable. If the determination in step 668 is no, the program proceeds to step 670 where it subtracts the following product from SavingsB: (pl_crossmilefactor×Newsav). In step 671, the program determines whether the number of units in dA is greater than or equal to a maximum number, the number being 8 where the units comprise automobiles. If the determination in step 671 is no, the program skips to step 673. If the determination in step 671 is yes, the program adds the value of pl_citysav to SavingsB, pl_citysav comprising a weighting factor for dense destinations. In step 673, the program determines whether the number of units in dB is greater than or equal to a maximum number, the number 8 where the units comprise automobiles. If the determination in step 673 is no, the program skips to step 675. If the determination in step 673 is yes, the program adds the value of pl_citysav to SavingsB.

In step 675, the program determines whether DistAB is less than a maximum number, 40 miles when the units comprise automobiles. If the determination in step 675 is no, the program skips to step 682. If the determination in step 675 is yes, the program determines whether the ageweight of dB is greater than or equal to a minimum number, 15 where units comprise automobiles. Ageweight comprises the sum of age for units in dB. If the determination in step 676 is yes, the program in step 677 adds 15,000 to SavingsB and then skips to step 679. If the determination in step 676 is no, the program skips to step 678 where its adds the following product to SavingsB: ((ageweight of dB)×1000). In step 679, the program determines whether the ageweight of dA is greater than or equal to minimum number, 15 where the units comprise automobiles. If the determination in step 679 is yes, the program in step 680 adds 15,000 to SavingsB and then skips to step 682. If the determination in step 679 is no, the program skips to step 681 where it adds the following product to SavingsB ((ageweight of dA)×1000). In step 682, the program determines whether value of SavingsB is greater than the value of variable BestDistSavingsB, BestDistSavingsB having a value of zero upon initiation of the process in step 641. If no, the program skips to step 684. If yes, the program sets BestDistSavingsB equal to Savings B. In step 684, the program determines whether the are more destinations to be considered on LB. If yes, the program returns to step 657. If no, the program proceeds to step 685.

In step 685, the program determines whether BestDistSavingsB is greater than zero. If not greater than zero, the program skips to step 687. If greater than zero, the program adds BestDistSavingsB to SavingsA. In step 687, the program determines whether SavingsA is less than MinSavingsA, MinSavingsA having a high value when the process is initiated in step 641. If the determination in step 687 is no, the program skips to step 689. If the determination in step 687 is yes, the program sets MinSavingsA equal to SavingsA. In step 689, the program determines whether SavingsA is greater than the value of variable MaxSavingsA, MaxSavingsA having a value of zero upon initiation of the process in step 641. If the determination in step 689 is no, the program skips to step 691. If the determination in step 689 is yes, the program sets MaxSavingsA equal to SavingsA. In step 691, the program determines whether there are more destinations to consider on LA. If yes, the program returns to step 643. If no, the program calculates the variable Savings for load pair LA and LB according to the following sum: (MaxSavingsA/2)+(MinSavingsA/2). In step 693 the modified savings process ends.

Figure 7:
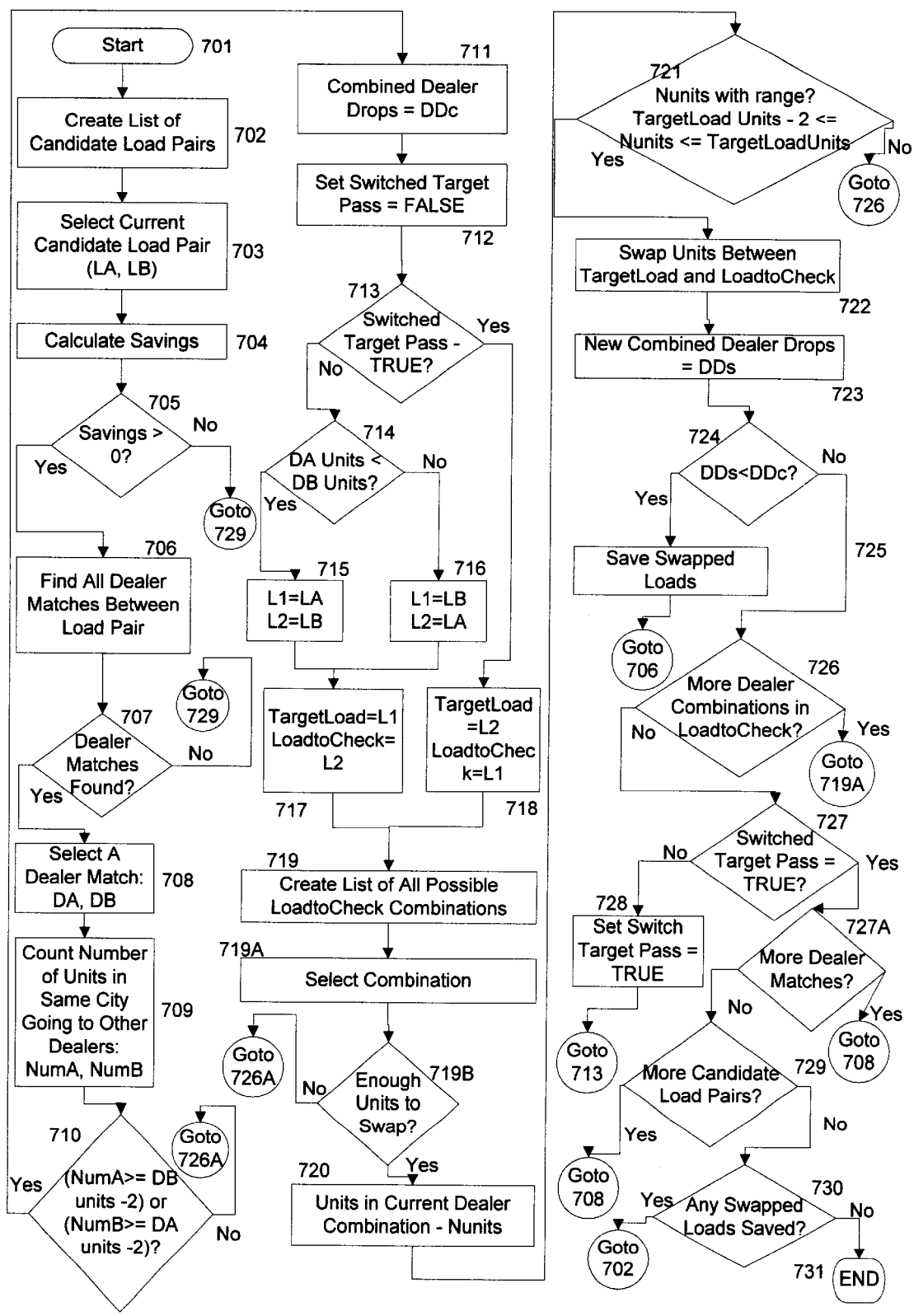
FIG. 7 is a flow diagram of a method for improving the number of drops per load in a plurality of loads through destination swapping.

Referring now to FIG. 7, there is shown a flow diagram for a method 700 of improving the number of drops per load in a plurality of loads through destination swapping. The plurality of loads comprise a plurality of units to be delivered from a terminal to a plurality of destinations within a geographic region on a plurality of delivery vehicles. A portion of the plurality of units may comprise priority units.

The destination swapping process attempts to improve the number of dealer drops between pairs of loads (LA,LB) by swapping units between LA and LB. The program performs a one to many swap procedure, and will attempt to perform the swaps both ways (i.e., from LA to LB and then from LB to LA). The first pass sets the TargetLoad equal to the load with the fewer number of units in matching destinations, say LA, and sets LoadtoCheck equal to the load with the higher number of units in matching destinations, say LB. The TargetLoad is the load where units destined for a single destination are swapped at a time. LoadtoCheck is the load where units destined for one or more destinations may be swapped. Only those destinations in the same matching city are considered for a swap.

For example, say LA has four destinations (da1,da2,da3, da4) and LB has three destinations (db1,db2,db3). During the first pass, TargetLoad=LA and LoadtoCheck=LB. Also, let CityA be the city for da1, da2, db1, db2, and db3, let da1=db2, and let da1=db2 be the only matching destination between LA and LB. The possible destination combinations from LoadtoCheck are: [(db1),(db3),(db1,db3)]. One combination is selected at a time. The first check is to determine if the current combination has enough units compared to the target destination to perform a swap. Where the units comprise automobiles, there need not be an equal number of units because the types of models being swapped will effect whether the units may be swapped. A large unit may require two or more small units in order for the two swapped loads to remain full or complete loads. If the current combination has enough units then a swap is attempted. If successful the combined number of drops are compared to the number of drops in the original pair of loads. If the number of drops have been reduced, the swapped loads are saved in the plurality of loads. The program continues with the same load pair, but using the swapped loads and determines if there are still any other matching destinations (comparing the swapped or rebuilt loads) between them and continuing back through the logic again.

If the current destination combination does not result in a successful swap and there are more combinations to check (with the same target destination), the program goes back and attempts to swap with the next combination. If there are no more combinations left, the program checks to see if the target pass flag is false. If false, the program sets the target pass flag to true (indicating that for the current matching destination the logic is now to be switched so that TargetLoad=LB and the LoadtoCheck=LA) and goes back through the logic again.

In step 701, the drop per load improvement process is initiated. In step 702 the program creates a list of candidate load pairs, the list of candidate load pairs comprising all possible pairs of loads in the plurality of loads, including loads having no priority units. In step 703, the program selects a candidate load pair (LA,LB) from the list of candidate load pairs for consideration. The program starts with the first pair in the list, and sequentially selects the next pair in the list of candidate load pairs each time step 703 is repeated until a new list of candidate load pairs is created. The destinations to which units are to be delivered on LA comprise [da1,da2, . . . , dax], and the destinations to which units are to be delivered on LB comprise [db1,db2, . . . , dby], where x need not equal y. In step 704, the program calculates the Savings associated with the candidate load pair selected in step 703 using the process shown and described in connection with FIG. 6A above. In step 705, the program determines whether the Savings for the selected candidate load pair is greater than zero. If not greater than zero, the program rejects the load pair and skips to step 729. If greater than zero, the program in step 706 creates a list of destination matches from the candidate load pair. The destination matches comprise the pairs of common destinations on LA and LB. For example, if the only destinations on LA and LB for which the relationship da__=db__were da1 and db2, the list of intersection pairs for (LA,LB) would comprise [(da1,db2)]. In step 707, the program determines whether any destination matches were found in step 706. If the determination in step 707 is no, the program skips to step 729. If the determination in step 707 is yes, the program in step 708 selects a destination match from the list of destination matches (dA,dB). The city in which the destination match lies comprises the match city.

In step 709, the program determines the number of units on LA to be delivered to destinations other than dA but within the match city (NumA), and the number of units on LB to be delivered to destinations other than dB but within the match city (NumB). In step 710, the program determines whether either NumA is greater than or equal to the sum: ((number of units to be delivered to dB)−2), or whether NumB is greater than or equal to the sum ((number of units to be to delivered to dA)−2). If the determination in step 710 is no, the program skips to step 726A. If the determination in step 710 is yes, the program in step 711 calculates the combined number of destinations on candidate load pair LA,LB (DDc). In step 712 the program sets a switched target pass flag equal to False. In step 713, the program determines whether its switched target pass flag equals True. If the determination in step 713 is yes, the program skips to step 718. If the determination in step 713 is no, the program determines in step 714 whether the number of units to be delivered to dA is less than the number of units to be delivered to dB. If the determination in step 714 is yes, the program sets the variable L1 equal to LA and the variable L2 equal to LB, and then skips to step 717. If the determination in step 714 is no, the program sets L1 equal to LB and L2 equal to LA, and then proceeds to step 717.

In step 717, the program sets the variable TargetLoad equal to L1 and the variable LoadtoCheck equal to L2, then skips to step 719. In step 718, the program sets the variable TargetLoad equal to L2 and the variable LoadtoCheck equal to L1, then proceeds to step 719. In step 719 the program creates a list of all the possible combinations of the destinations in the match city. In step 719A the program selects for consideration the next possible combination from the list created in step 719. In step 719B, the program determines whether the destinations in the combination selected in step 719B have enough units to be delivered to them in order to perform a swap. If the determination in step 719B is no, the program skips to step 726. If the determination in step 719B is yes, the program proceeds to step 720. In step 720, the program sets the variable Nunits equal to the number of units to be delivered to the destinations comprising the combination selected in step 719A. In step 721, the program determines whether Nunits is within the range of: ((number of units on the TargetLoad)−2) to (number of units on the TargetLoad). If the determination in step 721 is no, the program skips to step 726. If the determination in step 721 is yes, the program swaps the units to be delivered to the destinations comprising the destination pair between the TargetLoad and the LoadtoCheck, the loads with the swapped units comprising TargetLoads and LoadtoChecks respectively. In step 723, the program sets the variable DDs equal to the combined number of destinations on the TargetLoads and the LoadtoChecks. In step 724, the program determines whether DDs is less than DDc. If DDs is not less than DDc, the program skips to step 726. If DDs is less than DDc, the program in step 725 saves the swapped loads in the plurality of loads (i.e., replaces TargetLoad with Target-Loads and replaces LoadtoCheck with LoadtoChecks), then returns to step 706 above.

In step 726, the program determines whether there are more destinations to consider in the list of LoadtoCheck destinations. If the determination in step 726 is yes, the program returns to step 719A. If the determination in step 726 is no, the program determines in step 727 whether the switched target pass flag is equal to True. If the determination in step 727 is no, the program in step 728 sets the switched target pass flag to True, then returns to step 713 above. If the determination in step 727 is yes, the program proceeds to step 727A. In step 727A the program determines whether there are any destination matches in the list of destination matches that have not been considered. If the determination in step 727A is yes, the program returns to step 708 above. If the determination in step 727A is no, the program determines in step 729 whether there any candidate load pairs in the list of candidate load pairs that have not been considered. If the determination in step 729 is yes, the program returns to step 703 above. If the determination in step 729 is no, the program determines in step 730 whether any swapped loads have been saved in the plurality of loads. If the determination in step 730 is yes, the program returns to step 702. If the determination in step 730 is no, the program ceases to rebuild the plurality of loads using the destination swapping improvement process.

Figure 8:
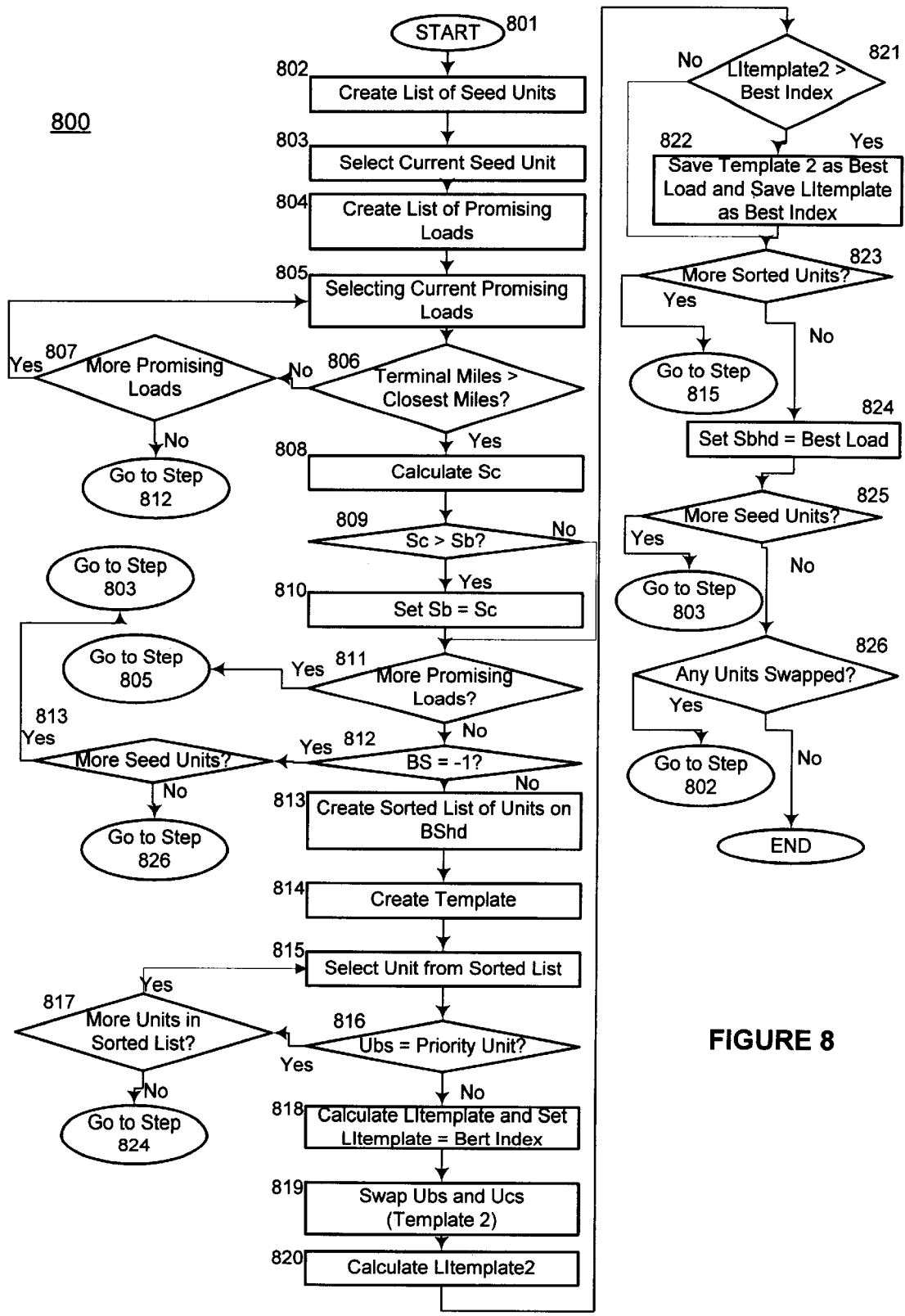
FIG. 8 is a flow diagram of a method for improving the quality of a load by swapping low priority units on the load in accordance with a preferred embodiment of the invention.

Referring now to FIG. 8, there is shown a flow diagram of a method 800 for improving the quality of a load by swapping low priority units on the load in accordance with a preferred embodiment of the invention. The load is selected from a plurality of loads, the plurality of loads comprising a first plurality of units to be delivered from a terminal to a plurality of destinations within a geographic region on a plurality of vehicles. A portion of the first plurality of units may comprise priority units. In step 801, the low priority unit swapping process is initiated. In step 802 the, program creates a list of seed units from a second plurality of units to be delivered to a second plurality of destinations within the geographic region. In a particularly preferred embodiment of the invention, the list of seed units comprise the units in the second plurality of units in descending order of priority.

In step 803, the program selects a current seed unit (Ucs) from the list of seed units for consideration, and assigns the Best Savings for Ucs (Scb) a value of −1. When selecting Ucs, the program starts with the first unit in the list and sequentially selects the next seed unit in the list of seed units each time step 803 is repeated until a new list of seed units is created. In step 804, the program creates a list of promising loads from the plurality of loads. Promising loads comprise loads that are not comprised entirely of priority units and loads that are not straight loads (i.e., loads having units to be delivered to a single destination only). In step 805, the program selects a current promising load (Lcp) from the list of promising loads. In step 806, the program determines whether the terminal miles of Ucs are greater than the closest miles of Lcp. If No, the program determines in step 807 whether there are more promising loads in the list of promising loads to be considered. If Yes, the program returns to step 805. If No, the program skips to step 812. If the determination in step 806 is Yes, in step 808 the program calculates the Savings (Sc) of placing Ucs on Lcp. A preferred methodology for calculating Sc is described below with reference to FIG. 9.

In step 809, the program determines whether Scp>Scb. If No, the program skips to step 811. If Yes, in step 810 the program sets Scb=Scp, and the current promising load comprises the Best Savings Load (SbLd). In step 811, the program determines whether there are more promising loads in the list of promising loads. If Yes, the program returns to step 805. If No, the program determines in step 812 whether Scb=−1. If Yes, the program determines in step 813 whether there are more seed units in the list of seed units. If Yes, the program returns to step 803. If No, the program skips to step 826. If the determination in step 812 is No, in step 813 the program creates a sorted list of units on SbLd (SortList). SortList comprises all the units on SbLd listed in ascending order of their SortValue. A unit's SortValue is it's profitability as compared to other units on the load, and may depend on a number of variables including, but not limited to, how far it is from the terminal to the destination to which the unit is to be delivered, the priority of the unit and the number of units on the load to be delivered to the same destination as the unit. In a particularly preferred embodiment of the invention, SortValue is calculated according to the following:

((distance from terminal to unit's destination)×(1000))+((Age Priority)×(100))+(number of units to be delivered to same destination).

In step 814, the program creates a first temporary load (TempLd1). TempLd1 comprises a copy of SbLd. In step 815, the program selects a unit from SortList (Usb). The program starts with the first unit in SortList, and sequentially selects the next unit in SortList each time step 815 is repeated until a new SortList is created. Usb comprises the current best savings unit. In step 816, the program determines whether Usb is a priority unit. If Yes, the program determines in step 817 whether there are more units in SortList. If Yes, the program returns to step 815. If No, the program skips to step 824. If the determination in step 816 is No, the program in step 818 calculates the load index of TempLd1 (LItemp1) and sets the variable BestIndex= LItemp1. In step 819, the program creates a second temporary load (TempLd2) by swapping Usb for Ucs on TempLd1. TempLd2 comprises the current swapped load. In step 820 the program calculates the load index of TempLd2 (LItemp2). In step 821, the program determines whether LItemp2>BestIndex. If No, the program skips to step 823. If Yes, in step 822 the program saves TempLd2 as the best load (BestLoad) and saves LItemp2 as the BestIndex. In step 823, the program determines whether there are more units in SortList. If Yes, the program returns to step 815. If No, the program proceeds to step 824. In step 824 the program sets SbLd=BestLoad. In step 825 the program determines whether there are more seed units in the list of seed units. If the determination in step 825 is yes, the program returns to step 803. If the determination in step 825 is no, the program determines in step 826 whether there has been a successful swap. If the determination in step 826 is yes, the computer saves BestLoad in the plurality of loads and returns to step 802. If the determination in step 826 is no, the program ceases to rebuild the plurality of loads using the low priority unit swapping process.

Figure 9:
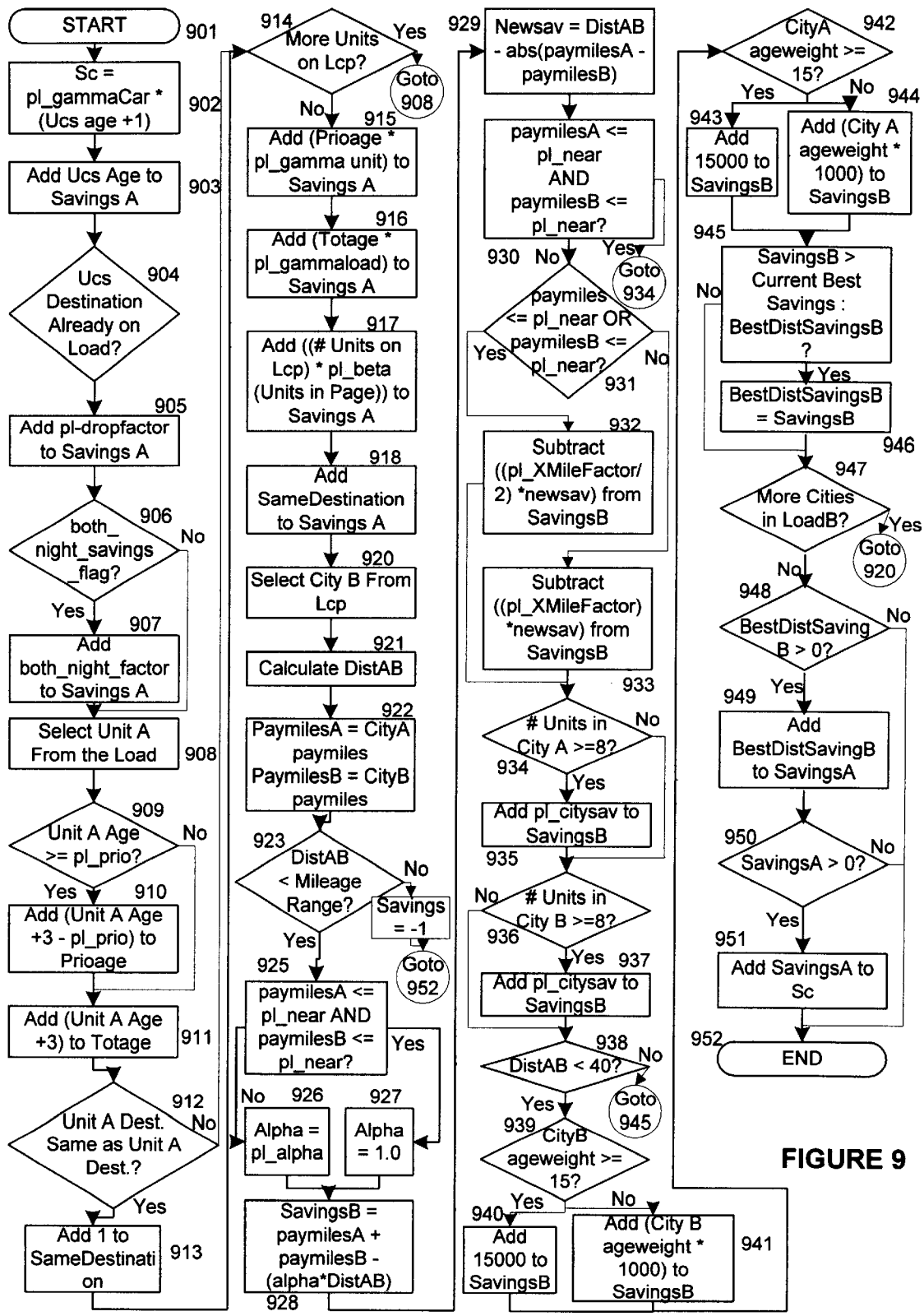
FIG. 9 is a flow diagram of a method for calculating the Savings of placing the current seed unit on the current promising load in accordance with a preferred embodiment of the invention.

Referring now to FIG. 9, there is shown a flow diagram for calculating the Savings (Scp) of placing the current seed unit (Ucs) on the current promising load (Lcp) in accordance with a preferred embodiment of the invention. In step 901 the Scp calculation process is initiated. In step 902, the program sets Scp equal to the product: (pl_gammaUnit× ((age of Ucs in days)+1))). In step 903, the adds the age of Ucs in days to the variable SavingsA. In step 904, the program determines whether the destination to which Ua is to be delivered is already on Lcp. If the determination in step 904 is no, the program skips to step 906. If the determination in step 904 is yes, the program adds a minimum value (pl_dropfactor) to SavingsA (to reflect that swapping Ucs for Ua will not add a destination drop to Lcp). In step 906, the program determines whether a both night savings flag equals True. If not True, the program skips to step 908. If True, the program adds a minimum value (both_night_factor) to SavingsA.

Referring still to FIG. 9, steps 908–918 correspond to steps 644–653 of FIG. 6A with following revisions: 1) the city encompassing the destination to which Unit A is to be delivered comprises CityA; 2) Lcp in FIG. 9 corresponds to Load B in FIG. 6A 3) in the step corresponding to step 648 of FIG. 6A (i.e., step 912), the program determines whether the destination to which Unit A is to be delivered is the same destination to which Ucs is to be delivered; 4) in the step corresponding to step 649 (i.e., step 913), the program adds the number 1 to the value of variable samedestination, which has a value of zero upon initiation of process 808; and 5) in the step corresponding to step 654 (i.e., step 918), the program adds the value of samedestination to SavingsA.

Referring still to FIG. 9, steps 920–949 correspond to steps 657–686 of FIG. 6A with following revision: 1) the city encompassing the destination to which Unit A is to be delivered comprises CityA. After completing step 949, the program determines in step 950 whether the value of SavingsA is greater than zero. If not greater than zero, the program skips to step 952. If greater than zero, the program in step 951 adds the value of SavingsA to Scp. In step 952 the Scp calculation process is terminated.

Figure 9A:
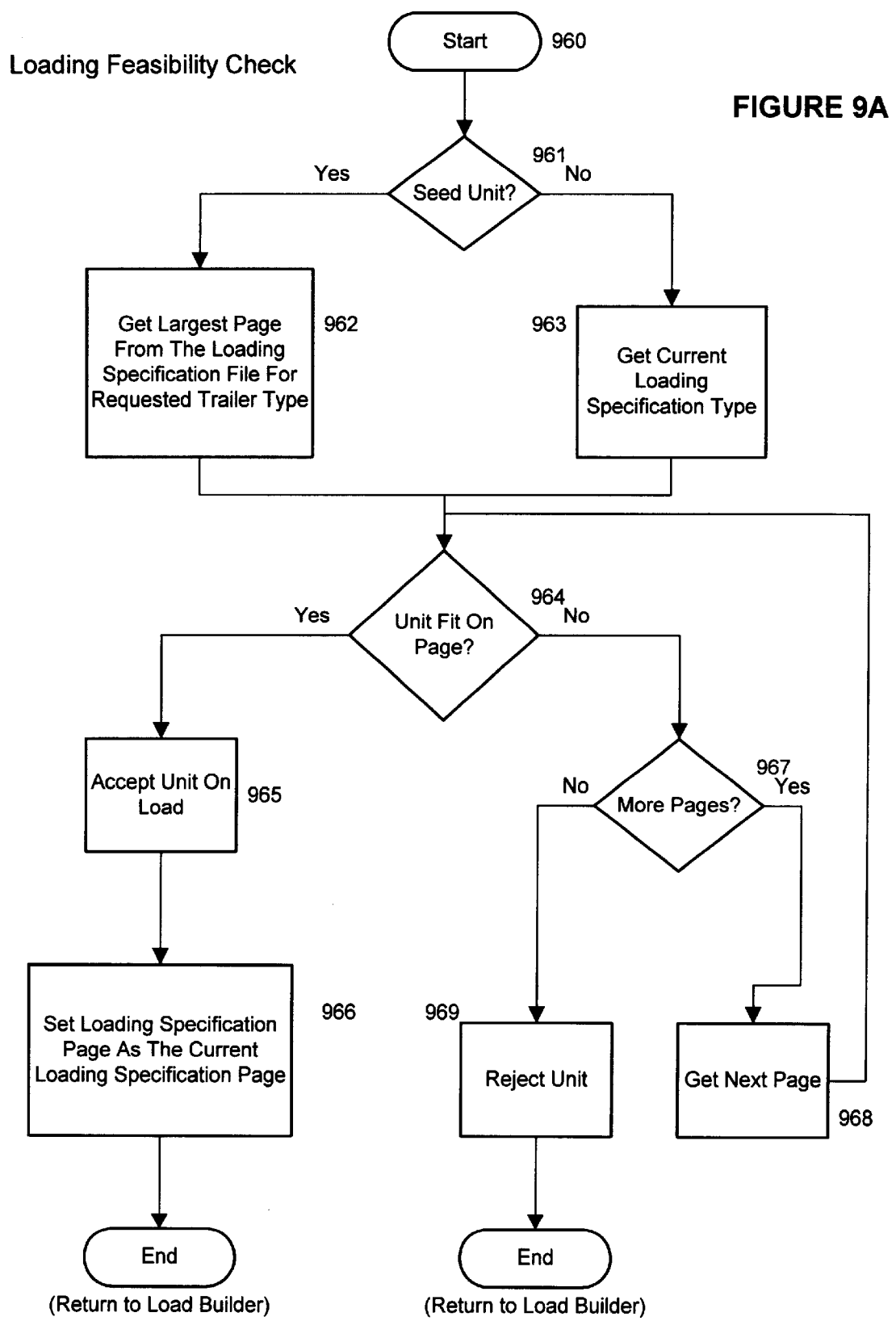

Referring now to FIG. 9A, there is shown a flow diagram for performing a loading feasibility check in accordance with preferred embodiments of the invention. The loading feasibility check is a set of routines that determine if the current mix of units selected for the current load fit together given the requested delivery vehicle type, such as a tractor trailer type. Each delivery vehicle type has a corresponding loading specification file. These files contain possible loading configurations given the mix of units to be delivered. In the case of automobiles, the files would contain information such as model types and deck positions, which models can fit on which decks, and/or loading restrictions that would detail which model types will and/or will not fit on certain decks.

The loading specification files are made up of pages. Each page refers to a loading configuration that consists of delivery vehicle positions (such as deck positions) and a specific number of units with a range of possible unit types (such as model types) that make a full load (i.e., a load that fully utilizes the delivery vehicle such as a tractor trailer). For example, in the case of automobiles trailer type CM12 may have as its largest loading configuration a 12 unit page (meaning 12 units are needed to complete the load); the next page may be an 11 unit load configuration, and so on. Typically the larger loading configurations (e.g. 12 units) represent a mix of all smaller model types, and the smaller loading configurations (e.g. 8 units) represent a mix of large model types with possibly a few small model types that together fully utilize the trailer.

With each new load, the loading feasibility check routines begin with the largest loading specification page for the requested delivery vehicle type (such as a trailer type). The routines attempt to load the seed unit onto the largest page by finding a position (such as a deck) that will accommodate the unit (such as an automobile's model type). If the largest page cannot accommodate the seed unit, the routines will drop down to the next loading specification page and continue to search until a page is found that can accommodate the seed unit. This page is marked as the current specification page used by the current load. If no page can be found, the unit is rejected and another unit is selected to begin the load. Subsequently, each unit selected for the current load is first test loaded before being accepted on the load. To do this the loading feasibility check routines begin with the current specification page and attempt to find a delivery vehicle position (such as a deck position) that will accommodate the current unit, given the mix of units already selected for the load. In other words, all relevant load restrictions must be met while attempting to place the unit in an open position (such as on an open deck). If the current specification page cannot accommodate the current unit the routines will drop down to subsequent load specification pages and attempt to find a page that can fit all the units. That page will become the current specification page. If no page can be found the current unit is rejected for the current load.

After a unit is added to the load, the program checks to see if the number of units on the load equals the number of units on the current specification page. If so the load is full (complete) and the program can begin another load. If not, the program will search for another unit to test load. If no other unit can be found to fit onto the load, the load is rejected.

In step 960 the loading feasibility check process is initiated. In step 961 the program determines whether the selected unit is a seed unit. If a seed unit, the program retrieves the largest page from the loading specification file for the requested delivery vehicle type and proceeds to step 964. If not a seed unit, the program retrieves the current loading specification page and proceeds to step 964. In step 964, the program determines if the unit will fit on the page retrieved in either step 962 or 963 above. If the determination in step 964 is yes, the program accepts the unit on the current load and proceeds to step 966. In step 966 the program sets the loading specification page retrieved in either step 962 or 963 as the current loading specification page and exits the loading feasibility check process.

If the determination in step 964 is no, the program determines in step 967 whether there are more pages to be considered. If there are more pages to be considered, the program selects the next page in step 968 and returns to step 964 above. If there are no more pages to be considered, the program rejects the unit in step 969 and exits the loading feasibility check process.

It will be appreciated by one skilled in the art that the loading feasibility process will be utilized in conjunction with both the load building and load rebuilding processes shown and described herein. It will also be appreciated by one skilled in the art that various combinations of the quality improvement methods and/or load building methods may be constructed to generate loads with superior overall quality. For example, in a particularly preferred embodiment of the invention a plurality of loads are generated using method 100, the plurality of loads are rebuilt using method 300, the mileage quality of the plurality of rebuilt loads is improved using destination swapping method 600, the drops per load quality of the loads is then improved using method 700, and finally the mileage quality is improved further using low priority swapping method 800.

Figure 10:
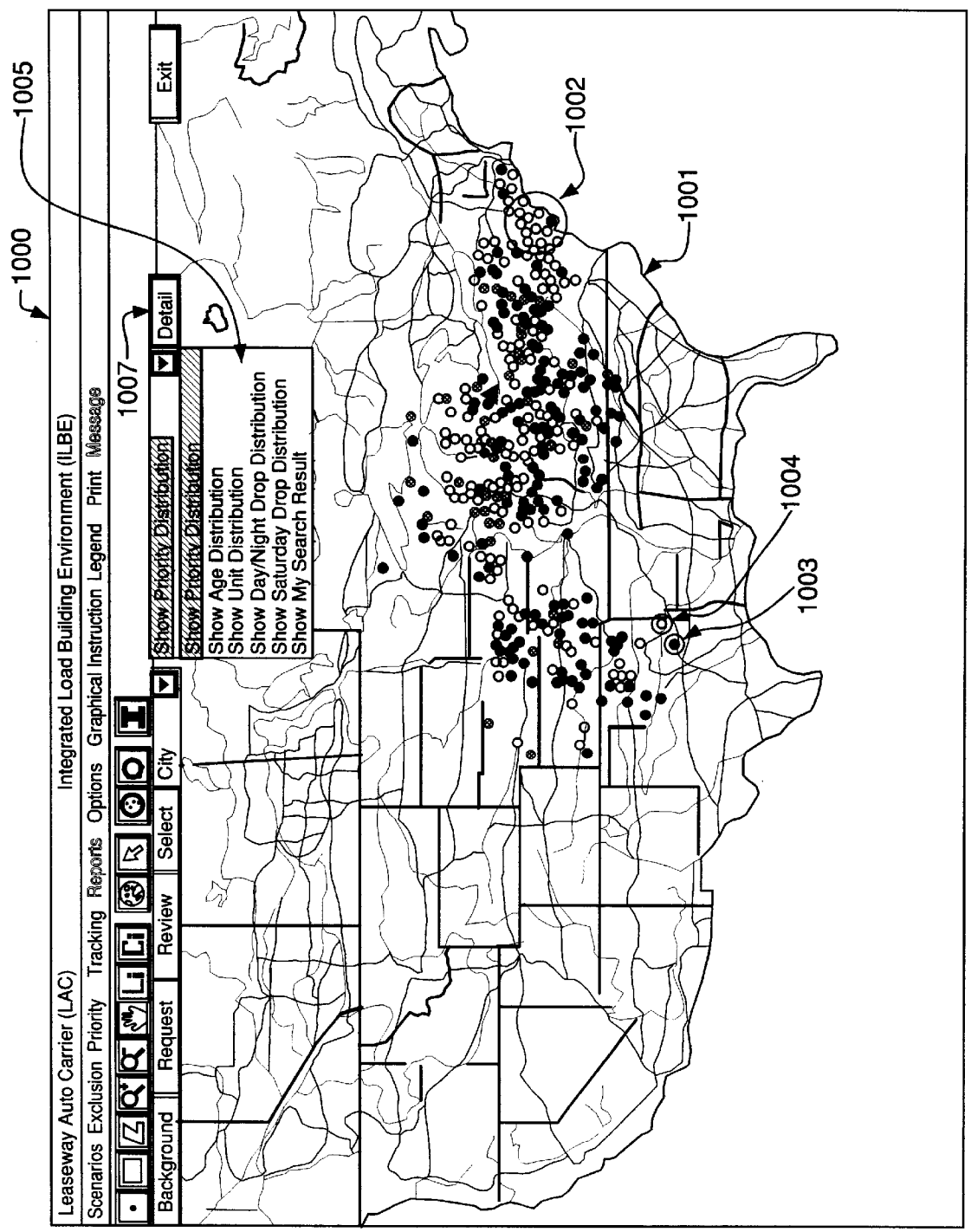
FIG. 10 shows a graphical user interface for presenting geographic priority distribution data.
Figure 11:
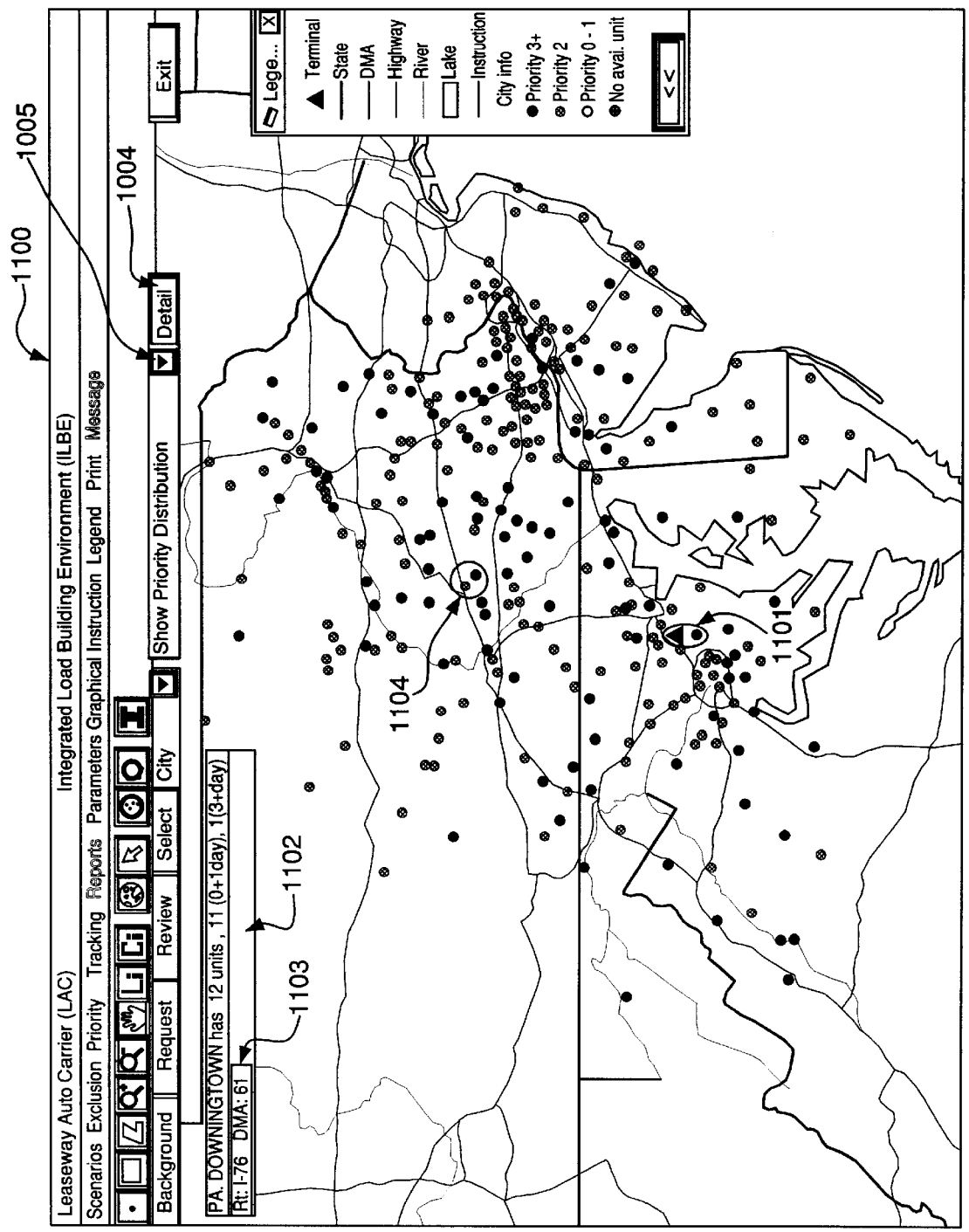
FIG. 11 shows a graphical user interface for presenting geographic priority distribution data from a terminal to a location.
Figure 12:
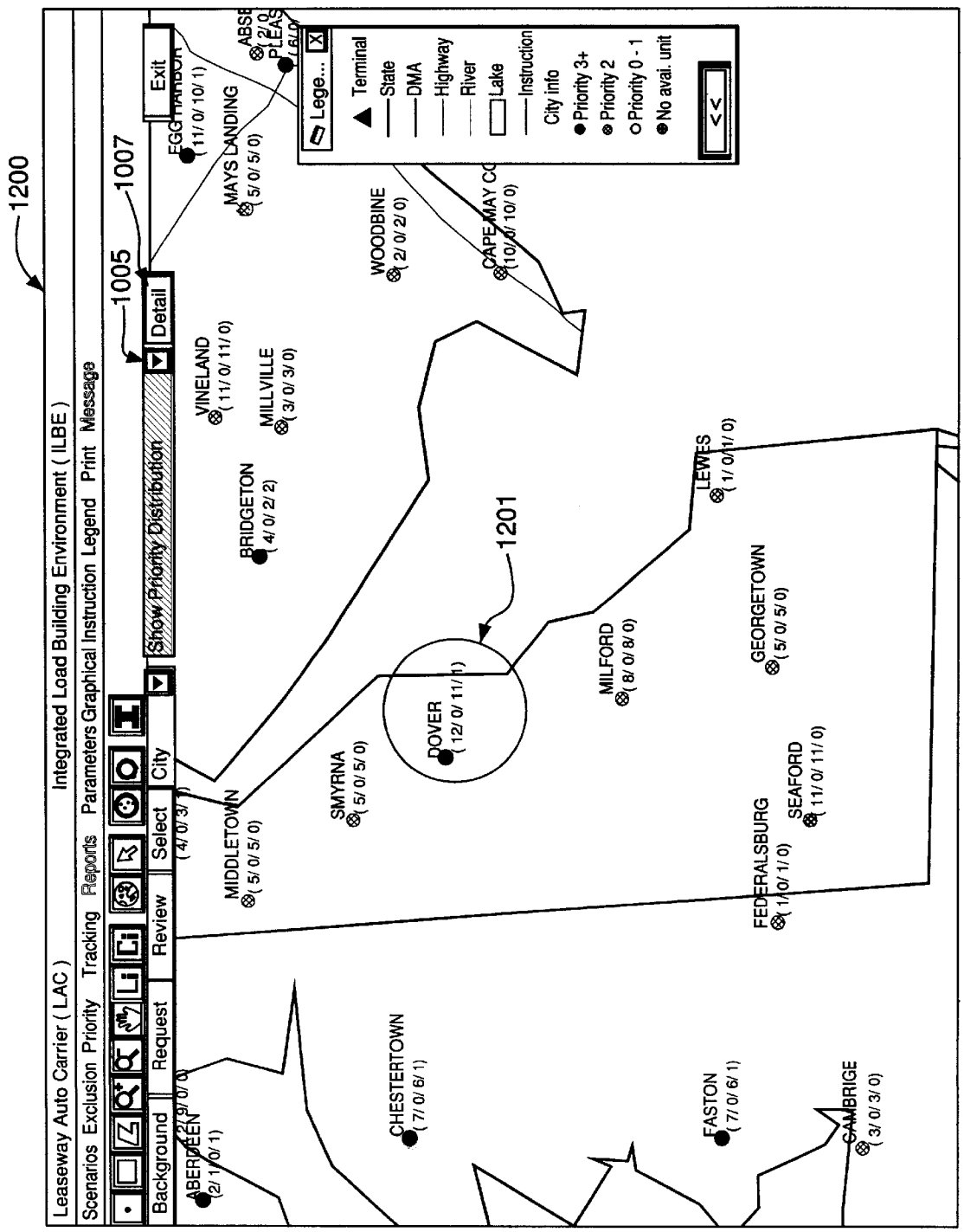
FIG. 12 shows a graphical user interface for presenting geographic priority distribution data associated with individual destinations.
Figure 13:
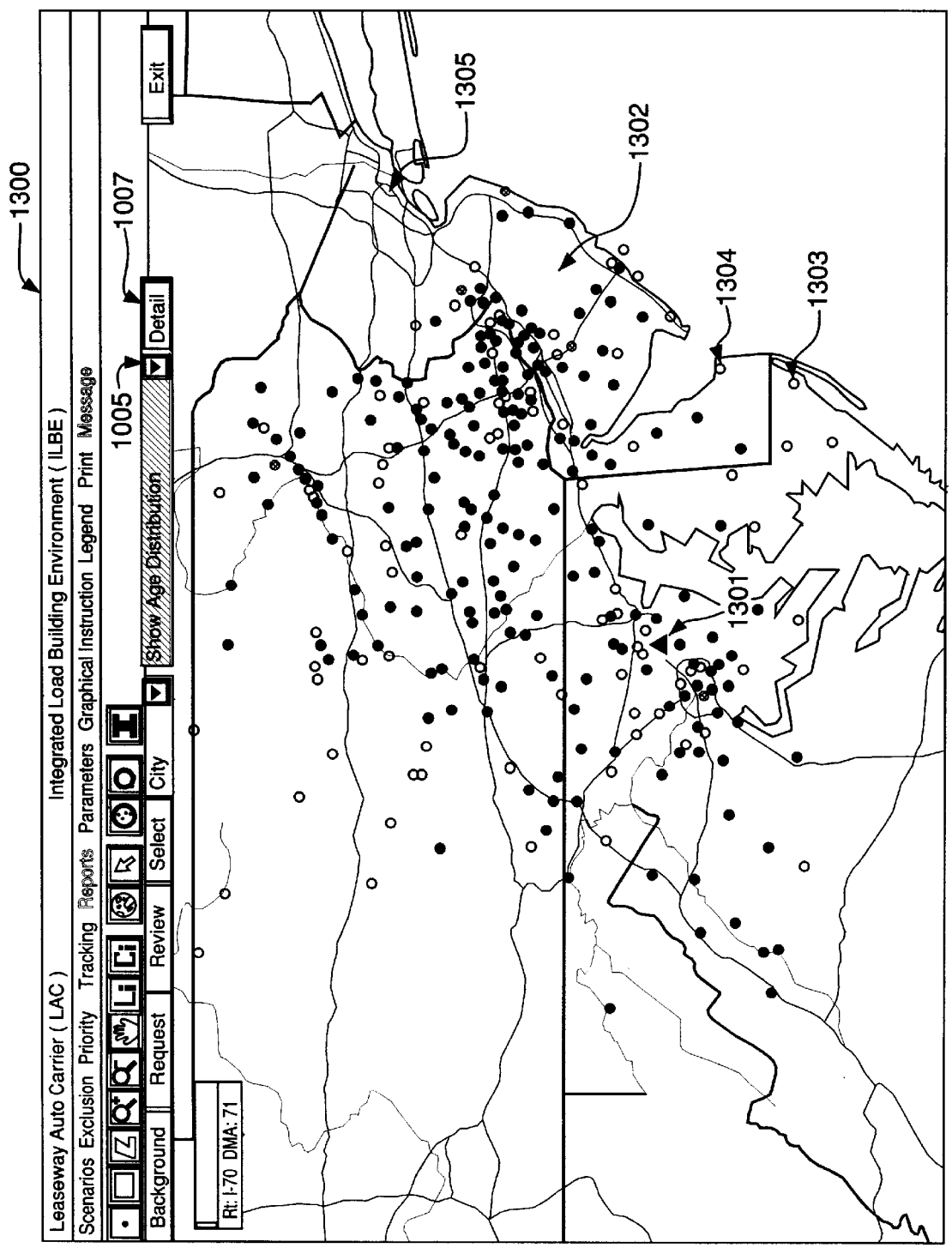
FIG. 13 shows a graphical user interface for presenting geographic age distribution data.
Figure 14:
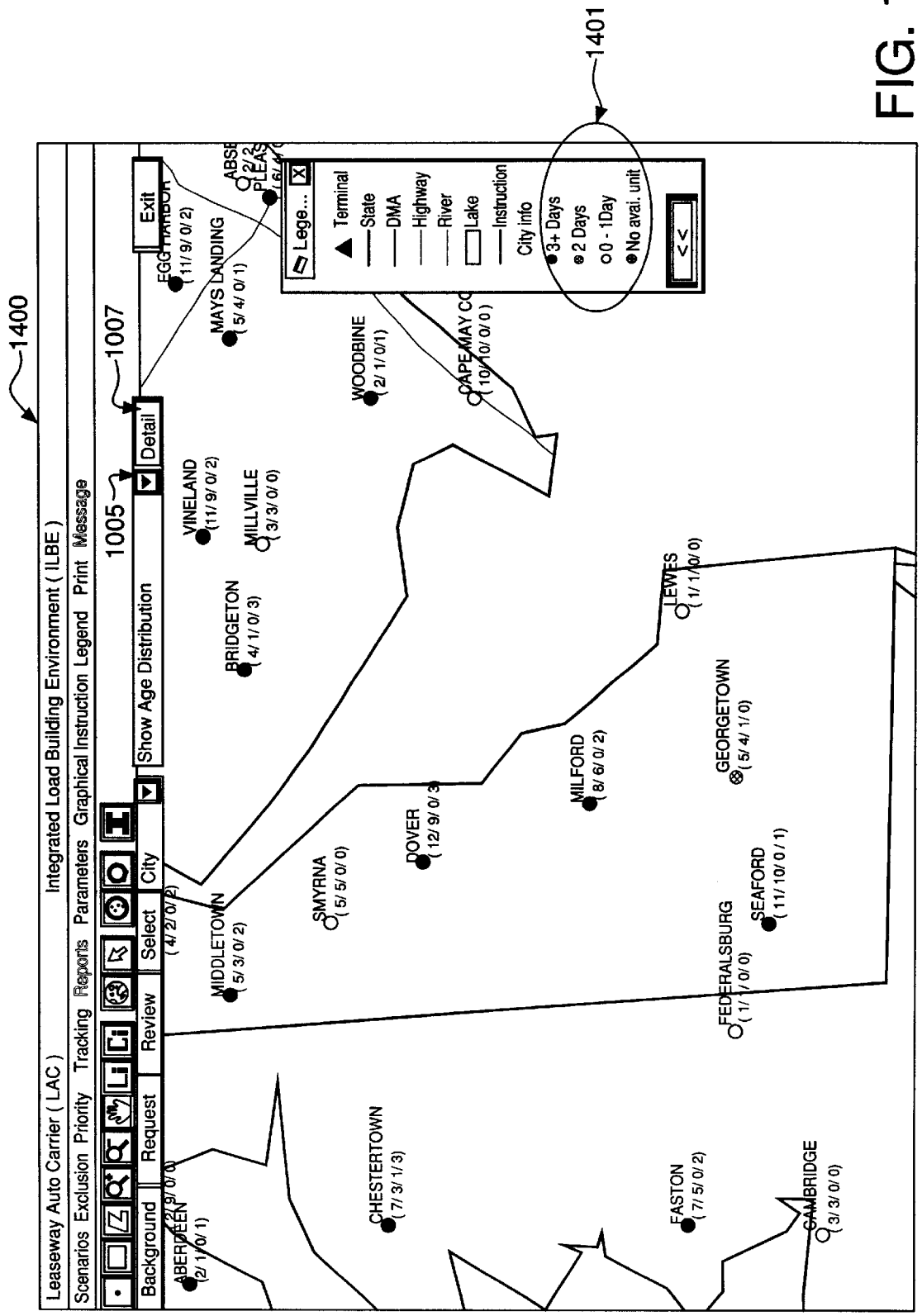
FIG. 14 shows a graphical user interface for presenting geographic age distribution data associated with individual destinations.

Referring now to FIGS. 10 through 33, there are shown a plurality of graphical user interfaces (guis) generated by the software/microprocessor on a display that may be utilized while selecting inventory, building and/or rebuilding loads in accordance with preferred embodiments of the invention. FIGS. 10 through 21 depict various guis that present both geographic and non-geographic inventory distribution information regarding the units at a terminal awaiting delivery and available to be placed on loads. FIG. 10 depicts a geographic priority distribution gui 1000. Destinations to which both priority and non-priority units at terminal 1006 are to be delivered are displayed as a plurality of different colored or shaded circles 1002 on a geographic map of the United States 1001. Destinations to which only priority units are to be delivered are represented in one color or shade 1003, while destinations to which only non-priority units are to be delivered are represented in a different color or shade 1004. One skilled in the art will appreciate that as different terminals are selected in different areas of the country, different portions of the United States will be displayed. It will further be appreciated that both larger and smaller geographic areas surrounding any selected terminal may be displayed. For example, in FIG. 11 a geographic priority distribution gui 1100 is depicted for the units to be delivered from a terminal in Dover, Del. 1101. Also, by placing a cursor, mouse or other similar type of peripheral device (cursor) on or near a particular destination(s), the name of the destination(s) may be displayed together with various information regarding the destination(s) and the units to be delivered to that destination. For example, by pointing at destination(s) 1104 in FIG. 11, a user is informed that the destination(s) are in the vicinity of Downingtown, Pa., and that 12 units are to be delivered to the destination(s) (11 units that have been at the terminal for 1 day or less and 1 unit that has been at the terminal for three or more days) 1102. The user is also informed that destination(s) 1104 are near interstate I-76 and fall within the $61^{st}$ demand area (DMA) 1103. Optionally, the user may have the computer display information regarding each destination and/or the units to be delivered to each destination in summary form immediately beside the destination. For example, in the geographic priority distribution gui of FIG. 12 a user is informed that destination 1201 corresponds to Dover, Del., and that there are 12 units to be delivered there (0 new units, 11 units that have been at the terminal for 0 to 2 days, and 1 unit that has been at the terminal for 3 or more days).

Figure 15:
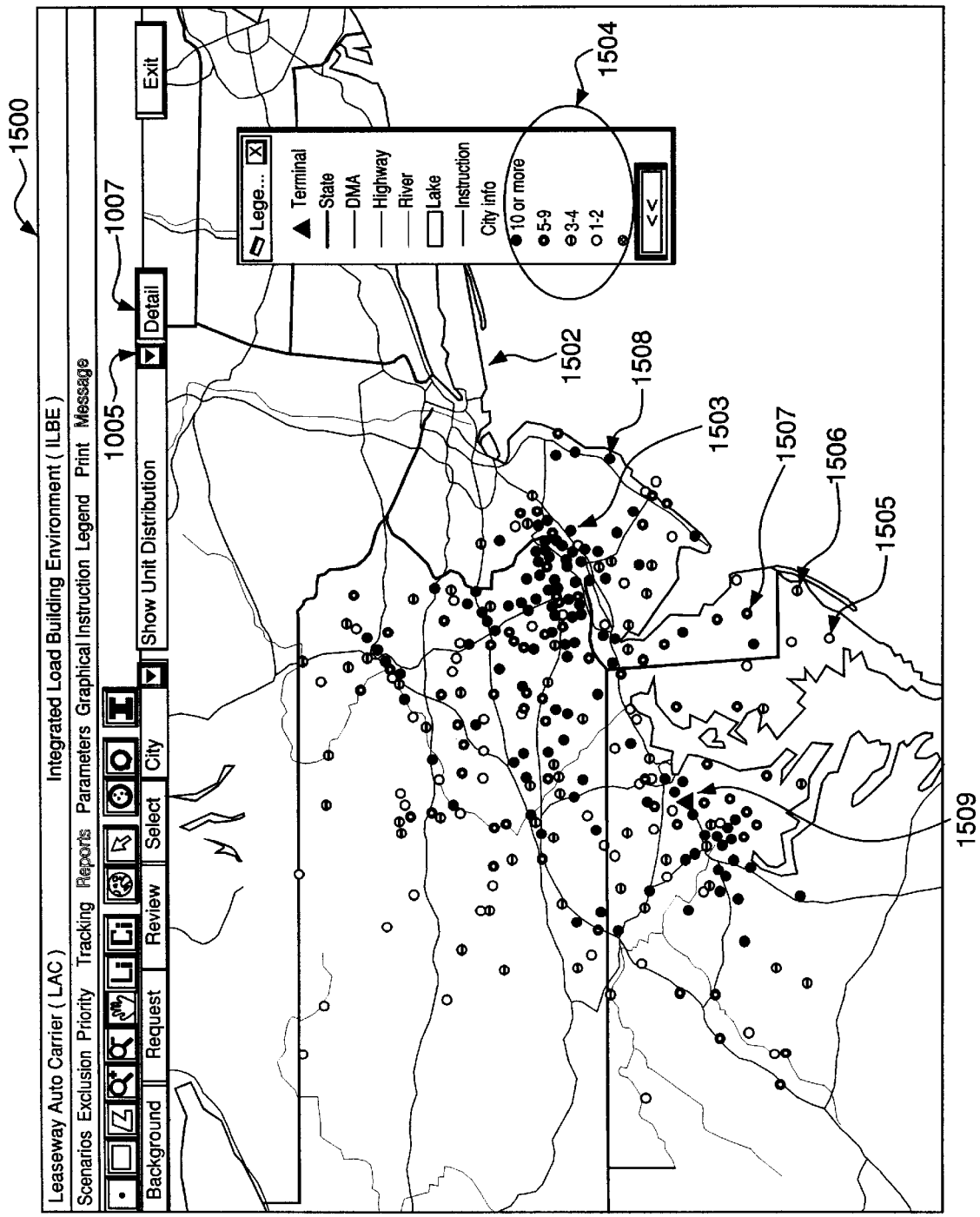
FIG. 15 shows a graphical user interface for presenting geographic unit distribution data.

By selecting an inventory distribution dropdown menu 1005 with the cursor, a user may have the computer display other geographic inventory distributions. For example, in FIG. 13 there is shown a geographic age distribution gui 1300. The destinations to which the units at terminal 1301 are to be delivered are depicted as a plurality of different colored or shaded circles 1302 on a geographic map of the region surrounding the terminal 1305. Destinations to which only new units are to be delivered are depicted in one color or shade 1303, while destinations to which at least one old unit is to be delivered are depicted in another color or shade 1304. Other combinations of unit age may however be utilized. For example, in FIG. 14 the age of the units going to each destination in geographic age distribution gui 1400 is depicted in three different colors or shades 1401. One shade or color for units that have been at the terminal for no more than a day, another shade or color for units that have been at the terminal for up to 2 days, and a third color or shade for units that have been at the terminal for 3 or more days. Referring now to FIG. 15, there is shown a geographic unit distribution gui 1500. Destinations to which units at terminal 1501 are to be delivered are displayed as a plurality of different colored or shaded circles 1503 on a geographic map 1502 of the region surrounding terminal 1501. In gui 1500, the color or shade of each destination to which units at terminal 1501 are to be delivered is represented in a different color depending on the number of units to be delivered to each destination 1504. For example, destination 1505 is depicted in a first color or shade corresponding to 1–2 units to be delivered; destination 1506 in a second color or shade corresponding to 3–4 units to be delivered; destination 1507 in a third color corresponding to 5–9 units to be delivered; and destination 1507 in a fourth color corresponding to 10 or more units to be delivered. The precise number of units to be delivered corresponding to each color or shade may be varied as a matter of design choice, as may the number of different colors or shades employed.

Figure 16:
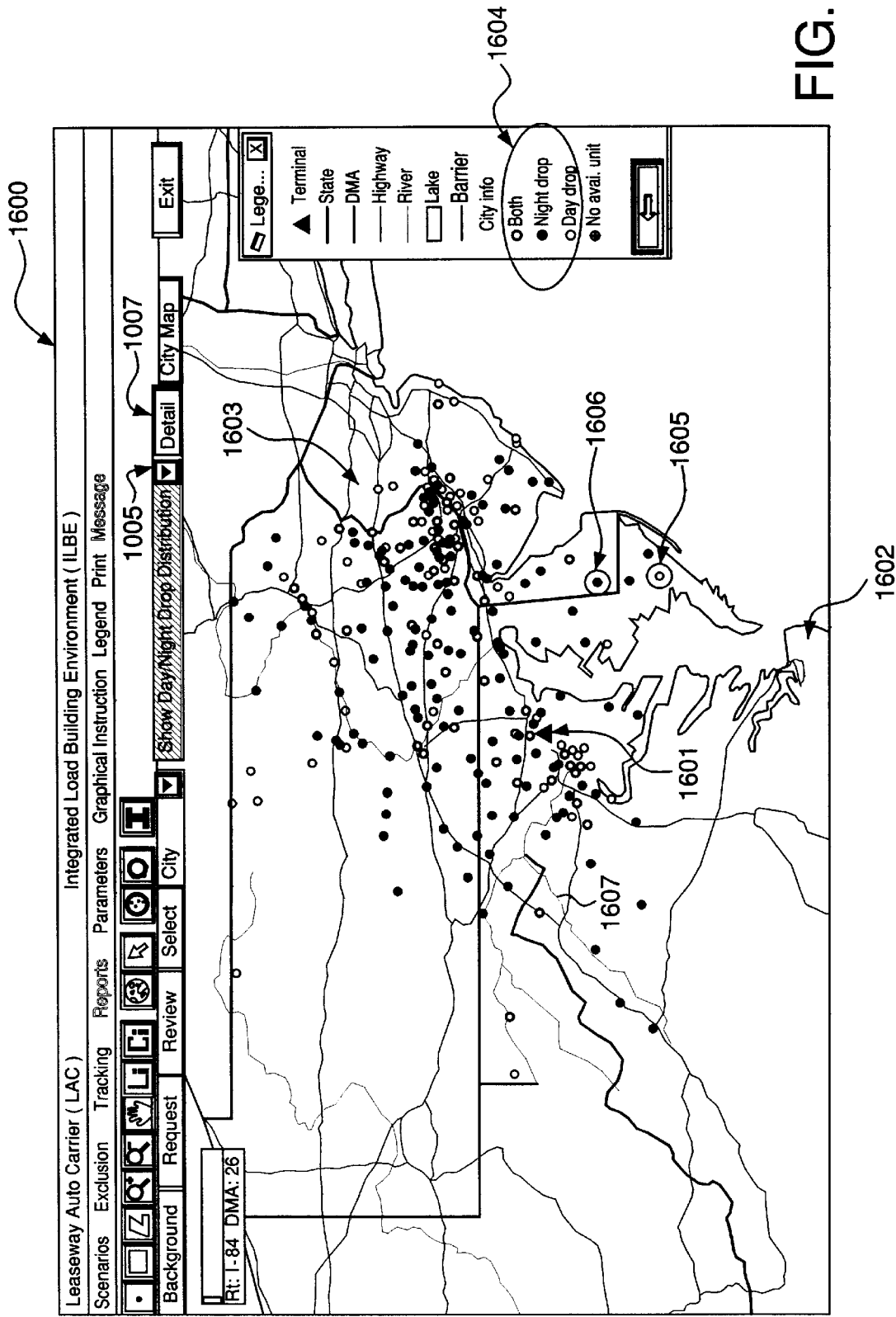
FIG. 16 shows a graphical user interface for presenting geographic day/night drop distribution data.
Figure 17:
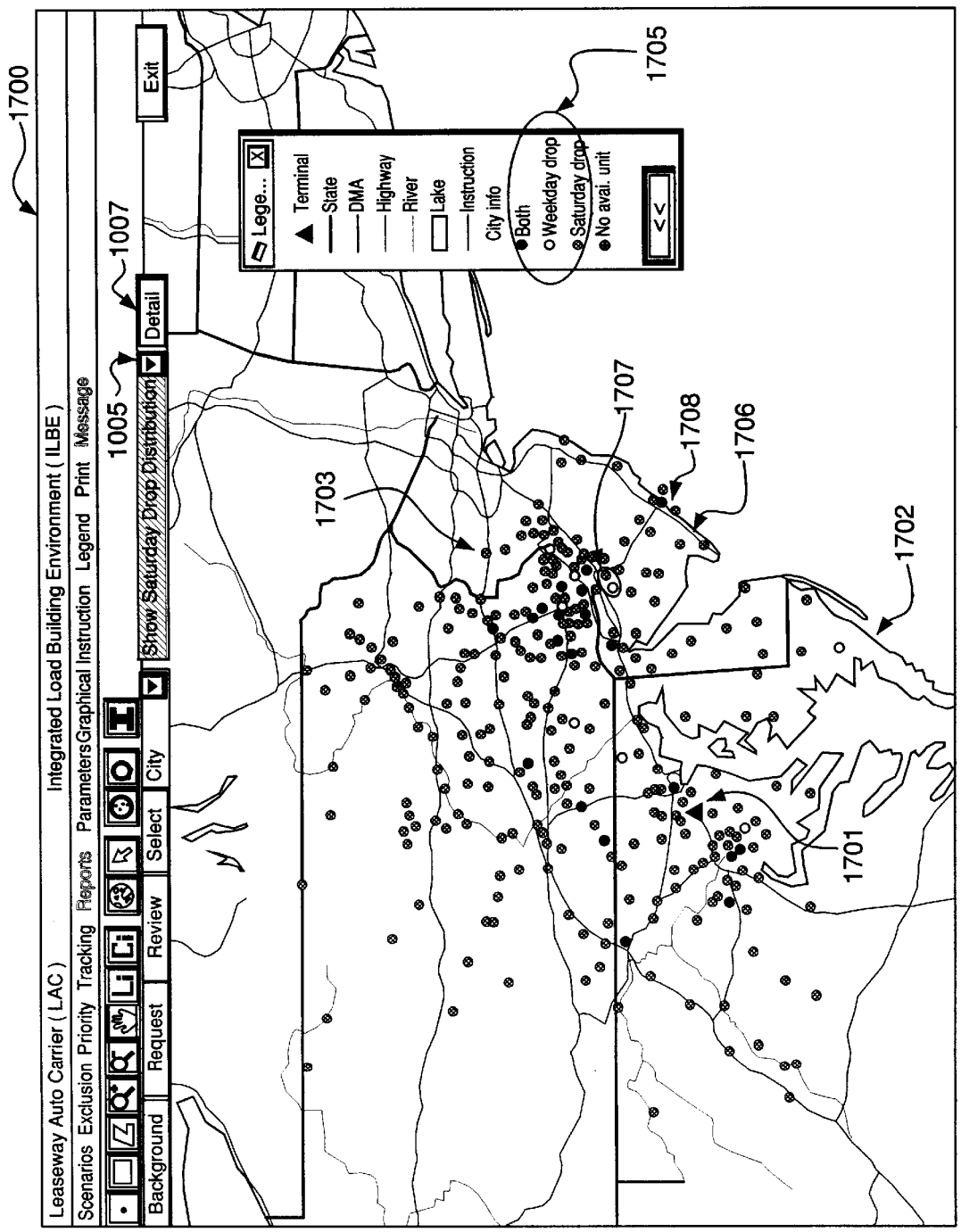
FIG. 17 shows a graphical user interface for presenting geographic Saturday drop distribution data
Figure 20:
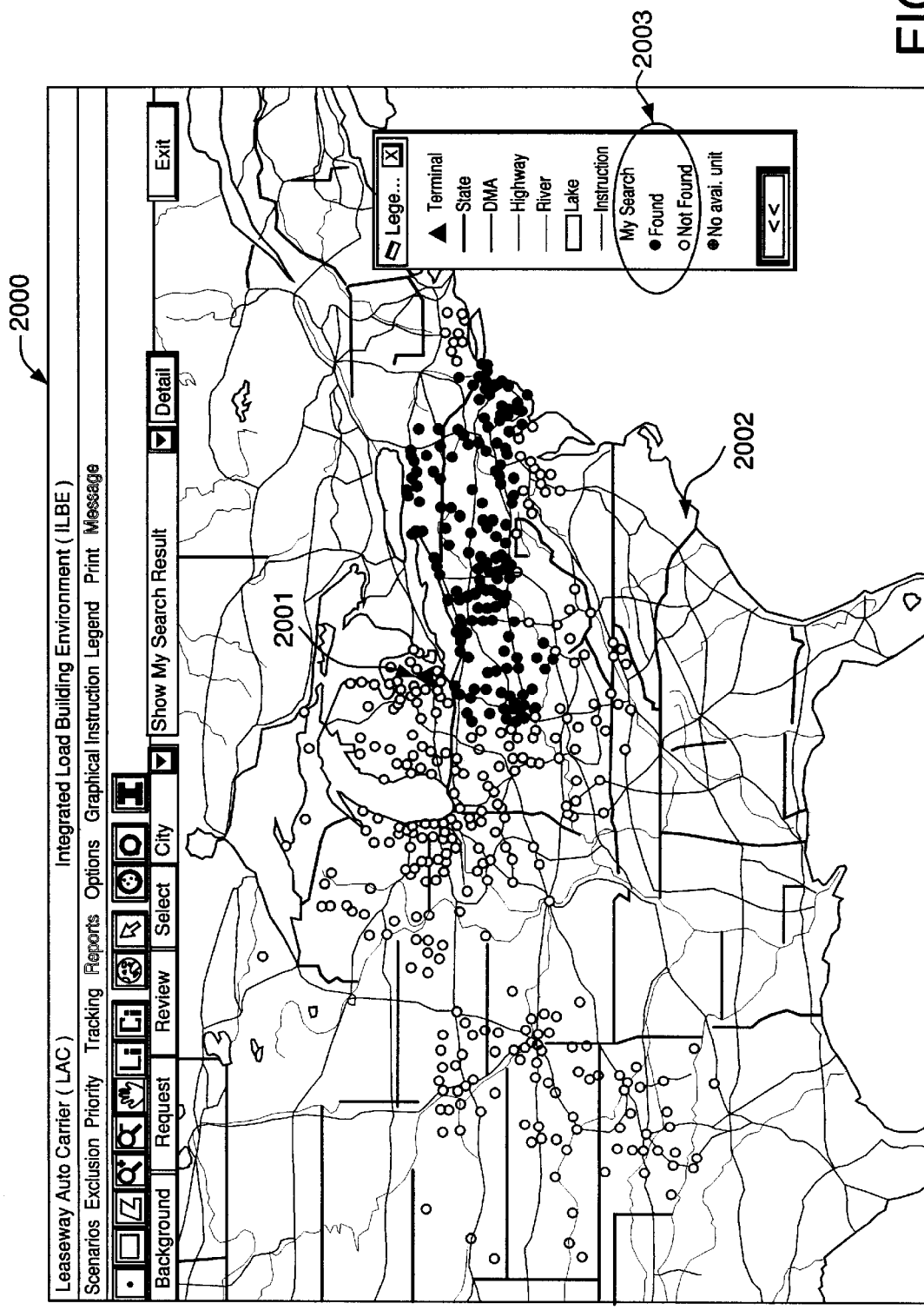
FIG. 20 shows a graphical user interface for presenting geographic search result inventory data resulting from a query.

At least three other geographic inventory distribution guis may also be selected via drop down menu 1005 will be discussed with reference to FIGS. 16, 17, and 20. FIG. 16 depicts a geographic day/night drop distribution gui 1600. The destinations to which the units at terminal 1602 are to be delivered are represented as a plurality of different colored or shaded circles 1603 on a geographic map 1602 of the region surrounding terminal 1602. The color or shade of each destination on the gui corresponds to whether units may be delivered or dropped only at night, only during the day, or both 1604. For example, units to be delivered to destination 1605 may only be delivered during the day, units to be delivered to destination 1606 may only be delivered during the night, and units to be delivered to destination 1607 may be delivered during either the day or night. In FIG. 17 there is shown a geographic Saturday drop distribution gui 1700. The destinations to which the units at terminal 1701 are to be delivered are represented as a plurality of different colored or shaded circles 1703 on a geographic map 1702 of the region surrounding terminal 1701. The color or shade of each destination on the gui corresponds to whether units may be delivered or dropped only on a Saturday, only during the weekdays, or both 1705. For example, units to be delivered to destination 1706 may only be delivered on a Saturday, units to be delivered to destination 1707 may only be delivered during the weekdays, and units to be delivered to destination 1708 may be delivered on either Saturday or a weekday.

Figure 18:
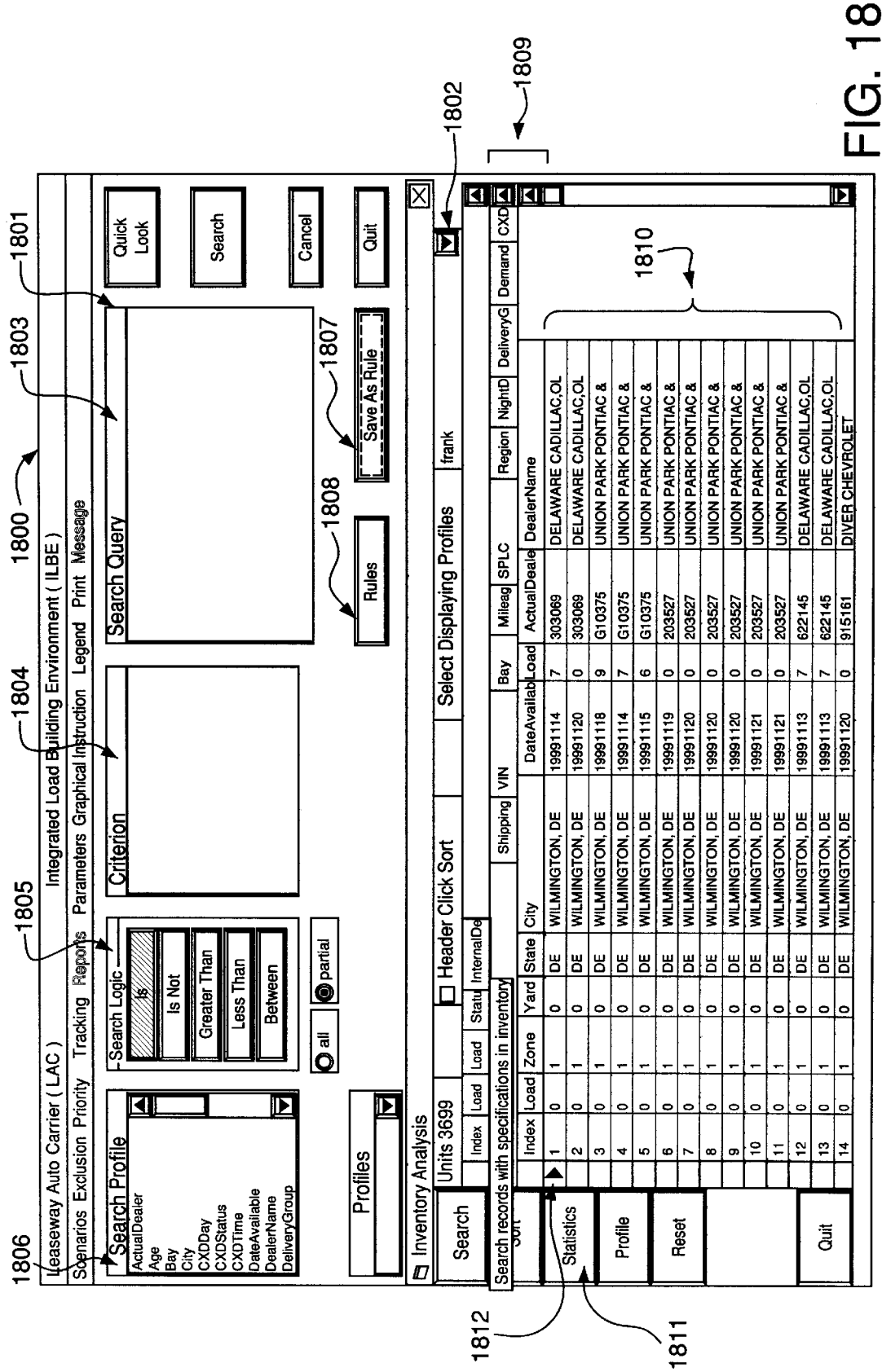
FIG. 18 shows a graphical user interface for a inventory details and grid search engine.

Referring now to FIG. 18, there is shown an inventory details grid and search engine gui 1800 for displaying a form of non-geographic inventory distribution information. In preferred embodiments of the invention, gui 1800 may be generated by selecting a detail button 1007 with the cursor on any of the geographic inventory distribution guis 1000–1700. The search engine portion 1801 of gui 1800 allows a user to search the units to be delivered at a terminal with search queries 1803. Search queries 1803 are constructed by specifying logic rules 1805 for various criterion 1804, the criterion 1804 corresponding to a search profile 1806 selected. Once a search query 1803 has been constructed, it may be saved as a rule by selecting a Save As Rule button 1802. Rules that have been saved may be viewed by selecting a Rules button 1808. The possible search profile 1806 selections include, but are not limited to, unit age, destination (city and/or dealer) to which units are to be delivered, delivery group, demand area, mileage to destination, unit model, night delivery, Saturday delivery, and state. The possible criterion 1804 selections corresponding to each search profile 1806 selection are logically and necessarily depend on the specific search profile 1806 selection, and therefore will not be set forth in detail. The logic rules 1805 available for constructing search queries 1803 also logically and necessarily depend on the specific search profile 1806 selections, and include, but are not limited to, Is, Is Not, Greater Than, Less Than, and Between. Once a search query 1803 is constructed or selected and run by the computer, the units at the terminal fulfilling the search query are displayed in an inventory analysis portion 1802 of gui 1800. All the units satisfying search query 1803 are displayed in tabular form 1810, with each unit comprising one row of the table 1812 and the columns of the table 1809 comprising the various search profile 1806 selections.

Figure 19:
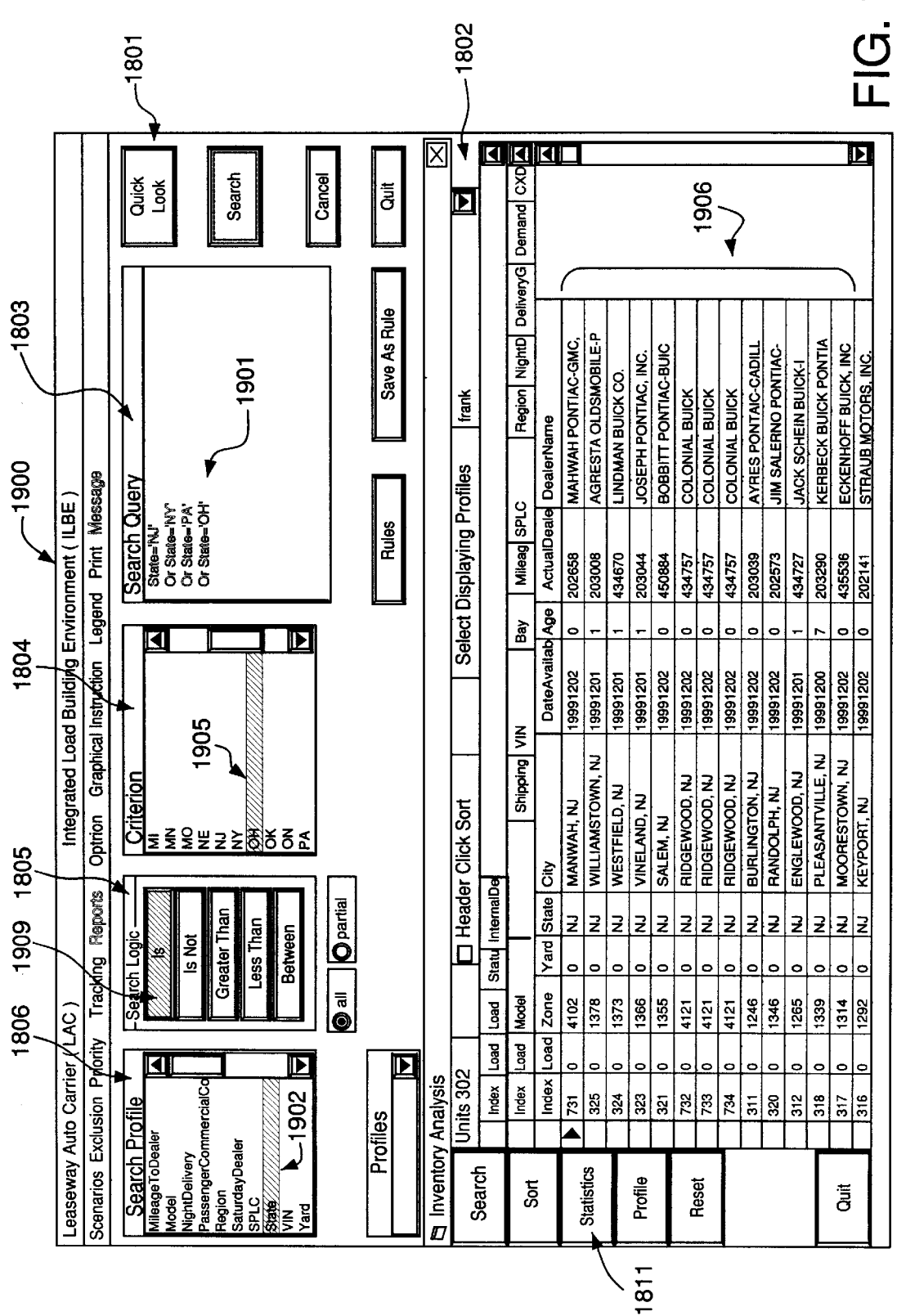
FIG. 19 shows a graphical user interface for an inventory details and grid search engine showing a specific query.

Referring to FIG. 19, there is shown an example of gui 1800 for a specific search query 1901. Search query 1901 corresponds to the command—find all units at the terminal to be delivered to destinations in the states of NJ, NY, PA, or OH. Search query 1901 was constructed by selecting the state 1902 search profile 1806 selection, the Is 1904 logic rule 1805, and then selecting states NJ, NY, PA, and OH 1905 from the criterion 1804. The units at the terminal satisfying search query 1901 are displayed in table 1906 in the inventory analysis portion 1802 of gui 1900. Referring now to FIG. 20, there is shown a geographic search result inventory distribution 2000 gui corresponding to search query 1901. All the destinations to which units satisfying search query 1901 are to be delivered are represented in one color or shade 2003 on a geographic map 2002 of the region surrounding the terminal 2001, while all the units at the terminal 2001 that do not satisfy search query 1901 are displayed in a different color or shade 2003.

Figure 21:
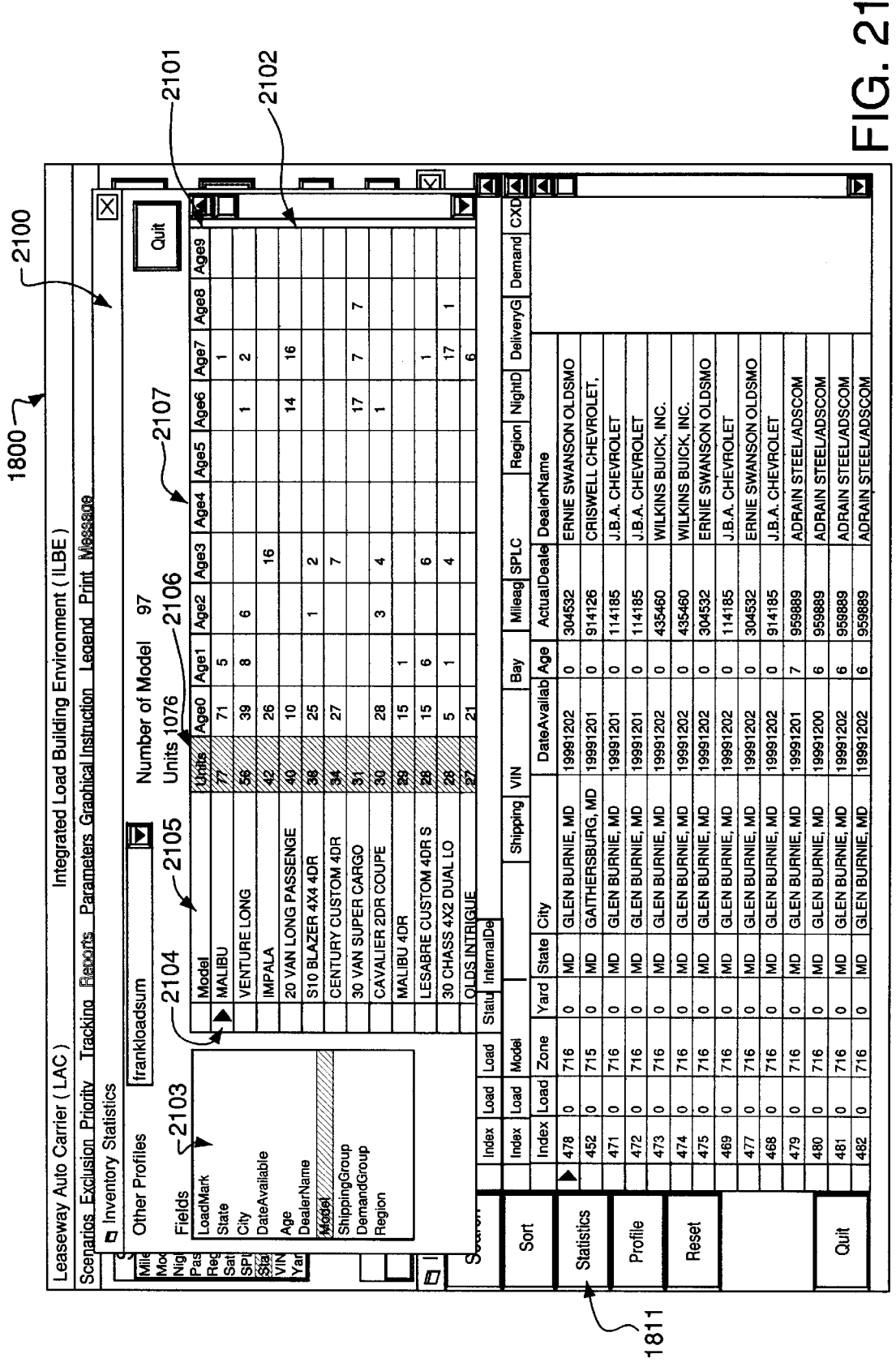
FIG. 21 shows a graphical user interface showing inventory statistics data resulting from a search query.

Referring now to FIG. 21, there is shown an example of an inventory statistics subportion 2100 of gui 1800 where the inventory at the terminal has been searched using a search query 1803 corresponding to—find all model units to be delivered to destinations in the state of MD. The inventory statistics gui 2100 comprises a tabular representation of all the units satisfying the search query 1803. Each row 2104 in the table corresponds to the available categories of a field selection 2103. The columns in the table correspond to the field selection 2105, the number of units satisfying the search query 1803 and the category of the field selection 2105, and the ages of the units satisfying the search query and category of the field selection 2107. The field selections 2103 may include, but are not limited to, state to which a unit is to be delivered, destination (including city and/or dealer) to which a unit is to be delivered, age of a unit, model of a unit, and demand area. In preferred embodiments of the invention, the inventory statistics subportion 2100 of gui 1800 is generated by selecting a Statistics button 1811 on gui 1800.

Figure 22:
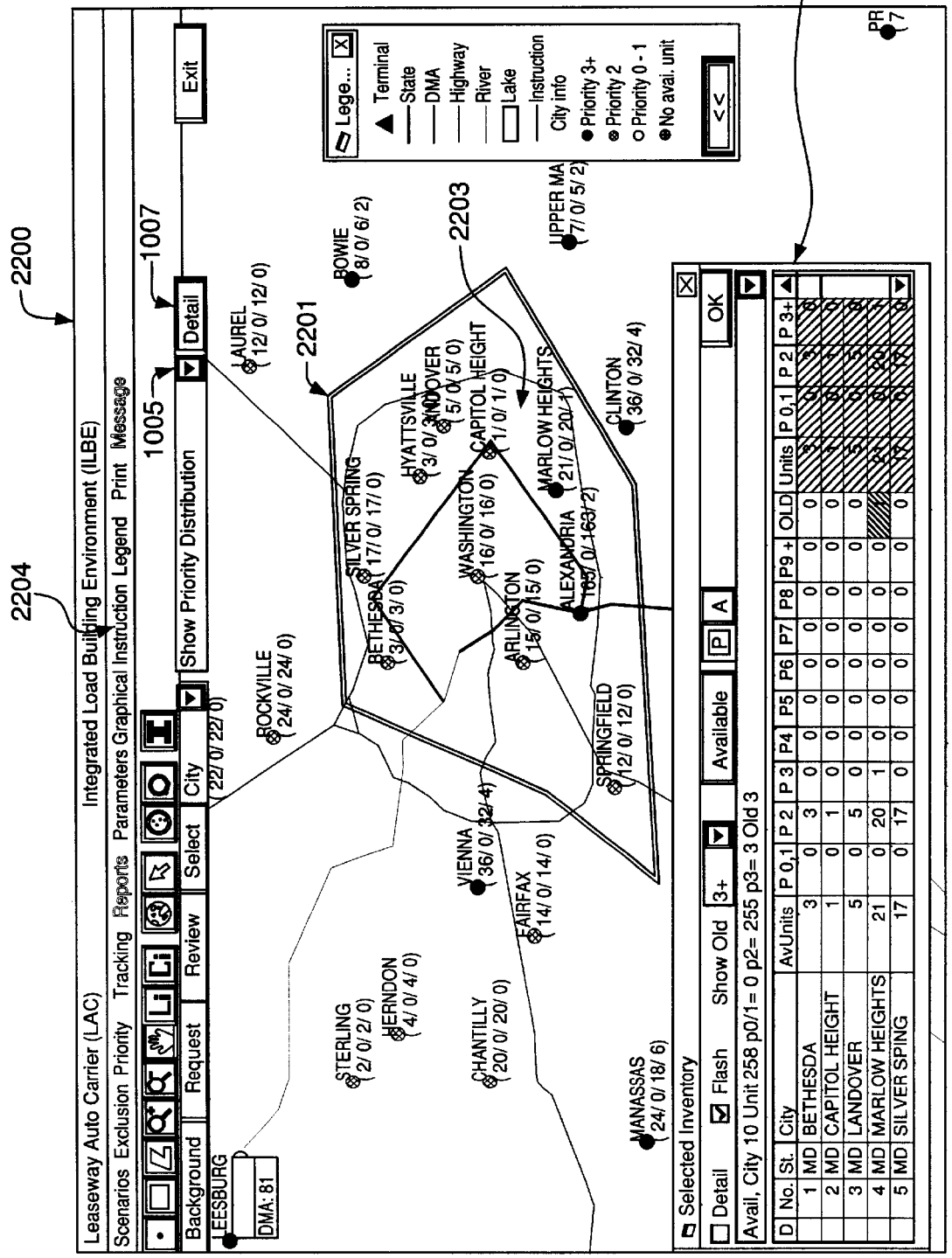
FIG. 22 shows a graphical user interface for geographically selecting the inventory at a terminal to be used for building a plurality of loads.
Figure 23:
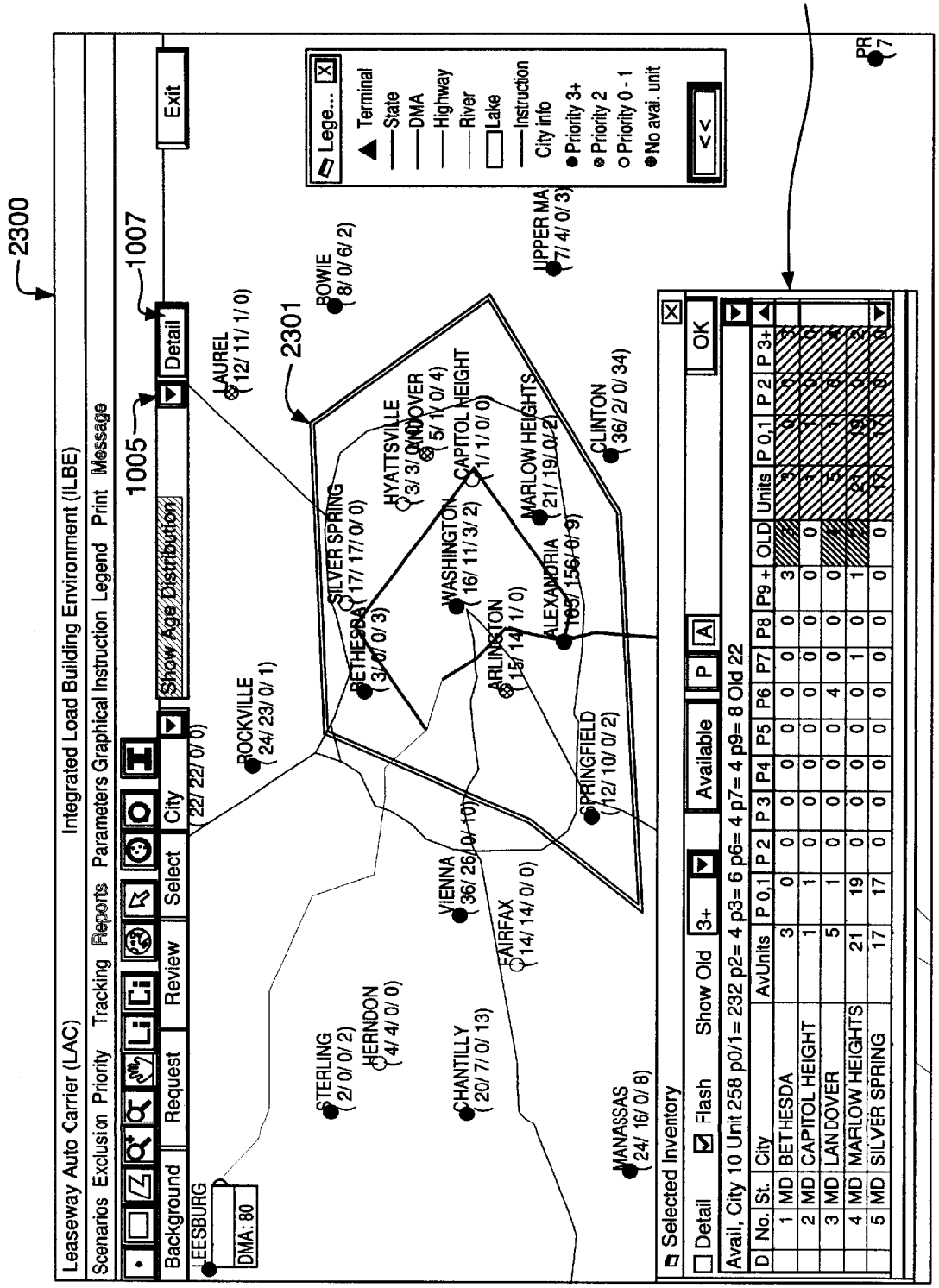
FIG. 23 shows a graphical user interface displaying information regarding inventory geographically selected to be used for building a plurality of loads.
Figure 24:
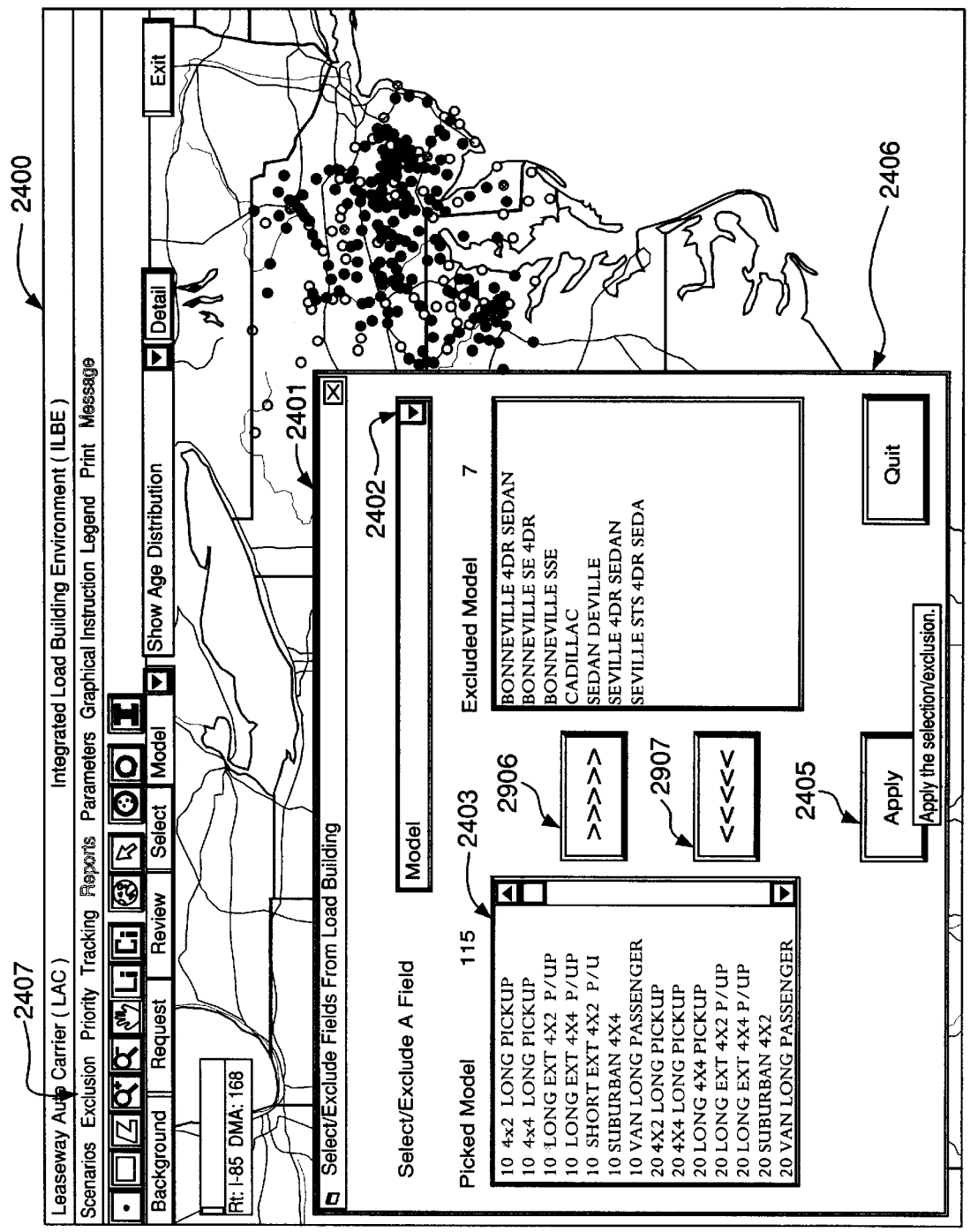
FIG. 24 shows a graphical user interface for identifying inventory to be excluded from inventory geographically selected to be used for building a plurality of loads.
Figure 25:
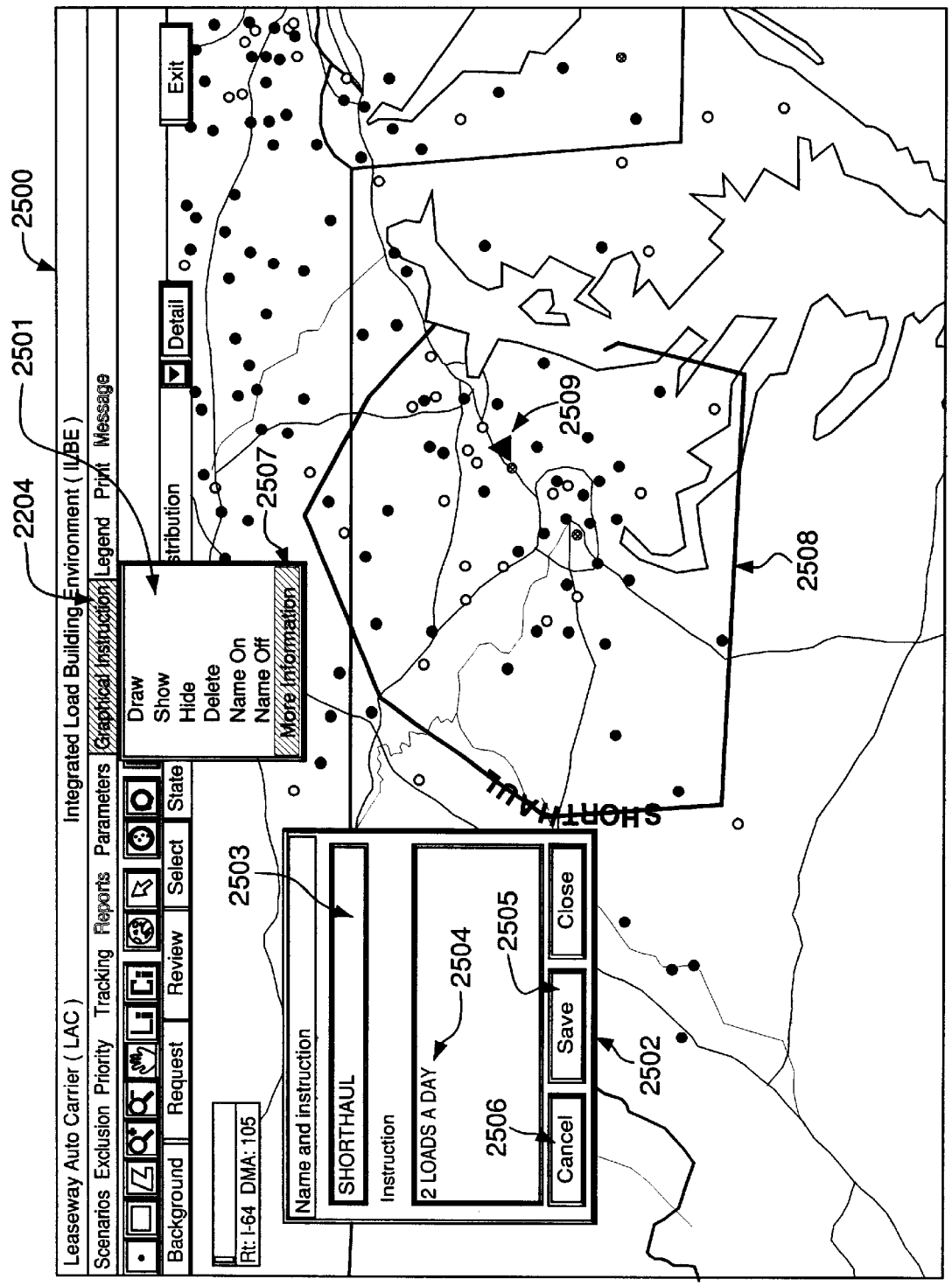
FIG. 25 shows a graphical user interface for requesting additional information regarding inventory geographically selected to be used for building a plurality of loads.

Referring now to FIGS. 22 through 25, there are shown a plurality of inventory selection guis for selecting the inventory at a terminal to be used for building a plurality of loads. FIG. 22 depicts the use of a polygon tool in conjunction with a geographic priority distribution gui 2200, such as that shown and described with reference to FIG. 10, for selecting the inventory to be used for building a plurality of loads. Using the cursor, a polygon 2201 is drawn on the geographic priority distribution gui 2200 that surrounds those destinations to which the user wishes to build loads for. Once the polygon 2201 is drawn, information regarding the units to be delivered to the destinations 2203 within the polygon 2201 is displayed in tabular form in a selected inventory subportion 2202 of gui 2200. In preferred embodiments of the invention, the polygon tool may be initiated from any of the geographic inventory distributions by selecting a draw instruction from a graphical instruction drop down menu 2204. Referring to FIG. 25, there are shown a number of possible instructions 2501 that may appear in graphical instruction drop down menu 2501. In preferred embodiments of the invention the instructions include, but are not limited to, draw polygon (draw), show polygon (show), hide polygon (hide), delete polygon (delete), show name of polygon (name on), don't show name of polygon (name off), and show more information (more information). Additionally, once the polygon tool is initiated in preferred embodiments of the invention a user may move from one type of geographic inventory distribution gui to another by selecting a different type of geographic inventory distribution guis from the inventory distribution dropdown menu 1005. For example, FIG. 23 depicts polygon 2201 after the user has selected a geographic age distribution gui 2300 from inventory distribution dropdown menu 1005.

In preferred embodiments of the invention, certain units and/or groups of units in the selected inventory may be excluded from the load building process without redrawing a polygon drawn with the polygon tool. For example, in FIG. 24 the user has initiated the select/exclude fields from load building subportion (s/e subportion) 2401 of gui 2400 by selecting it with the cursor in the exclusion drop down menu 2407. The s/e subportion 2401 may comprise, but is not limited to, a select/exclude a field drop down menu 2402, a field categories window 2403, an excluded field categories window 2404, an exclude select button 2406, an include select button 2407, and an apply exclusions button 2405. The fields that may be selected from the select/exclude a field drop down menu 2402 are a matter of design choice, but generally will correspond to the search profile selections 1806. A user selects a field to exclude from menu 2402, then selects a field category or categories in field categories window 2403, and selects the exclude select button (after which the excluded field category or categories appear in the excluded field categories window 2404). Field categories appearing in the excluded field categories window 2404 may be placed back in the available inventory by selecting the particular field category in the excluded field categories window 2404 and selecting the include select button 2407. The units within the polygon satisfying the field categories appearing in the excluded field categories window are then removed from the inventory available to placed on loads by selecting the apply exclusions button 2405. In addition, the active geographic inventory distribution gui and/or the selected inventory subportion of the active geographic inventory distribution gui may be updated to reflect those destinations within the polygon that no longer have any units to be delivered due to the selection of the apply exclusions button 2405.

Referring again to FIG. 25, there is shown an example of a user selecting the more information instruction 2507 in graphical instruction drop down menu 2204 after having drawn polygon 2508 in accordance with a preferred embodiment of the invention. Upon the selection of the more information instruction 2507, a name and instruction subportion 2502 is generated by the computer on gui 2500. The name and instruction subportion 2502 may comprise, but is not limited to, a name field 2503, and special instruction field 2504, a save name and instruction (save) button 2506, and a cancel name and instruction (cancel) button 2505. Name and instruction subportion 2502 allows a user to name the active polygon 2508 and provide information regarding the destinations and/or units within the active polygon 2508. For example, in FIG. 25 a user has named polygon 2508 "Shorthaul" and provided the information that two loads may delivered to the destinations within polygon 2508 per day because of their proximity to terminal 2509. The information typically is informational only and is not used by the computer when building loads from the units inside active polygon 2508.

Figure 26:
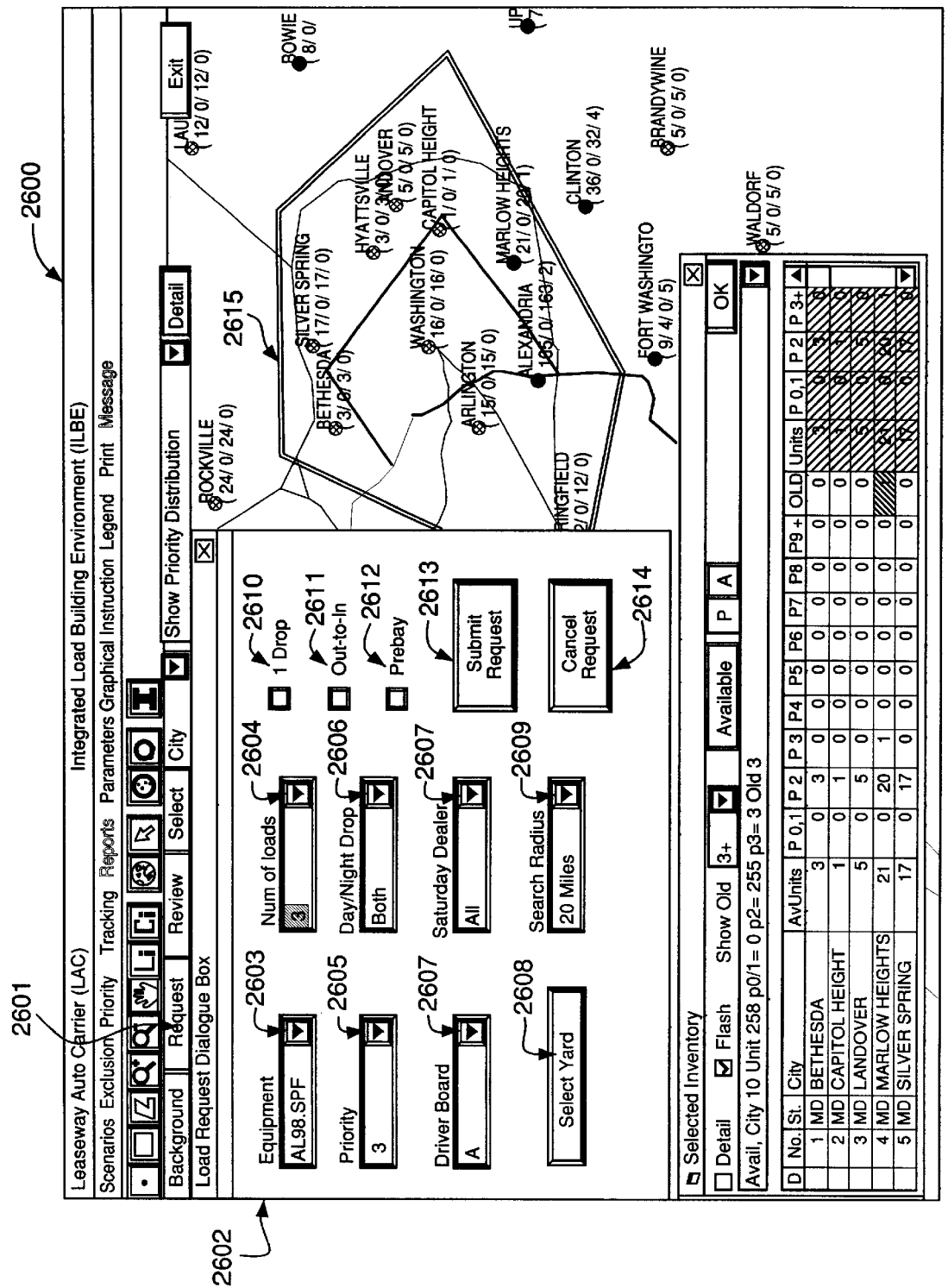
FIG. 26 shows a graphical user interface for displaying geographic priority distribution after a load building session has been requested.

Referring now to FIGS. 26 through 31, there are shown a plurality of load request and load analysis guis for generating requests to build a load(s) and analyzing the quality of a load(s) once built respectively. FIG. 26 depicts a geographic priority distribution gui 2600 where a user has selected the inventory to be used for a load building session by drawing polygon 2615, and then instructed the computer that he wishes to initiate a load building session by selecting a load building request (request) button 2601. Upon selection of request button 2601, the computer generates a load request dialogue box subportion (dialogue box) 2602 of gui 2600. In preferred embodiments of the invention, dialogue box may comprise, but is not limited to, a delivery vehicle type designation (equipment) drop down menu 2603, a number of loads to be built designation (num of loads) drop down menu 2604, a priority designation (priority) drop down menu 2605, a day or night delivery only designation (day/night drop) drop down menu 2606, a driver board designation (driver board) drop down menu 2607, a Saturday or weekday only designation (Saturday dealer) drop down menu 2607, a terminal selection (yard) button 2608, a maximum distance between units in the current inventory and units on a load being built designation (search radius) drop down menu 2609, a single destination designation (1 drop) box 2610, an out-to-in designation box 2611, a prebay designation box 2612, an initiate the load building session (submit request) button 2613, and a cancel the load building session (cancel request) button 2614. The entries in equipment drop down menu 2603 comprise the types of delivery vehicles within the user's fleet, and the user would select the specific type that is available or will be available at the terminal to deliver the units on the loads to be built. In preferred embodiments of the invention, the entries in priority drop down menu 2605 comprise the number of days units may have been at the terminal awaiting delivery, starting with 0. The entries in day/night drop down menu 2606 may comprise, day only, night only, or both. The entries in Saturday dealer drop down menu 2607 may comprise weekday only, Saturday only, or all. Selection of 1 drop box 2610 will result in the computer building only loads where all the units on each load are to be delivered to a single destination. Selection of out-to-in box 2611 will result in the computer attempting to place units in the current inventory that are furthest from the terminal on the loads being built first.

Figure 27:
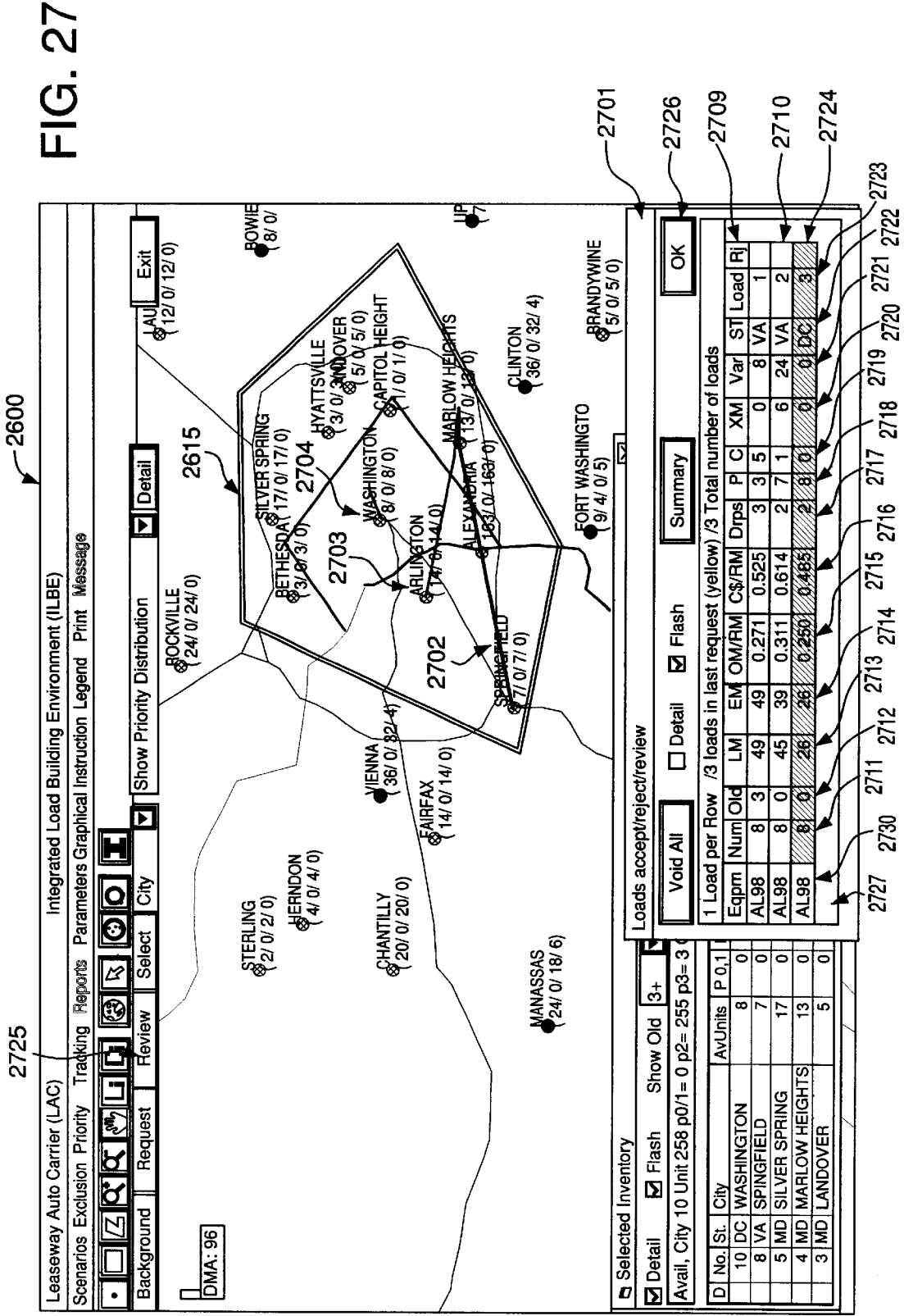
FIG. 27 shows a graphical user interface for displaying built load information.

Referring now to FIG. 27, there is shown gui 2600 once the user has made all his selections and/or designations 2603–2612 in dialogue box 2602, initiated a load building session by selecting submit request button 2613, and the computer has completed building the loads requested. Gui 2600 now comprises one of many possible forms of a load analysis gui. The approximate route that each delivery vehicle will travel while delivering the units on each load built, excluding the initial and final legs, (load delivery routes) 2702–2704 are shown on the active geographic inventory distribution gui 2600. In particularly preferred embodiments of the invention, a user may also review quality statistics for each load 2702–2704 built by selecting a load review (review) button 2725. Upon selection of review button 2725 the computer generates a loads accept/reject/review subportion 2701 of the active geographic inventory distribution gui 2600. Subportion 2701 may comprise, but is not limited to, a review summary statistics (summary) button 2705, a flash selection box 2706, a review detailed load statistics (detail) selection box 2707, a reject all built loads (void all) button 2708, an accept loads (OK) button 2726, and a load statistics table 2727. The rows 2710 of load statistics table 2727 comprise each load built, while the columns 2709 of load statistics table 2727 comprise the categories of statistics that may be reviewed from loads accept/reject/review subportion 2701. In particularly preferred embodiments of the invention, columns 2709 may comprise, but are not limited to: delivery vehicle type (Eqpm) 2728; number of units on the load (Num) 2711; number of old units on the load (Old) 2712; the loaded miles of the load (LM) 2713; the empty miles of the load (EM) 2714; the ratio of the odometer miles for the load to the revenue miles of the load (OM/RM) 2715; the cost per revenue mile of the load (C$/RM) 2716; the number of drops on the load (Drps) 2717; the number of priority units on the load (P) 2718; the number of non-priority units on the load (C) 2719; the cross miles(XM) 2720 of the load (which is a measure of how far from a straight line the delivery route of a load is, can be calculated by subtracting the FurthestMiles of the load from the LoadedMiles of the load, and generally corresponds to a poorer quality load the higher its value when the destinations on the load are closer to the terminal); the variance from a perfect load of the load (VAR) 2721, where a perfect load comprises a load with units to be delivered to a single destination; the state(s) to which units on the load are to be delivered (ST) 2722; the load identification number (LOAD) 2723; and a load rejection box (Rj) 2724 for rejecting individual loads.

Figure 28:
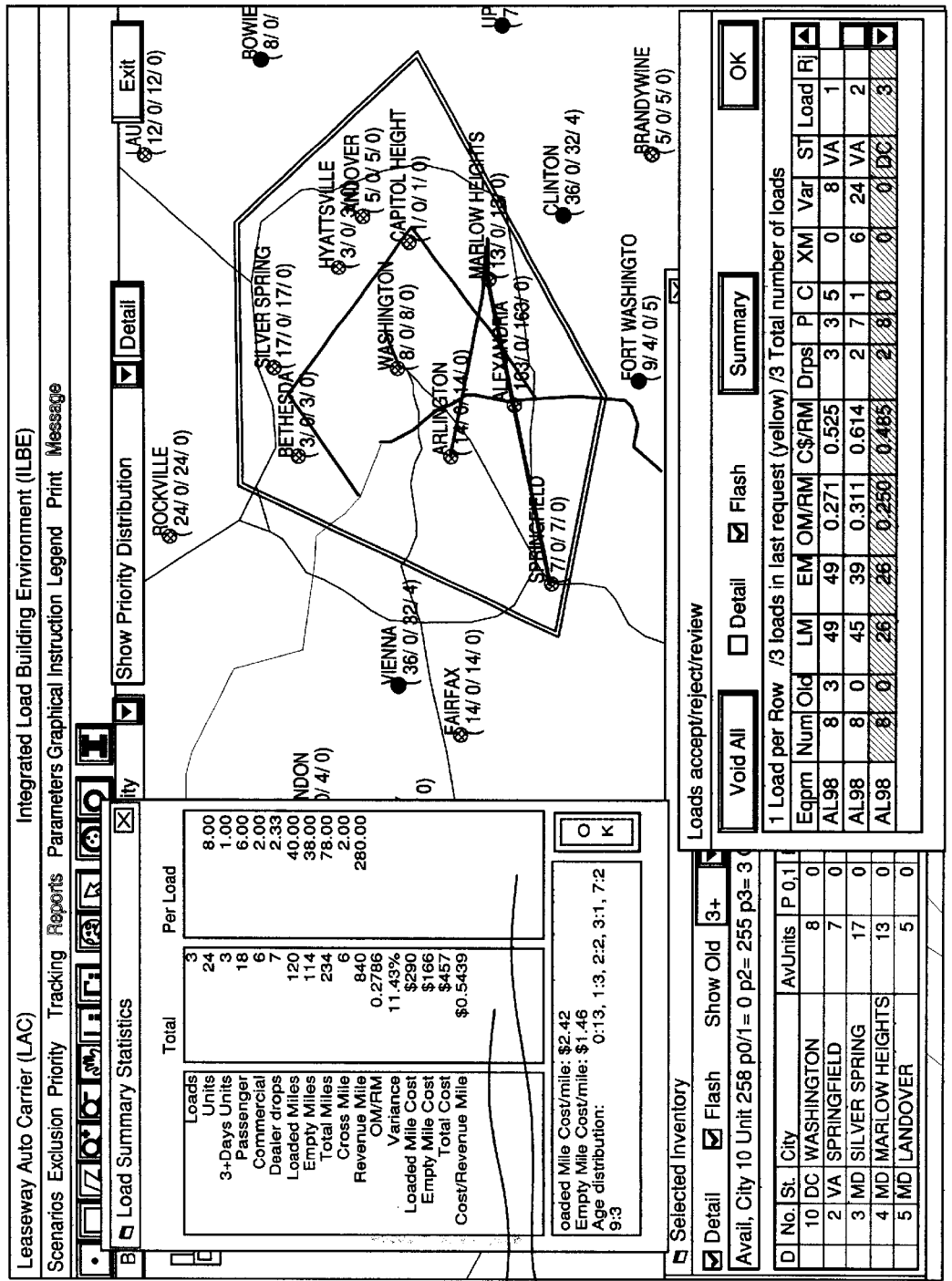
FIG. 28 shows a graphical user interface for displaying built load information in a load summary statistics format.
Figure 29:
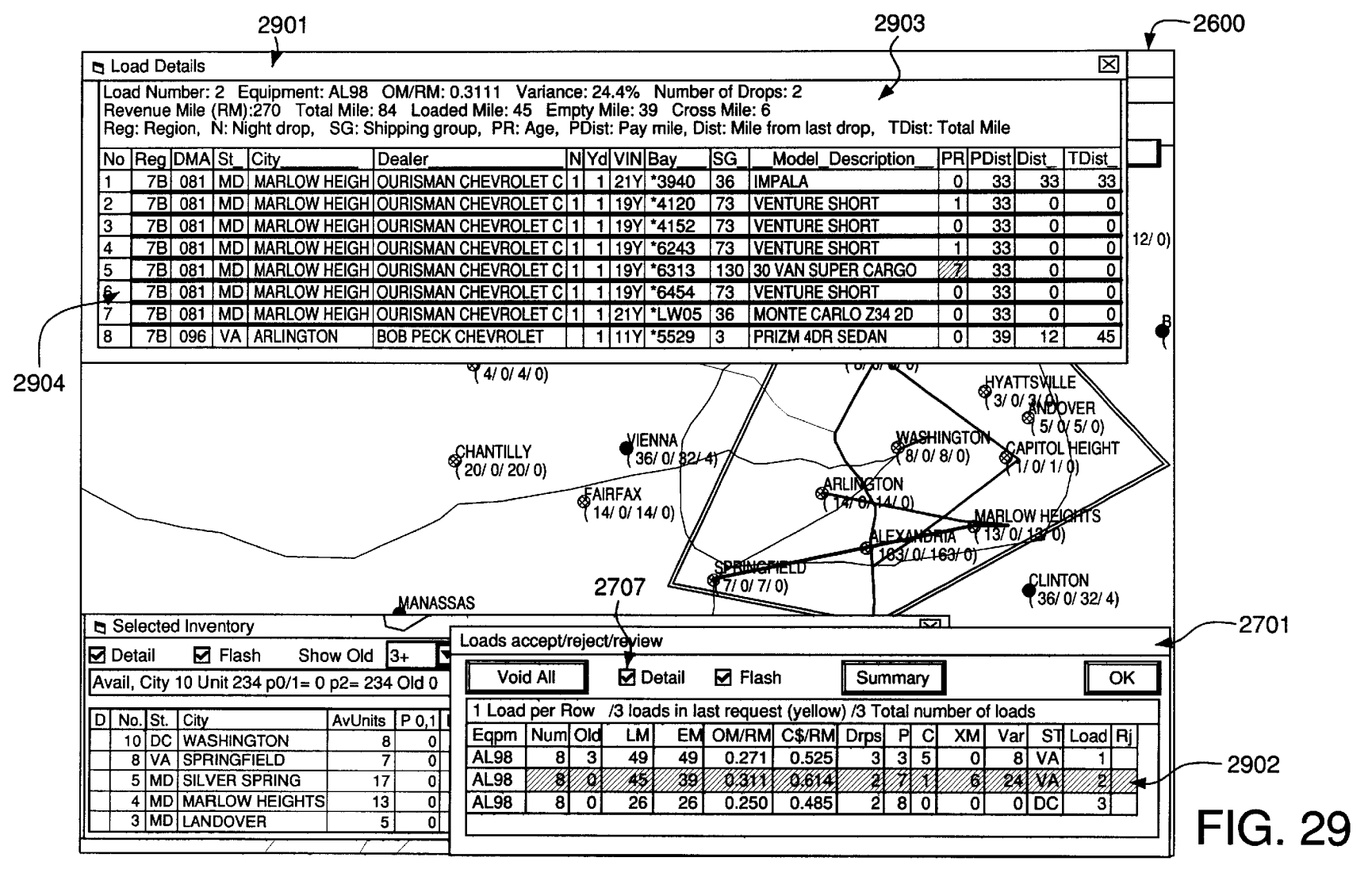

Referring now to FIG. 28, there is shown a load summary statistics subportion 2801 of gui 2600. Subportion 2801 is generated by the computer when a user selects summary button 2705 on loads accept/reject/review subportion 2701. Summary statistics subportion 2801 allows a user to review average total 2803 and per load 2803–2804 statistics for the loads. Referring now to FIG. 29, there is shown a detailed load statistics (load details) subportion 2901 of gui 2600 generated by the computer when a user selects an individual load 2902 and detail selection box 2707 in loads accept/reject/review subportion 2701. Load details subportion 2901 allows a user to review both detailed statistics 2903 for the selected load 2902, and information regarding the units 2904 comprising the selected load 2902. It will be appreciated by one skilled in the art that the statistics displayed, whether review, summary, or detailed, are updated by the computer and the guis and/or subportions of the guis redrawn whenever an individual load(s) is rejected.

Figure 30:
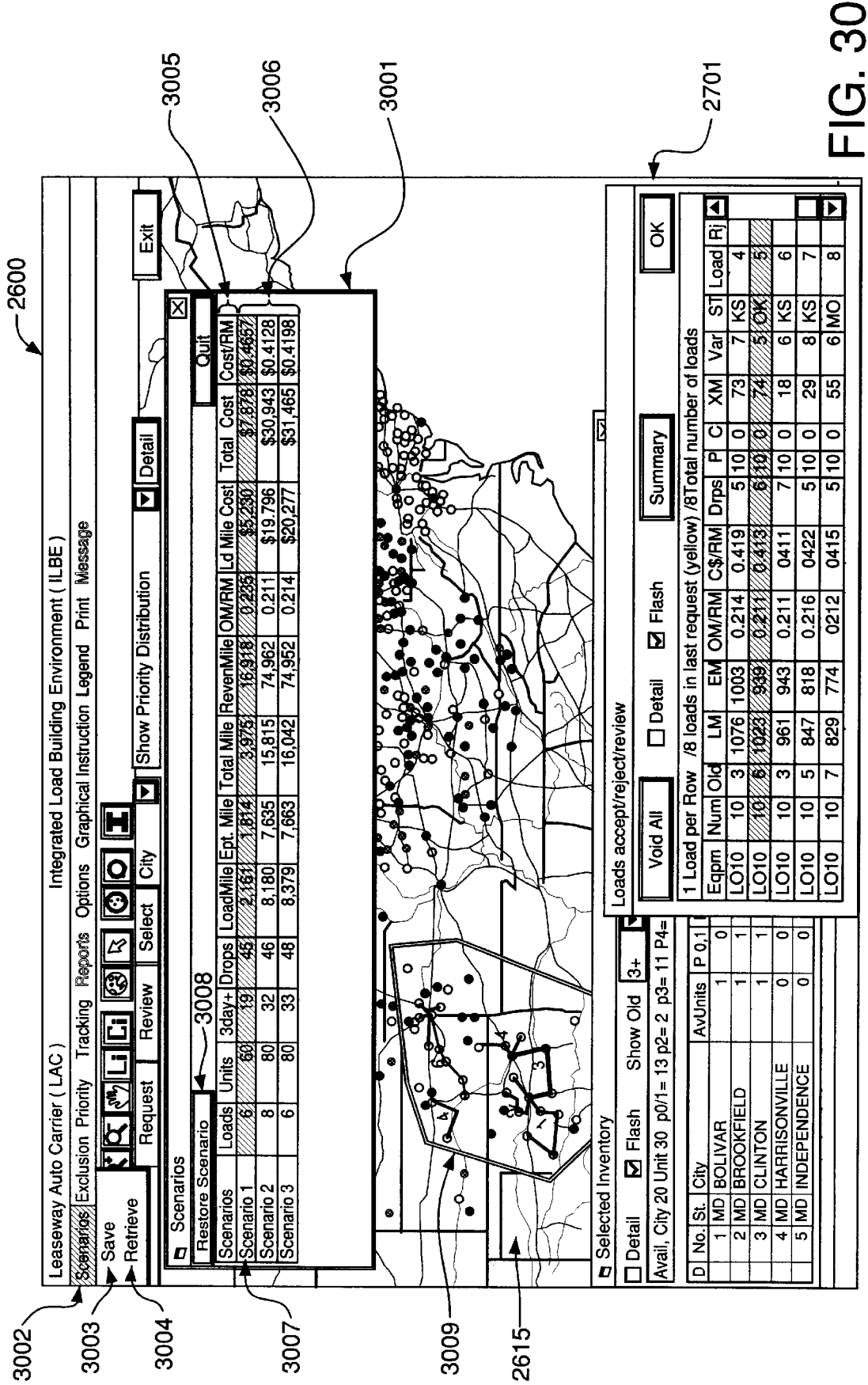
FIG. 30 shows a graphical user interface for allowing an operator to vary load scenarios to evaluate alternate load request criteria.

Referring now to FIG. 30, there is shown a scenarios subportion 3001 of gui 2600. Once a plurality of loads 3009 have been built by the computer a user may believe that he could build better quality loads by experimenting with different load request criteria and/or including/excluding certain units in/from the inventory. However, the user may also wish not to lose the loads that he has currently built. By selecting a save instruction 3003 from a scenarios drop down menu 3002, a user instructs the computer to return the units on the current plurality of loads to the inventory available for building loads, but also to save in the computer's memory the current plurality of loads as a scenario. The user may then attempt to build better quality loads by experimenting with various aspects of the load building program described above. After the user has created one or more scenarios, he may wish to review the scenarios he has saved. By selecting a retrieve instruction 3004 from scenarios drop down menu 3002 the user may review the saved scenarios 3007 in scenarios subportion 3001. Once a user decides which scenario he wishes to use, he highlights the scenario 3007 and selects a restore scenario button 3008.

Figure 31:
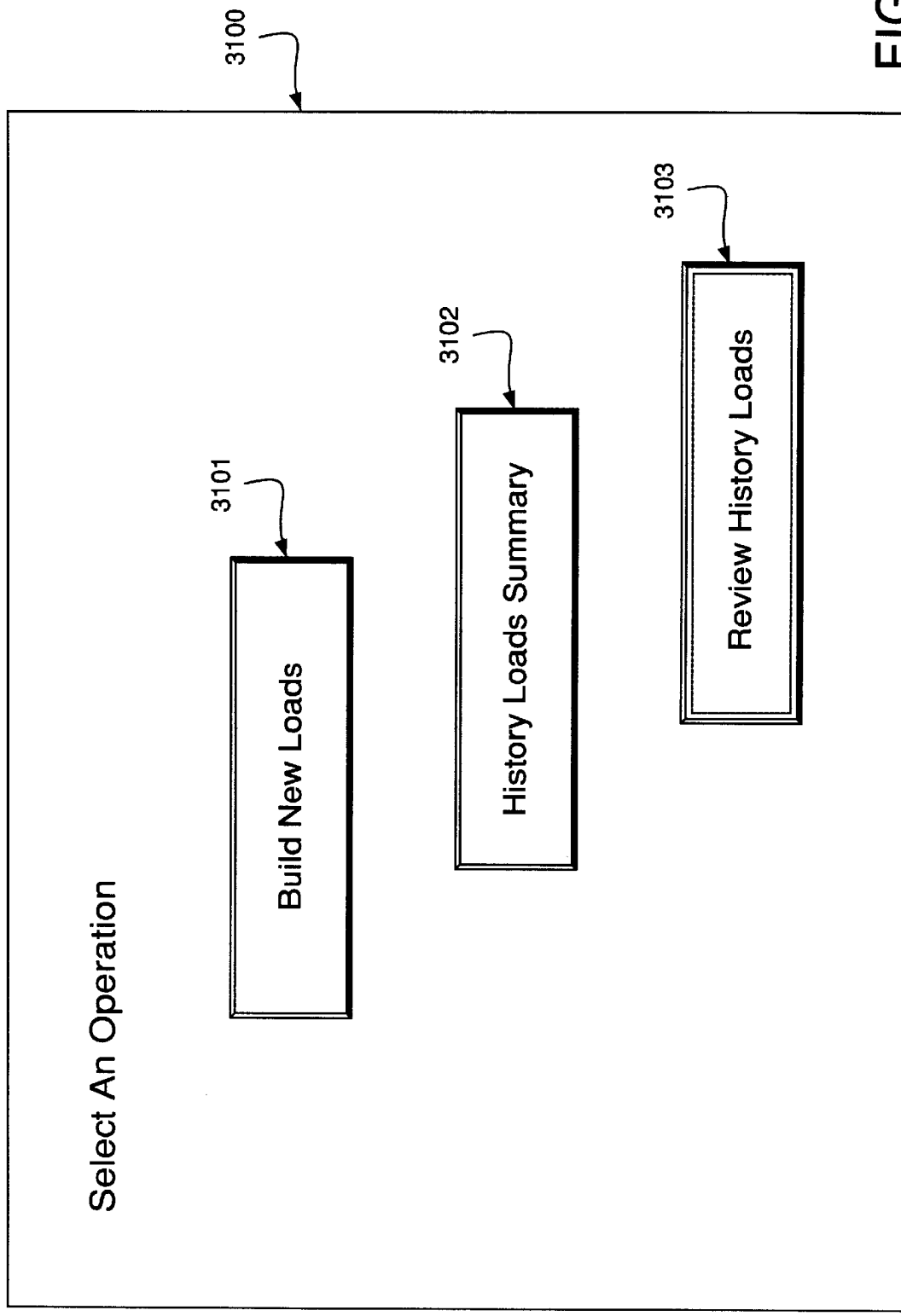
FIG. 31 shows a graphical user interface for displaying menu options associated with system functions.
Figure 32:
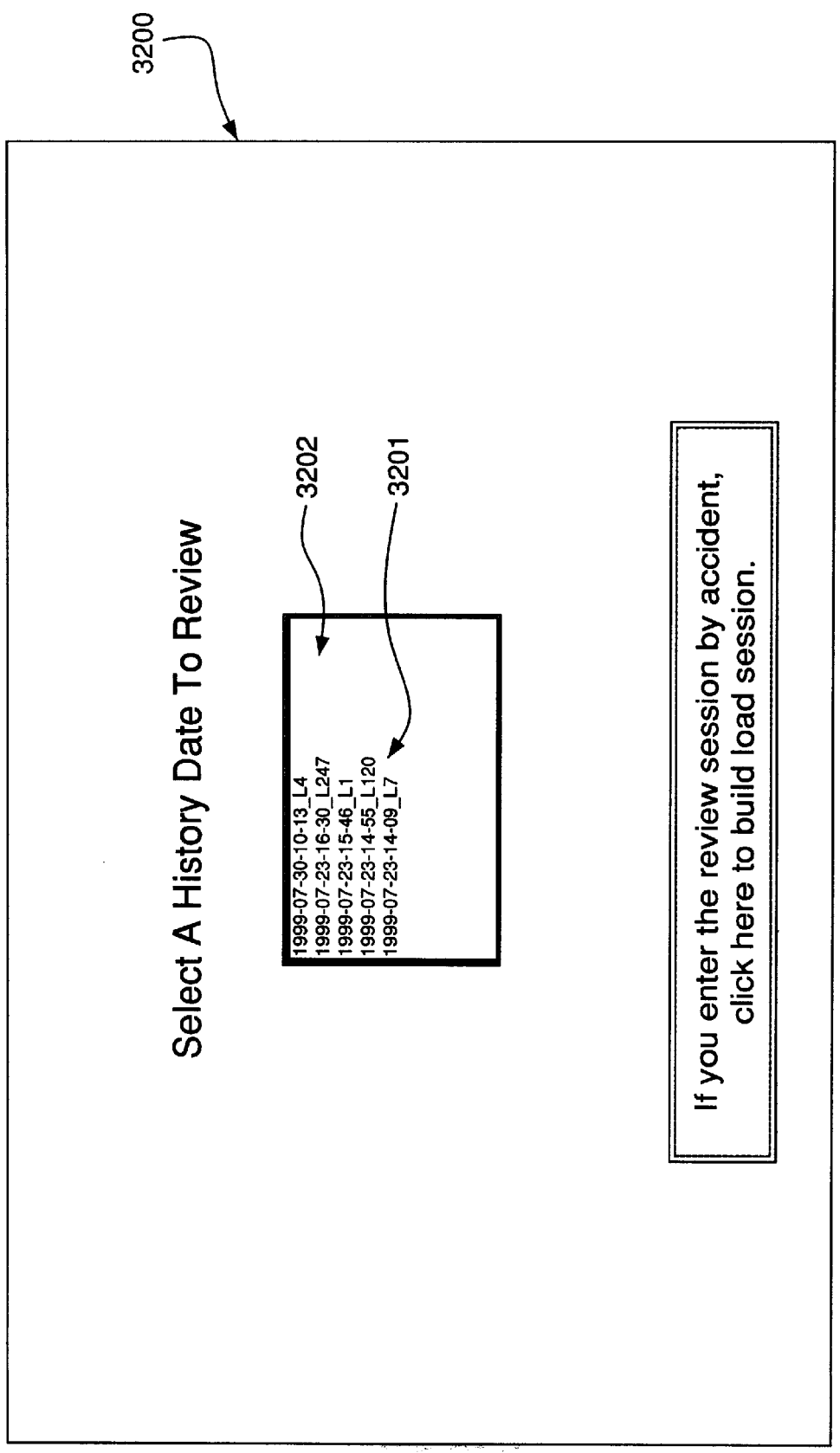
FIG. 32 shows a graphical user interface for selecting historical periods for reviewing load information.
Figure 33:
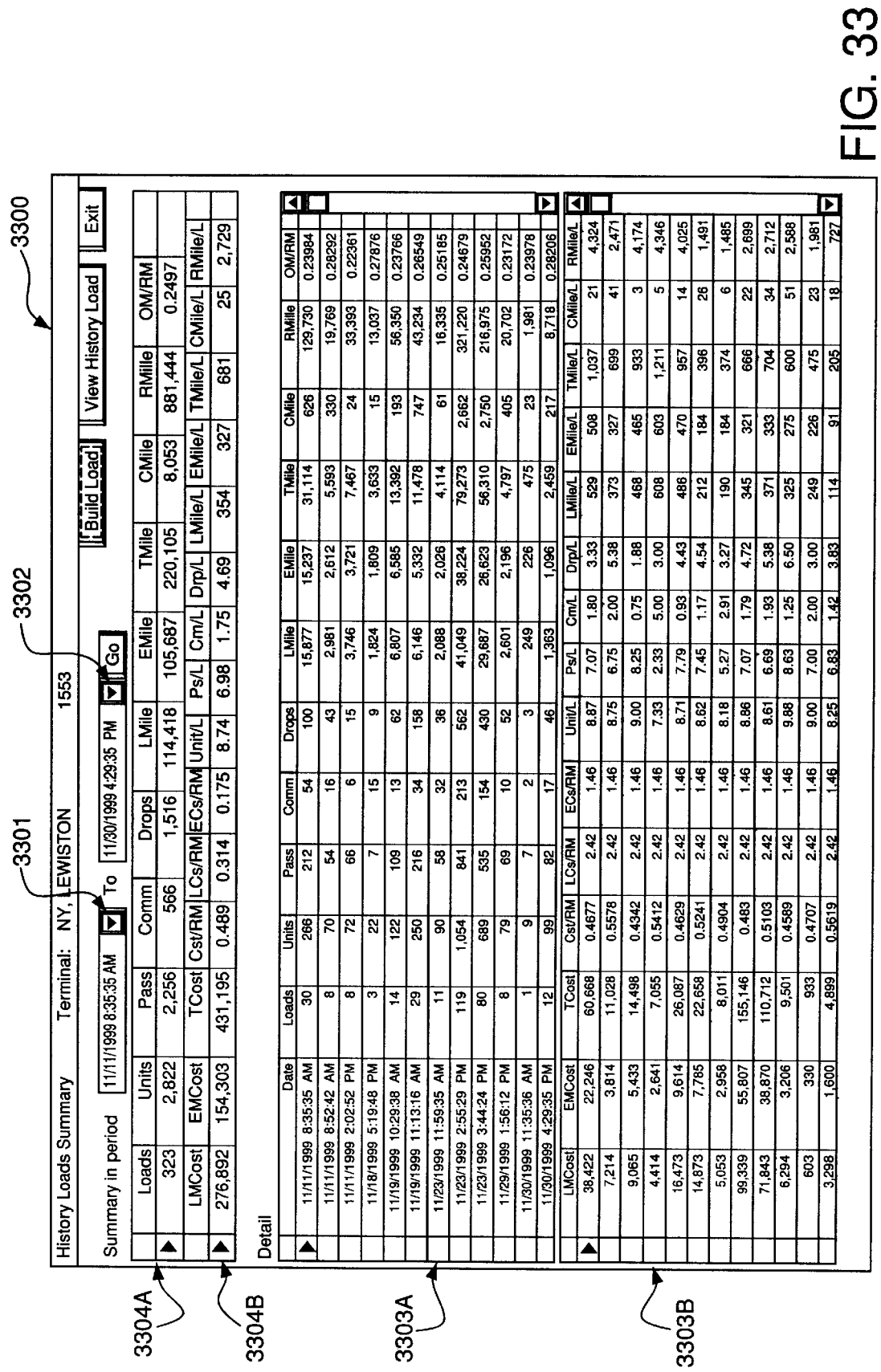
FIG. 33 shows a graphical user interface for reviewing historical load information.

Referring now to FIGS. 31 through 33, there are shown a number of additional guis that may be generated by the computer on the gui. FIG. 31 shows a menu gui 3100 generated by the computer when a user first launches the load building software. In preferred embodiments of the invention, the menu gui 3100 may comprise, but is not limited to, a build new loads button 3101, a history loads summary button 3102, and a review history loads button 3103. By selecting build new loads button 3101 the computer generates one of the geographic inventory distribution guis described above. By selecting review history loads button 3103, a user instructs the computer to generate a review history loads gui 3200 shown in FIG. 32. Once in gui 3200, all the loads built for a certain period of time 3201 are displayed in a loads history gui box 3202. To review a particular load building session the user would select it from gui box 3202. By selecting history loads summary button 3102, a user instructs the computer to generate a history loads summary gui 3300 shown in FIG. 33. Once in gui 3300, a user may specify an interval of time from which he wishes to review loads with interval drop down menus 3301 and 3302. Once the interval has been selected, summary statistics for all the loads in the interval may be reviewed in summary statistics tables 3304A and 3304B of gui 3300, and detailed statistics for each load in the interval may be reviewed in detailed load statistics tables 3303A and 3303B of gui 3300.

The presently preferred embodiment also incorporates a manual load building capability, which allows a user to build a load manually when automatic building of a load is precluded by missing information, or when a user desires to manually build a load for other reasons.

Automatic building of a load configuration may be precluded because the automated load builder requires current loading specifications in order to determine full truck capacity. If the available loading specifications are not current, manual loads may be used while current specifications are being prepared.

Manual loads may be desirable where under capacity loads must be built, such as backhauls with less than full capacity loads due to insufficient units in a return lane. Manually built loads may also be desirable when a user desires to test and compare different load alternatives.

The load generating system includes functions to allow a user to select cities to determine units eligible for manual load building; to request manual load building functions; to provide display screens showing manually built load information; to allow a user to select individual units to be built into loads; to allow manual loads to be submitted to an internal load build engine; and to display geographic load information and statistics allowing a user to review, accept, or reject manually built loads.

Incorporation of the manual build system within the automated load building system provides a user with the benefit of the information presentation capabilities of the automated load building system, increasing operator efficiency by providing better review capabilities of manually generated loads. Display of the manually built loads on the common graphical user interfaces allows improved evaluation of the manually built loads because the remaining inventory is also displayed on map for reference. Incorporation of the manual build system within the automated load building system also provides a customized vehicle display screen, which allows grouping and sorting vehicles dynamically according to specific user needs. This increases the flexibility for current and future needs without requiring additional coding effort later.

Thus, methods for building and improving the quality of inventory load configurations, and means of displaying information regarding the inventory and load configurations have been shown and described. Users of the methods and guis have the ability among other things to create inventory load configurations having superior quality criteria such as low numbers of dealer drops per load and high revenue miles per load. However, the previous description of the preferred embodiments is provided only to enable one skilled in the art to make or use the present invention. Various modifications to the embodiments described above will be readily apparent to those skilled in the art, and the generic principles defined herein may be applied to other embodiments without the use of inventive faculty. For this reason, the present invention is not intended to be limited to the specific embodiments shown herein but is to be accorded the widest scope consistent with the generic principles contained in the foregoing written description and claims set forth below.

That which is claimed is:

1. A computer implemented method for improving the mileage quality of a load, the load selected from a plurality of loads, the plurality of loads comprising a first plurality of units to be delivered from a terminal to a first plurality of destinations within a geographic region on a plurality of delivery vehicles, comprising the steps of:
   (A) creating a list of seed units from a second plurality of units, the second plurality of units to be delivered to a second plurality of destinations within the geographic region;
   (B) selecting a current seed unit from the list of seed units, resident in at least one computer memory;
   (C) creating a list of promising loads from the plurality of loads;
   (D) selecting a current promising load from the list of promising loads, wherein the current promising load comprises a best savings load for the current seed unit;
   (E) creating a sortlist from the units comprising the current promising load;
   (F) selecting, by at least one computer processor, a current best savings unit from the sortlist;
   (G) swapping the current best savings unit for the current seed unit on the current promising load, the current promising load with the current best savings unit comprising a current swapped load; and
   (H) saving the current swapped load in the plurality of loads, the current swapped load representing a load with improved mileage quality.

2. The method of claim 1, wherein the swapped load is saved in the plurality of loads only if the load index of the swapped load is greater than the load index of the current promising load.

3. The method of claim 1, wherein the terminal miles of the current seed unit is less than the closes miles of the current promising load.

4. The method of claim 1, wherein the best savings of the current promising load is greater than zero.

5. The method of claim 1, wherein the current best savings unit comprises a non-priority unit.

6. The method of claim 1 or 2, comprising the additional steps of:
   (I) repeating steps (B) through (H) until all of the seed units in the list of seed units have been considered.

7. The method of claim 6, comprising the additional step of:
   (J) repeating steps (A) through (I) if a current swapped load has been saved.

* * * * *